(12) United States Patent
Lai et al.

(10) Patent No.: US 12,007,617 B2
(45) Date of Patent: Jun. 11, 2024

(54) IMAGING LENS SYSTEM, IMAGE CAPTURING UNIT AND ELECTRONIC DEVICE

(71) Applicant: LARGAN PRECISION CO., LTD, Taichung (TW)

(72) Inventors: Yu Chen Lai, Taichung (TW); Ming-Ta Chou, Taichung (TW); Liang Chieh Weng, Taichung (TW); Ming-Shun Chang, Taichung (TW)

(73) Assignee: LARGAN PRECISION CO., LTD, Taichung (TW)

( * ) Notice: Subject to any disclaimer, the term of this patent is extended or adjusted under 35 U.S.C. 154(b) by 538 days.

(21) Appl. No.: 17/177,805

(22) Filed: Feb. 17, 2021

(65) Prior Publication Data

US 2022/0155549 A1 May 19, 2022

(30) Foreign Application Priority Data

Nov. 13, 2020 (TW) .................. 109139686

(51) Int. Cl.
*G02B 7/02* (2021.01)
*G02B 7/00* (2021.01)
(Continued)

(52) U.S. Cl.
CPC ............. *G02B 7/003* (2013.01); *G02B 7/021* (2013.01); *G02B 7/025* (2013.01); *G02B 13/0045* (2013.01); *G02B 13/18* (2013.01)

(58) Field of Classification Search
CPC ........ G02B 7/003; G02B 7/021; G02B 7/025; G02B 13/0045; G02B 13/18
(Continued)

(56) References Cited

U.S. PATENT DOCUMENTS

| 2009/0174954 A1* | 7/2009 | Hara | G02B 7/021 |
| | | | 359/819 |
| 2012/0218649 A1* | 8/2012 | Konishi | G02B 7/021 |
| | | | 156/305 |

(Continued)

FOREIGN PATENT DOCUMENTS

| CN | 210015272 U | 2/2020 |
| CN | 214174717 U | 9/2021 |

OTHER PUBLICATIONS

1 Chinese Office Action dated Apr. 1, 2023 as received in application No. 202011526787.7.

*Primary Examiner* — Mahidere S Sahle
(74) *Attorney, Agent, or Firm* — Maschoff Brennan

(57) ABSTRACT

An imaging lens system has an optical axis. The imaging lens system includes a plurality of optical elements, a lens barrel, an optical mark structure and a curable liquid. The optical elements are arranged along the optical axis. The lens barrel surrounds the optical axis, and at least one of the optical elements is accommodated in the lens barrel. The optical mark structure is disposed on the lens barrel, and the optical mark structure includes a plurality of optical mark units arranged side by side along a circumference direction that surrounds the optical axis. The curable liquid is disposed on the optical mark structure. The curable liquid is in physical contact with at least one of the optical mark units, and one of the optical elements adjacent to the optical mark structure is fixed to the lens barrel while the curable liquid is cured.

7 Claims, 40 Drawing Sheets

(51) Int. Cl.
G02B 13/00 (2006.01)
G02B 13/18 (2006.01)

(58) Field of Classification Search
USPC .......................................... 359/811, 818, 819
See application file for complete search history.

(56) References Cited

U.S. PATENT DOCUMENTS

2014/0029114 A1* 1/2014 Kim ...................... G02B 7/003
359/709
2022/0155549 A1 5/2022 Lai et al.

* cited by examiner

IMAGING LENS SYSTEM, IMAGE CAPTURING UNIT AND ELECTRONIC DEVICE

RELATED APPLICATIONS

This application claims priority to Taiwan Application 109139686, filed on Nov. 13, 2020, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

With the development of semiconductor manufacturing technology, the performance of image sensors for having more pixels has been improved. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

However, in order to increase the resolution of the optical systems, it needs to apply more lens elements and additional optical elements to the optical systems. This may cause the tolerance of an adhesive dispensing process to be significantly reduced within a limit range, thereby increasing the difficulty of the adhesive dispensing process. Therefore, how to improve the structure of the optical systems for an accurate adhesive dispensing process has become an important issue in the related field.

SUMMARY

According to one aspect of the present disclosure, an imaging lens system has an optical axis, and the imaging lens system includes a plurality of optical elements, a lens barrel, an optical mark structure and a curable liquid. The optical elements are arranged along the optical axis. The lens barrel surrounds the optical axis, and at least one of the plurality of optical elements is accommodated in the lens barrel. The optical mark structure is disposed on the lens barrel, and the optical mark structure includes a plurality of optical mark units arranged side by side along a circumference direction that surrounds the optical axis. Each of the optical mark units includes a first optical mark surface. The curable liquid is disposed on the optical mark structure, and the curable liquid is in physical contact with the at least one of the plurality of optical mark units. One of the plurality of optical elements adjacent to the optical mark structure is fixed to the lens barrel while the curable liquid is cured. When a projection area of each of the first optical mark surfaces on a reference surface perpendicular to the optical axis is A, and a distance along the circumference direction between center points of two of the first optical mark surfaces adjacent in the circumference direction is D, the following conditions are satisfied:

0.001 [mm$^2$]≤A≤0.072 [mm$^2$]; and 0.03 [mm]≤D≤1.0 [mm].

According to another aspect of the present disclosure, an imaging lens system has an optical axis, and the imaging lens system includes a plurality of optical elements, a lens barrel, an optical mark structure and a curable liquid. The plurality of optical elements are arranged along the optical axis, and the plurality of optical elements at least includes a first optical element and a second optical element. The lens barrel surrounds the optical axis, and the optical elements are accommodated in the lens barrel. The optical mark structure is disposed on the first optical element, and the optical mark structure faces the second optical element. The optical mark structure includes a plurality of optical mark units arranged side by side along a circumference direction that surrounds the optical axis. Each of the optical mark units includes a first optical mark surface. The curable liquid is disposed on the optical mark structure, and the curable liquid is in physical contact with at least one of the plurality of optical mark units. The first optical element is fixed to the second optical element while the curable liquid is cured. When a projection area of each of the first optical mark surfaces on a reference surface perpendicular to the optical axis is A, and a distance along the circumference direction between center points of two of the first optical mark surfaces adjacent in the circumference direction is D, the following conditions are satisfied:

0.001 [mm$^2$]≤A≤0.072 [mm$^2$]; and 0.03 [mm]≤D≤1.0 [mm].

According to another aspect of the present disclosure, an imaging lens system has an optical axis, and the imaging lens system includes a plurality of optical elements, a lens barrel, an optical mark structure and a curable liquid. The plurality of optical elements are arranged along the optical axis, and the optical elements at least includes a non-circular element. The non-circular element includes an abutment part surrounding the optical axis. The lens barrel surrounds the optical axis, and the non-circular element is accommodated in the lens barrel. The abutment part of the non-circular element is in physical contact with the lens barrel in a first direction, and the abutment part has at least one trimmed surface in a second direction, wherein the first direction is defined as a direction along a first axis and toward a position away from an intersection of the first axis and the optical axis, the second direction is defined as a direction along a second axis and toward a position away from an intersection of the second axis and the optical axis, the first axis is different from the second axis, and each of the first axis and the second axis is perpendicular to the optical axis. The optical mark structure is disposed on the abutment part in the first direction, and the optical mark structure extends towards the second axis along a circumference direction that surrounds the optical axis. The optical mark structure includes a plurality of optical mark units arranged side by side along the circumference direction. Each of the plurality of optical mark units includes a first optical mark surface. The curable liquid is disposed on the optical mark structure, and the curable liquid is in physical contact with at least one of the plurality of optical mark units. The non-circular element is fixed to the lens barrel while the curable liquid is cured. When a projection area of each of the first optical mark surfaces on a reference surface perpendicular to the optical axis is A, and a distance along the circumference direction between center points of two of the first optical mark surfaces adjacent in the circumference direction is D, the following conditions are satisfied:

0.001 [mm$^2$]≤A≤0.072 [mm$^2$]; and 0.03 [mm]≤D≤1.0 [mm].

According to another aspect of the present disclosure, an image capturing unit includes one of the aforementioned imaging lens systems.

According to another aspect of the present disclosure, an electronic device includes the aforementioned image capturing unit and an image sensor, wherein the image sensor is disposed on an image surface of the imaging lens system.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
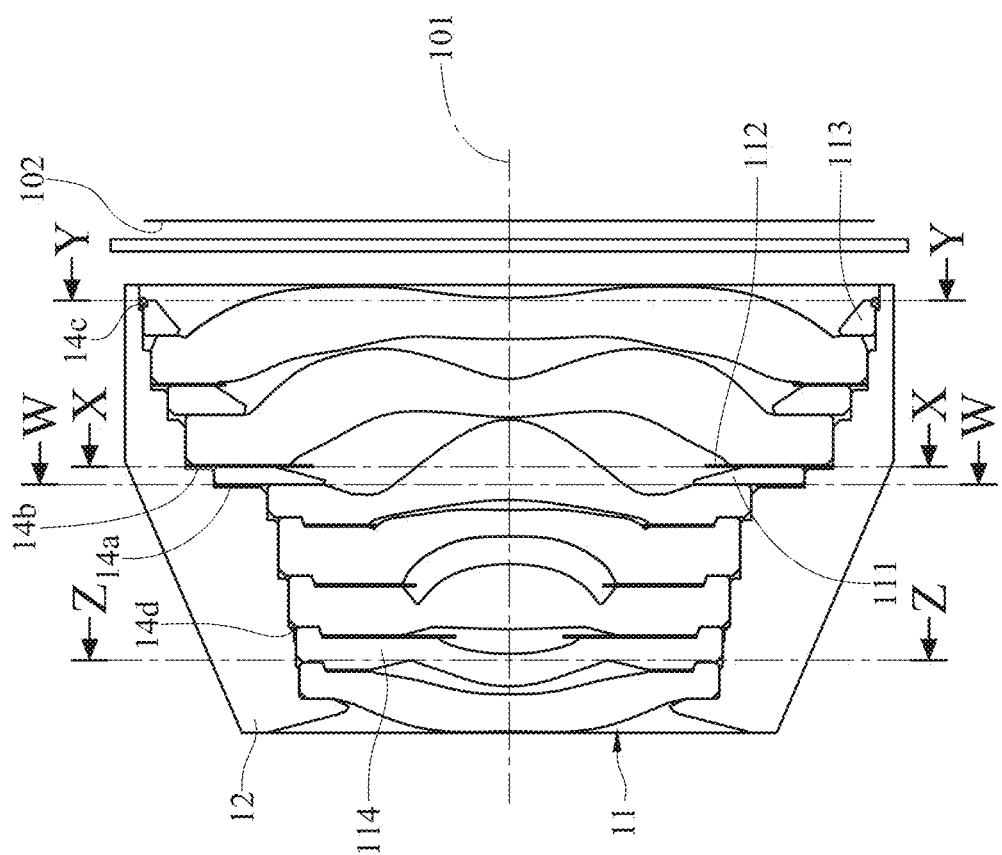
FIG. 1 is a cross-sectional view of an imaging lens system according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system having an optical axis. The imaging lens system includes a plurality of optical elements and a lens barrel. The optical elements are arranged along the optical axis. The lens barrel surrounds the optical axis, and at least one of the optical elements is accommodated in the lens barrel. Moreover, all of the optical elements can be accommodated in the lens barrel.

Figure 13:
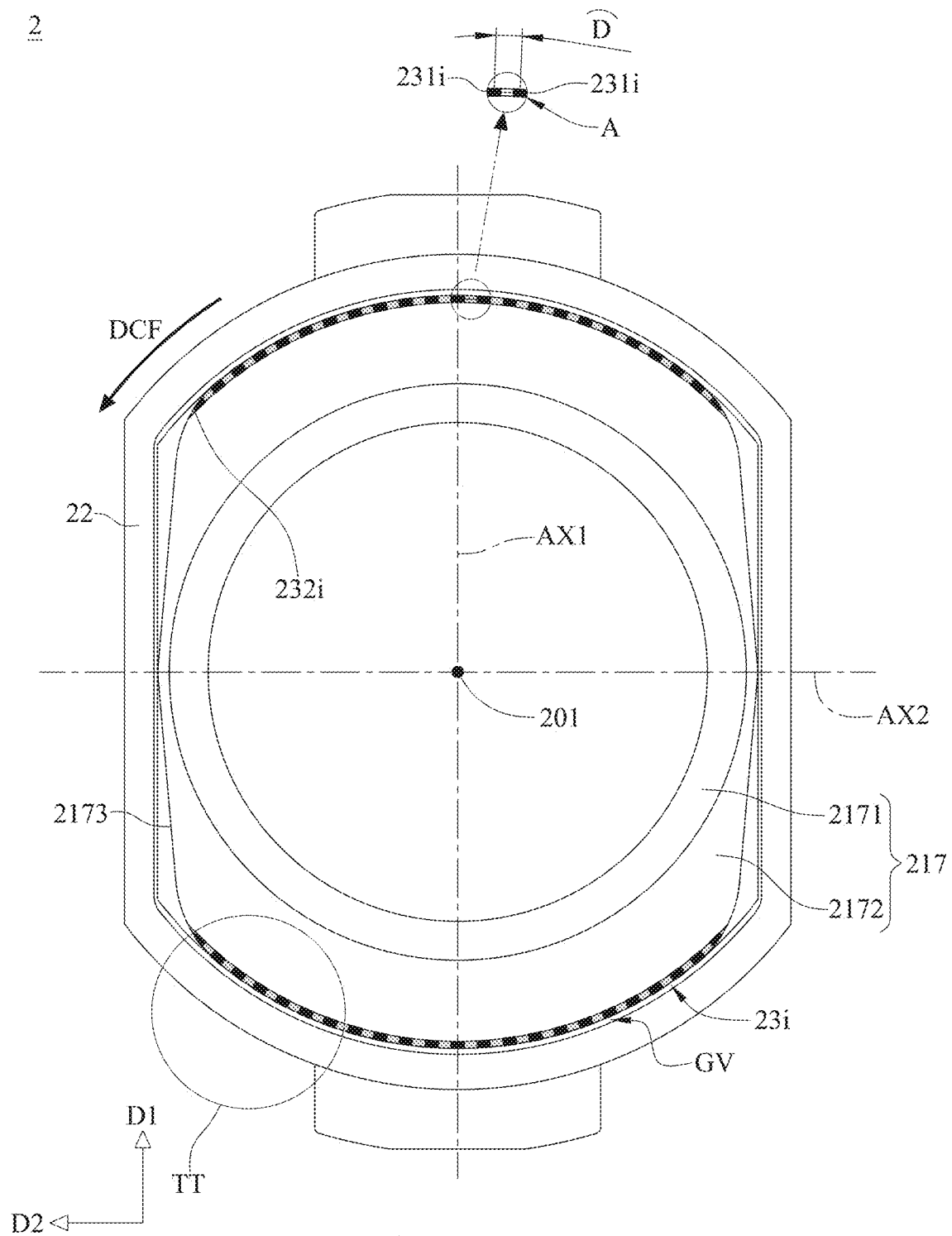
FIG. 13 is a rear view of the imaging lens system of FIG. 10.
Figure 15:
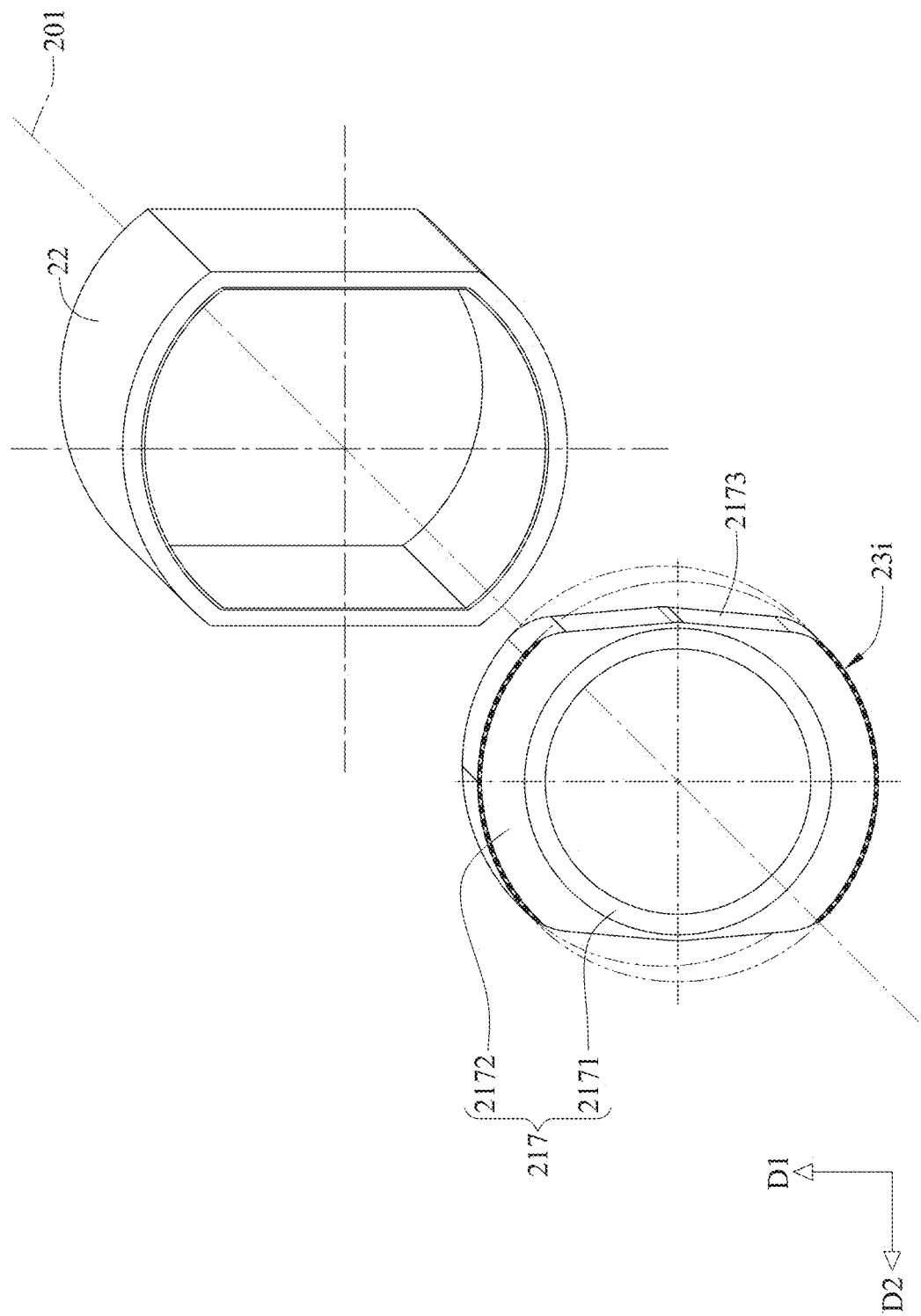
FIG. 15 is an exploded view of a lens barrel and one of optical elements viewing from an image side of the imaging lens system of FIG. 10.

Specifically, the optical elements can include a lens element, a mirror, an optical-folding element, a light-blocking element, a spacer, a retainer, etc., but the present disclosure is not limited thereto. In one aspect of the present disclosure, the optical elements can include a non-circular element, and the non-circular element includes an abutment part surrounding the optical axis. The abutment part is in physical contact with the lens barrel in a first direction, and the abutment part has at least one trimmed surface in a second direction, wherein the first direction is defined as a direction which is along a first axis perpendicular to the optical axis and toward a position away from an intersection of the first axis and the optical axis, the second direction is defined as another direction which is along a second axis perpendicular to the optical axis and toward a position away from an intersection of the second axis and the optical axis, with the first axis different from the second axis. Moreover, the abutment part can be in physical contact with the lens barrel in the second direction. Please refer to FIG. 13 and FIG. 15, which show the lens barrel 22 and the non-circular element (the image-side optical element 217) viewing from the image side of the imaging lens system 2 according to the 2nd embodiment of the present disclosure. As shown in FIG. 13 and FIG. 15, the non-circular element (the image-side optical element 217) can be in physical contact with the lens barrel 22 in the first direction D1, and the non-circular element can have trimmed surfaces 2173 in the second direction D2 that is substantially orthogonal to the first direction D1.

The imaging lens system further includes an optical mark structure. The optical mark structure includes a plurality of optical mark units arranged side by side along a circumference direction that surrounds the optical axis. In one aspect of the present disclosure, the optical mark structure can be disposed on the lens barrel. Moreover, the optical mark structure can be perpendicular to the optical axis. Moreover, the optical mark structure can face an object side or an image side. Please refer to FIG. 2 and FIG. 3, which show the optical mark structure 13a disposed on the lens barrel 12 of the imaging lens system 1 according to the 1st embodiment of the present disclosure, and the optical mark structure 13a is perpendicular to the optical axis 101.

In another aspect of the present disclosure, the optical elements can at least include a first optical element and a second optical element. The optical mark structure can be disposed on the first optical element and can face the second optical element. Moreover, the second optical element can cover at least part of the optical mark structure in a direction parallel to the optical axis. Please refer to FIG. 2 and FIG. 3, which show the optical mark structure 13b disposed on the first optical element 111 of the imaging lens system 1 according to the 1st embodiment of the present disclosure, and at least part of the optical mark structure 13b is covered by the second optical element 112 in a direction parallel to the optical axis 101.

In still another aspect of the present disclosure, the optical mark structure can be disposed on the abutment part of the non-circular element in the first direction, and the optical mark structure can extend towards the second axis along a circumference direction that surrounds the optical axis. Moreover, the optical mark structure can taper off along the circumference direction from the first axis to the second axis which is perpendicular to the first axis. Moreover, the optical mark structure can be in an arc shape. Please refer to FIG. 11, which shows the optical mark structure 23o disposed on the abutment part 2162 of the non-circular element (the object-side optical element 216) of the imaging lens system 2 in the first direction D1 according to the 2nd embodiment of the present disclosure, and the optical mark structure 23o of an arc shape extends and tapers off along the circumference direction DCF from the first axis AX1 to the second axis AX2. Please refer to FIG. 17, which shows the optical mark structure 33o disposed on the abutment part 3162 of the non-circular element (the object-side optical element 316) of the imaging lens system 3 in the first direction D1 according to the 3rd embodiment of the present disclosure, and the arc-shaped optical mark structure 33o extends and tapers off along the circumference direction DCF from the first axis AX1 to the second axis AX2.

The imaging lens system further includes a curable liquid. The curable liquid is disposed on the optical mark structure, and the curable liquid is in physical contact with at least one of the optical mark units. The curable liquid refers to an object formed by a fluid which can be cured by specific way or self-cure. The curable liquid can be adhesive; therefore, it is favorable for providing a bonding force to fix adjacent components while being cured. Alternatively, the curable liquid can be plastic dissolved by organic solvent; therefore, by spreading organic solvent on adjacent surfaces of adjacent plastic components to dissolve part of the plastic components or at least affect their surfaces, the adjacent plastic components can be combined together in one piece while the dissolved plastic is cured. Moreover, the organic solvent can be, for example, acetone, methyl ethyl ketone or chloroform, but the present disclosure is not limited thereto.

In the aspect that the optical mark structure is disposed on the lens barrel, one of the optical elements adjacent to the optical mark structure is fixed to the lens barrel while the curable liquid is cured. Moreover, said optical element can face the optical mark structure in a direction parallel to the optical axis and can be in physical contact with the curable liquid to be fixed to the lens barrel in a direction perpendicular to the optical mark structure while the curable liquid is cured. Please refer to FIG. 3, which shows the curable liquid 14a disposed on the optical mark structure 13a of the lens barrel 12 of the imaging lens system 1 according to the 1st embodiment of the present disclosure, and the first optical element 111 is fixed to the lens barrel 12 in a direction perpendicular to the optical mark structure 13a while the curable liquid 14a is cured.

In the aspect that the optical mark structure is disposed on the first optical element, the first optical element is fixed to the second optical element while the curable liquid is cured. Please refer to FIG. 3, which shows the curable liquid 14b disposed on the optical mark structure 13b of the lens barrel 12 of the imaging lens system 1 according to the 1st embodiment of the present disclosure, and the first optical element 111 is fixed to the second optical element 112 while the curable liquid 14b is cured.

In the aspect that the optical mark structure is disposed on the abutment part of the non-circular element, the non-circular element is fixed to the lens barrel while the curable liquid is cured. Please refer to FIG. 14, which shows the curable liquid 24o disposed on the optical mark structure 23o of the lens barrel 22 of the imaging lens system 2 according to the 2nd embodiment of the present disclosure, and the non-circular element (the object-side optical element 216) is fixed to the lens barrel 22 while the curable liquid 24o is cured. Please refer to FIG. 21, which shows the curable liquid 34o disposed on the optical mark structure 33o of the lens barrel 32 of the imaging lens system 3 according to the 3rd embodiment of the present disclosure, and the non-circular element (the object-side optical element 316) is fixed to the lens barrel 32 while the curable liquid 34o is cured.

Each of the optical mark units of the optical mark structure includes a first optical mark surface. In each optical mark unit, the first optical mark surface can have a gloss value in a direction different from that of the other part of the optical mark unit. Therefore, it is favorable for highlighting the position to be dispensed and timely presenting the current dispensing situation. In detail, the above-mentioned curable liquid can be used for adhesive dispensing, and the gloss value of the first optical mark surface would be changed when the first optical mark surface is in contact with the curable liquid. Therefore, in an adhesive dispensing process, any information, such as the actual position, the dispensing amount and the flow direction of the curable liquid, on the surface of the optical mark structure can be obtained by optical mark recognition, such that the current dispensing situation can be timely compared with and corrected towards the target dispensing result during the adhesive dispensing process. Accordingly, it is favorable for preventing defect such as insufficient adhesive and spilled adhesive, thereby increasing the yield rate and accuracy of the adhesive dispensing process so as to increasing the speed of the subsequent assembly process and preventing the curable liquid from affecting the other position not for adhesive dispensing. Moreover, the gloss value of the first optical mark surface can be changed in a manner that the first optical mark surface is covered, corrode, dyed or the microstructure thereon is changed by the curable liquid, but the present disclosure is not limited thereto.

Further, the gloss value of the first optical mark surface can also be changed when the curable liquid is cured. Therefore, it is favorable for ensuring whether the adjacent components have been fixed together via the curable liquid by the optical mark method.

When a projection area of each of the first optical mark surfaces on a reference surface perpendicular to the optical axis is A, the following condition is satisfied: $0.001\ [mm^2] \leq A \leq 0.072\ [mm^2]$. Therefore, it is favorable for having a sufficient area of the first optical mark surface so as to be easily detected by an optical mark system. Moreover, the following condition can also be satisfied: $0.002\ [mm^2] \leq A \leq 0.042\ [mm^2]$. Please refer to FIG. 4, which shows a schematic view of A according to the 1st embodiment of the present disclosure.

When a distance along the circumference direction between center points of two of the first optical mark surfaces adjacent in the circumference direction is D, the following condition is satisfied: $0.03\ [mm] \leq D \leq 1.0\ [mm]$. Therefore, it is favorable for having a sufficient distance between the two first optical mark surfaces adjacent in the circumference direction so as to be easily detected by the optical mark system. Note that the center point of the first optical mark surface refers to the geometric center point of the range of the first optical mark surface. Please refer to FIG. 4, which shows a schematic view of D according to the 1st embodiment of the present disclosure.

When the projection area of each of the first optical mark surfaces on the reference surface perpendicular to the optical axis is A, and the distance along the circumference direction between center points of two of the first optical mark surfaces adjacent in the circumference direction is D, the following condition can be satisfied: $0.05 \leq \sqrt{(A)}/D \leq 1.5$. Therefore, it is favorable for defining a dimensionless condition of the projection area of the first optical mark surface and the distance between center points of adjacent two first optical mark surfaces as an identification factor so as to obtain information of the dispensing amount, the distribution state and the flow direction of the curable liquid while the first optical mark surfaces, as above-mentioned, have the sufficient area and distance. Moreover, the following condition can also be satisfied: $0.1 \leq \sqrt{(A)}/D \leq 1.0$.

Each of the optical mark units can further include a second optical mark surface, and the first optical mark surface and the second optical mark surface of each of the optical mark units are arranged side by side. The first optical mark surface and the second optical mark surface can have different gloss values in a direction. Moreover, the different gloss values of the first optical mark surface and the second optical mark surface in a direction can be achieved by different surface roughness values, microstructures in different directions, different heights, different angles thereof, but the present disclosure is not limited thereto.

Figure 30:
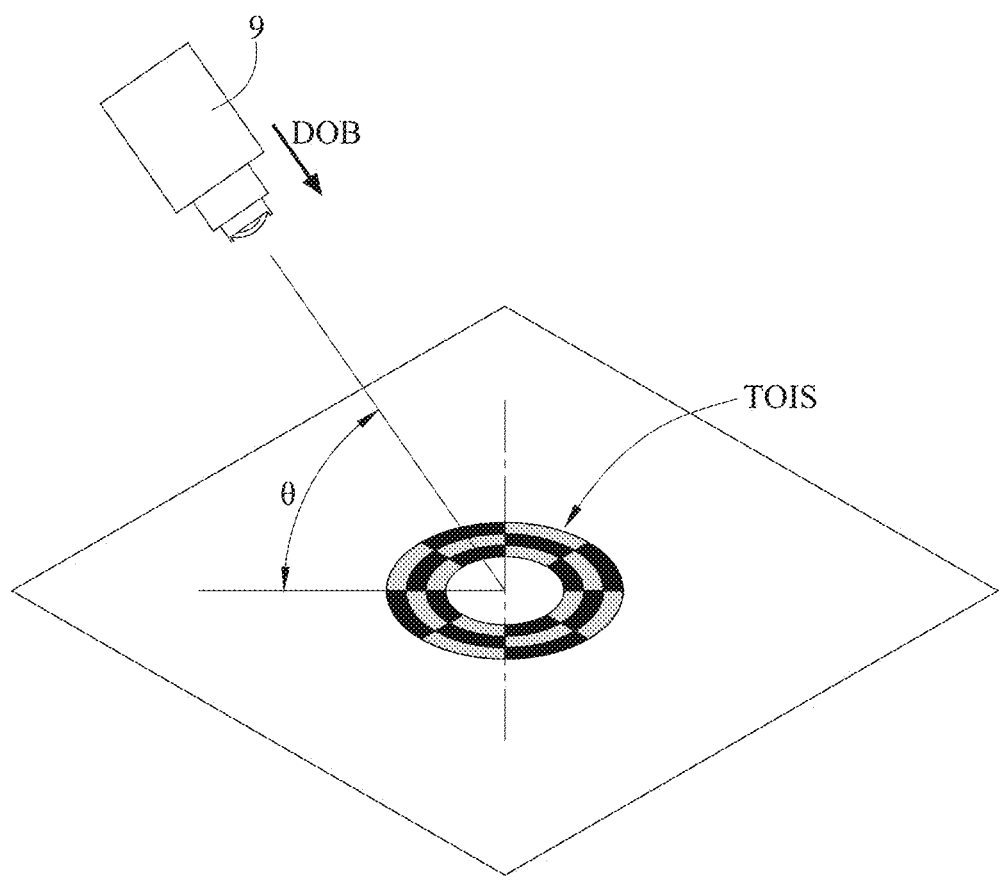
FIG. 30 shows a schematic view of θ according to one embodiment of the present disclosure.

The optical mark structure provided in the present disclosure can be observed in an observation direction. When an angle between the observation direction and the optical mark structure is $\theta$, and a gloss value difference in the observation direction between the first optical mark surface and the second optical mark surface of each of the plurality of optical mark units is $\Delta G$, the following conditions can be satisfied: $50\ [deg.] \leq \theta \leq 90\ [deg.]$; and $15\ [GU] \leq \Delta G \leq 50\ [GU]$. Therefore, it is favorable for the optical mark system to identify the first optical mark surface and the second optical mark surface by the gloss value different. The gloss value of a surface can be calculated from the reflectance thereof when being illuminated. The higher the gloss value of a surface is, the easier the light is reflected off the surface. When $\theta$ is 60 degrees (deg.), a corresponding measurement ranges between 0 and 1000 gloss units (GU). For example, when the reflectance of the first optical mark surface and the reflectance of the second optical mark surface measured in an observation direction at an angle $\theta$ of 60 degrees with respect to the optical mark structure are respectively 0.5% and 3%, the gloss values of the first optical mark surface and the second optical mark surface can be correspondingly calculated to be respectively 5 gloss units and 30 gloss units. The difference between the two gloss values is 25 gloss units, which satisfies the above condition "$15\ [GU] \leq \Delta G \leq 50\ [GU]$". Moreover, when $\theta$ is 85 degrees, a corresponding measurement ranges between 0 and 160 gloss units. Please refer to FIG. 30, which shows an optical mark structure TOIS according to one embodiment of the present disclosure is observed by an optical mark system 9 in an observation direction DOB at an angle $\theta$ with respect to the optical mark structure TOIS.

The following table is provided for showing data of different areas (i.e., the above-mentioned parameter "A"), distances (i.e., the above-mentioned parameter "D") and identification factors (i.e., the above-mentioned "$\sqrt{(A)}/D$") of optical mark surfaces that have the same surface structure thereon and can be identified by the optical mark system in an identification environment of satisfying the conditions "$50\ [deg.] \leq \theta \leq 90\ [deg.]$" and "$15\ [GU] \leq \Delta G \leq 50\ [GU]$". Further, the dispensed optical mark surfaces can also be detected by the optical mark system.

| Sample # | A | D | $\sqrt{(A)}/D$ |
|---|---|---|---|
| 1 | 2.20E−03 | 0.075 | 0.628 |
| 2 | 4.00E−03 | 0.130 | 0.488 |
| 3 | 5.20E−03 | 0.153 | 0.471 |

-continued

| Sample # | A | D | √(A)/D |
|---|---|---|---|
| 4 | 5.30E−03 | 0.153 | 0.476 |
| 5 | 5.40E−03 | 0.060 | 1.224 |
| 6 | 5.60E−03 | 0.177 | 0.423 |
| 7 | 6.20E−03 | 0.207 | 0.380 |
| 8 | 6.60E−03 | 0.221 | 0.367 |
| 9 | 6.90E−03 | 0.162 | 0.513 |
| 10 | 7.30E−03 | 0.242 | 0.353 |
| 11 | 8.70E−03 | 0.291 | 0.320 |
| 12 | 8.70E−03 | 0.291 | 0.320 |
| 13 | 9.70E−03 | 0.354 | 0.278 |
| 14 | 1.07E−02 | 0.357 | 0.289 |
| 15 | 1.08E−02 | 0.361 | 0.288 |
| 16 | 1.08E−02 | 0.361 | 0.288 |
| 17 | 1.08E−02 | 0.360 | 0.289 |
| 18 | 1.15E−02 | 0.353 | 0.303 |
| 19 | 1.16E−02 | 0.385 | 0.279 |
| 20 | 1.21E−02 | 0.403 | 0.273 |
| 21 | 1.22E−02 | 0.348 | 0.317 |
| 22 | 1.26E−02 | 0.421 | 0.267 |
| 23 | 1.41E−02 | 0.385 | 0.309 |
| 24 | 1.46E−02 | 0.487 | 0.248 |
| 25 | 1.50E−02 | 0.300 | 0.408 |
| 26 | 1.58E−02 | 0.395 | 0.318 |
| 27 | 1.68E−02 | 0.395 | 0.328 |
| 28 | 2.58E−02 | 0.383 | 0.420 |
| 29 | 2.84E−02 | 0.392 | 0.430 |

When a roughness value difference in a direction between the first optical mark surface and the second optical mark surface of each of the optical mark units is $\Delta R$, the following condition can be satisfied: 0.01 [μm]≤$\Delta R$≤3.5 [μm]. Therefore, it is favorable for providing different gloss values between the first optical mark surface and the second optical mark surface due to different roughness values thereof, such that the first optical mark surface and the second optical mark surface can be easily identified by the optical mark system. Since a surface may have different roughness in different directions by a cutting process performed thereon, roughness values of the surface measured in different directions would be different. Thus, different roughness values of the first optical mark surface and the second optical mark surface can be measured in the same direction by cutting processes in different directions respectively performed thereon, which providing different gloss values in the same direction. In this specification, the roughness value refers to the roughness parameter "Ra" (arithmetical mean deviation of the assessed profile), unless it is particularly defined.

When a height difference in a direction parallel to the optical axis between the first optical mark surface and the second optical mark surface of each of the plurality of optical mark units is $\Delta H$, the following condition can be satisfied: 0.001 [mm]≤$\Delta H$≤0.1 [mm]. Therefore, it is favorable for further guiding the flow of the curable liquid to the lower level optical mark surface so as to increase the dispensing identification effect; and it is also favorable for estimating the current dispensing amount of the curable liquid through the proportion of the optical mark units covered by the curable liquid. Please refer to FIG. 3, which shows a schematic view of $\Delta H$ according to the 1st embodiment of the present disclosure.

When an angle between the first optical mark surface and the second optical mark surface of each of the optical mark units is $\Phi$, the following condition can be satisfied: 5 [deg.]≤$\Phi$≤75 [deg.]. Therefore, it is favorable for providing different gloss values by different light reflection directions. Please refer to FIG. 8, which shows a schematic view of $\Phi$ according to the 1st embodiment of the present disclosure.

One of the plurality of optical elements can be in physical contact with the lens barrel in a direction perpendicular to the optical axis, and a groove can be formed between the one of the plurality of optical elements and the lens barrel. The optical mark structure can be located in the groove, and the curable liquid can be accommodated in the groove. Part of the one of the plurality of optical elements can be fixed to the lens barrel while the curable liquid is cured. Therefore, it is favorable for ensuring the flow direction of the curable liquid by the groove; and it is also favorable for ensuring the thickness for assembly in a direction parallel to the optical axis would not be affected by the cured curable liquid. Please refer to FIG. 6, which shows the groove GV located between the third optical element 113 and the lens barrel 12 of the imaging lens system 1 according to the 1st embodiment of the present disclosure, the optical mark structure 13c is located in the groove GV, and the curable liquid 14c is accommodated in the groove GV.

According to the present disclosure, the imaging lens system can further include a counterpart optical mark structure disposed on one of the optical elements. The counterpart optical mark structure includes a plurality of counterpart optical mark units disposed corresponding to the optical mark units of the optical mark structure. Therefore, it is favorable for further detecting the distribution of the curable liquid on the optical element by disposing the optical mark units and the counterpart optical mark units respectively on the lens barrel and the optical element so as to prevent affecting image quality of the optical element caused by the curable liquid spilled in a direction parallel to the optical axis. Moreover, the optical mark units and the counterpart optical mark units can be disposed at two opposite sides of the above-mentioned groove. Please refer to FIG. 8, which shows the counterpart optical mark structure 19 disposed on the fourth optical element 114 of the imaging lens system 1 according to the 1st embodiment of the present disclosure, and the counterpart optical mark units 190 of the counterpart optical mark structure 19 and the optical mark units 130d of the optical mark structure 13d disposed on the lens barrel 12 are disposed in a manner that an inclined surface corresponds to a horizontal surface.

The optical mark units can be arranged along a direction away from the optical axis, and the optical mark structure can form a mesh pattern. Therefore, it is favorable for distributing the optical mark units along the circumference direction and a radial direction so as to form a mesh pattern, such that the optical mark structure can be easily identified by the optical mark system. Please refer to FIG. 2 to FIG. 4, which show the optical mark units 130a of the optical mark structure 13a according to the 1st embodiment of the present disclosure, and the optical mark units 130a are arranged along the circumference direction DCF and a direction away from the optical axis 101 so as to form a mesh pattern.

Each of the optical mark units can further include a recessed structure, and the first optical mark surface and the recessed structure of each of the plurality of optical mark units are arranged side by side. Therefore, it is favorable for providing a gloss value of the recessed structure different from that of the adjacent first optical mark surface since light cannot be easily reflected in the recessed structure, thereby the optical mark structure can be identified by the optical mark system. Moreover, the curable liquid can be accommodated in the recessed structure. Moreover, a projection of the recessed structure on the reference surface perpendicular to the optical axis in each of the optical mark units defines an equivalent optical mark surface. When a ratio of an area of the equivalent optical mark surface to a projection area of each of the optical mark units on the reference surface is AR, the following condition can be satisfied: 0.2≤AR≤0.8. Moreover, the following condition can also be satisfied: 0.25≤AR≤0.75. Please refer to FIG. 17 and FIG. 20, which show the recessed structure 339o of the optical mark units 330o of the imaging lens system 3 according to the 3rd embodiment of the present disclosure, and the area range of the recessed structure 339o defines the equivalent optical mark surface EOIS.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
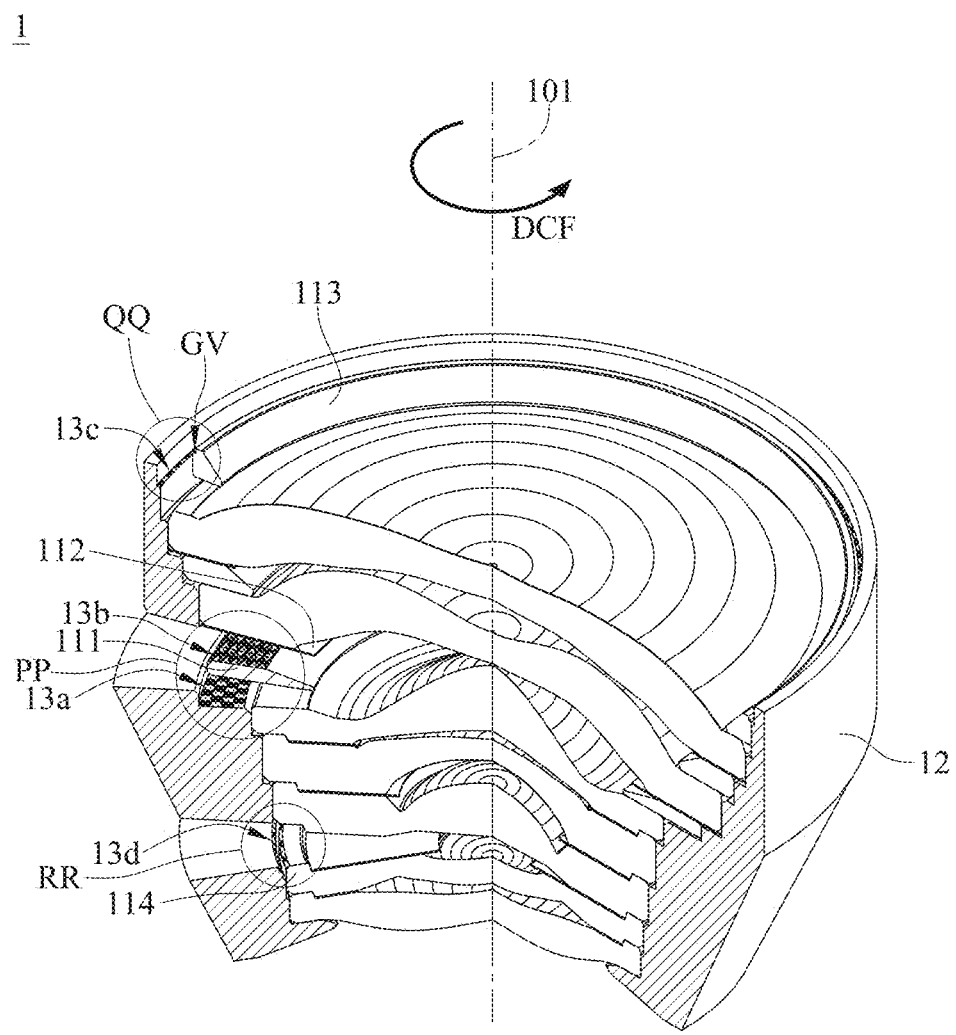
FIG. 2 is a perspective view of the sectioned imaging lens system of FIG. 1.
Figure 3:
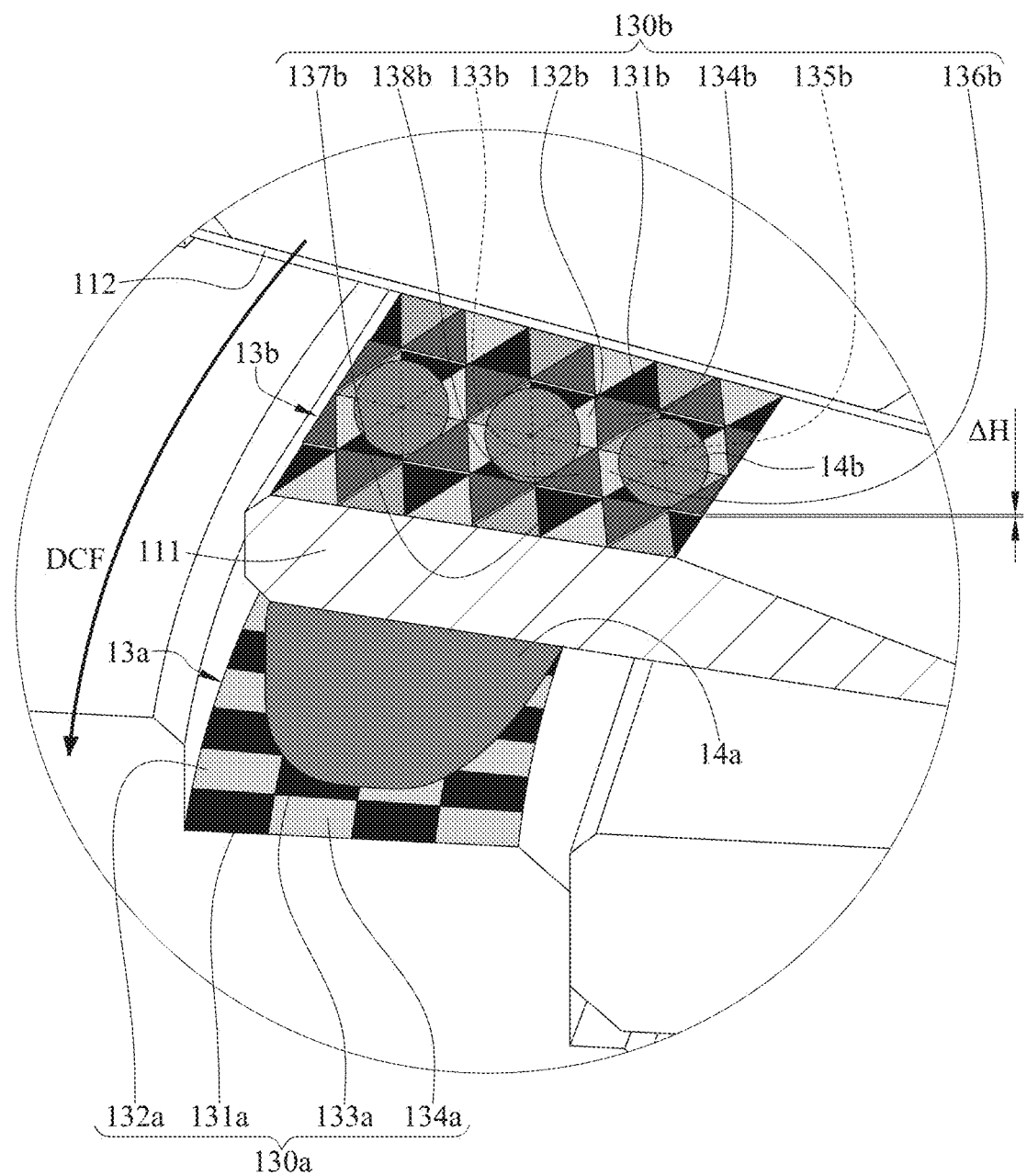
FIG. 3 is an enlarged view showing curable liquids are disposed on optical mark structures of the PP region of the imaging lens system of FIG. 2.
Figure 4:
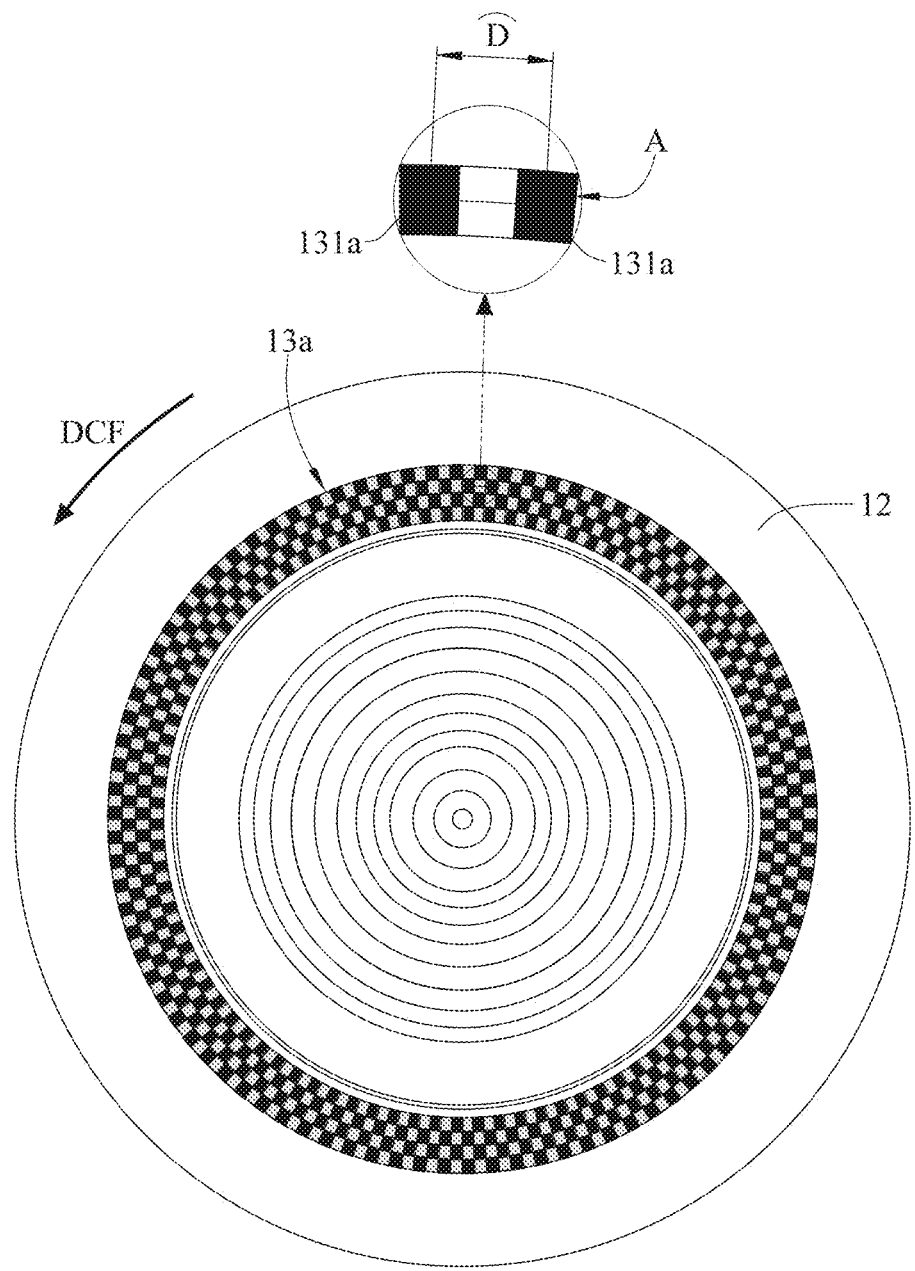
FIG. 4 is a cross-sectional view of the imaging lens system along line W-W in FIG. 1.
Figure 5:
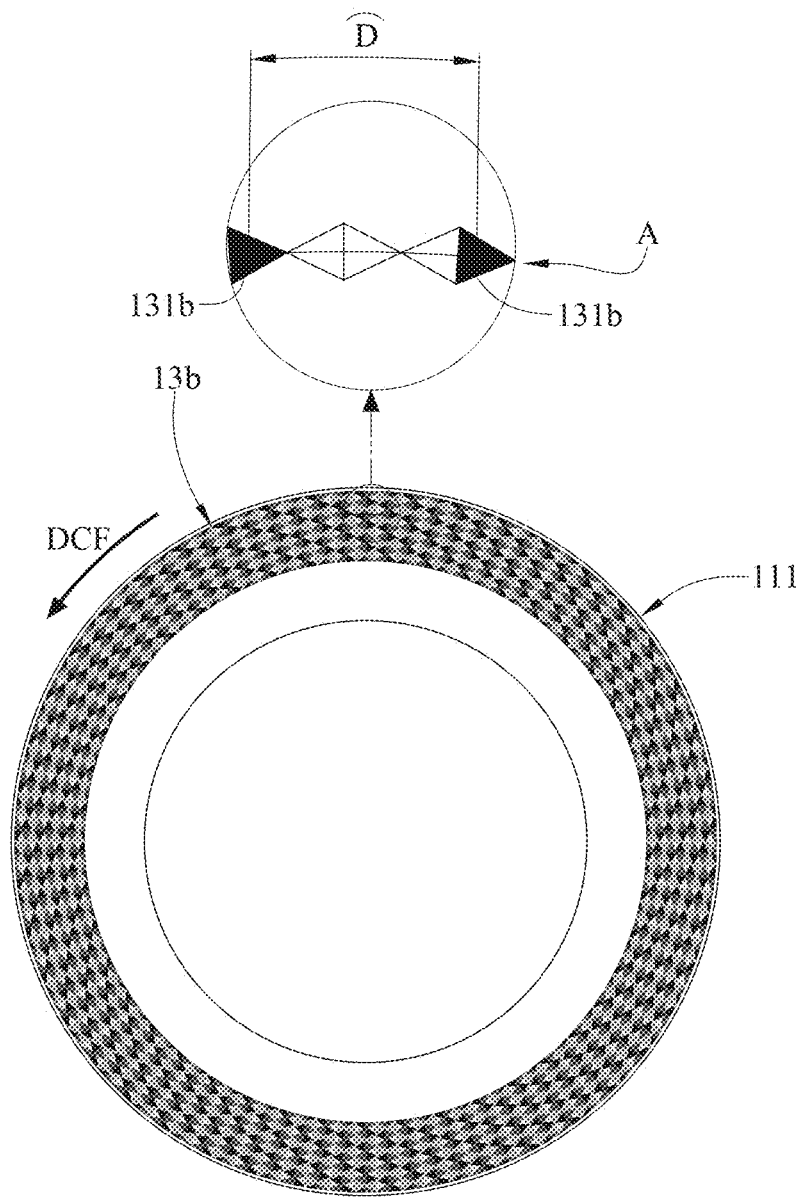
FIG. 5 is a cross-sectional view of the imaging lens system along line X-X in FIG. 1.
Figure 6:
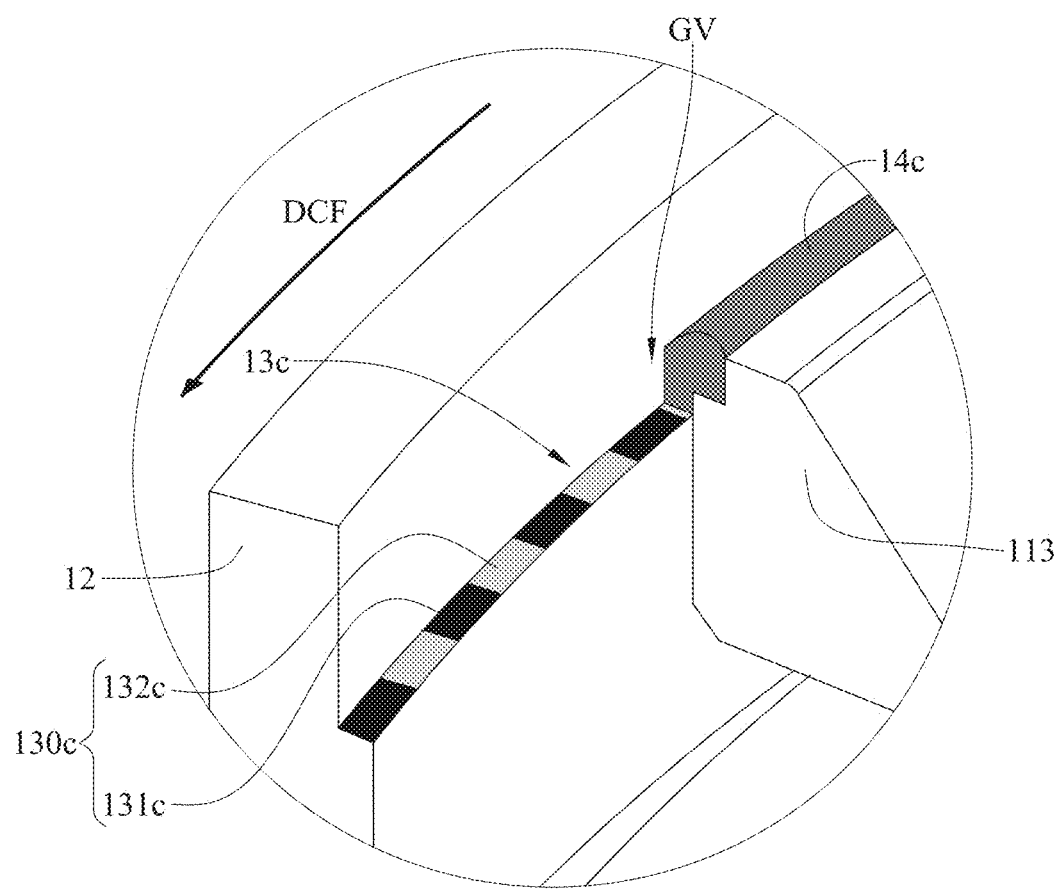
FIG. 6 is an enlarged view showing a curable liquid is disposed on an optical mark structure of the QQ region of the imaging lens system of FIG. 2.
Figure 7:
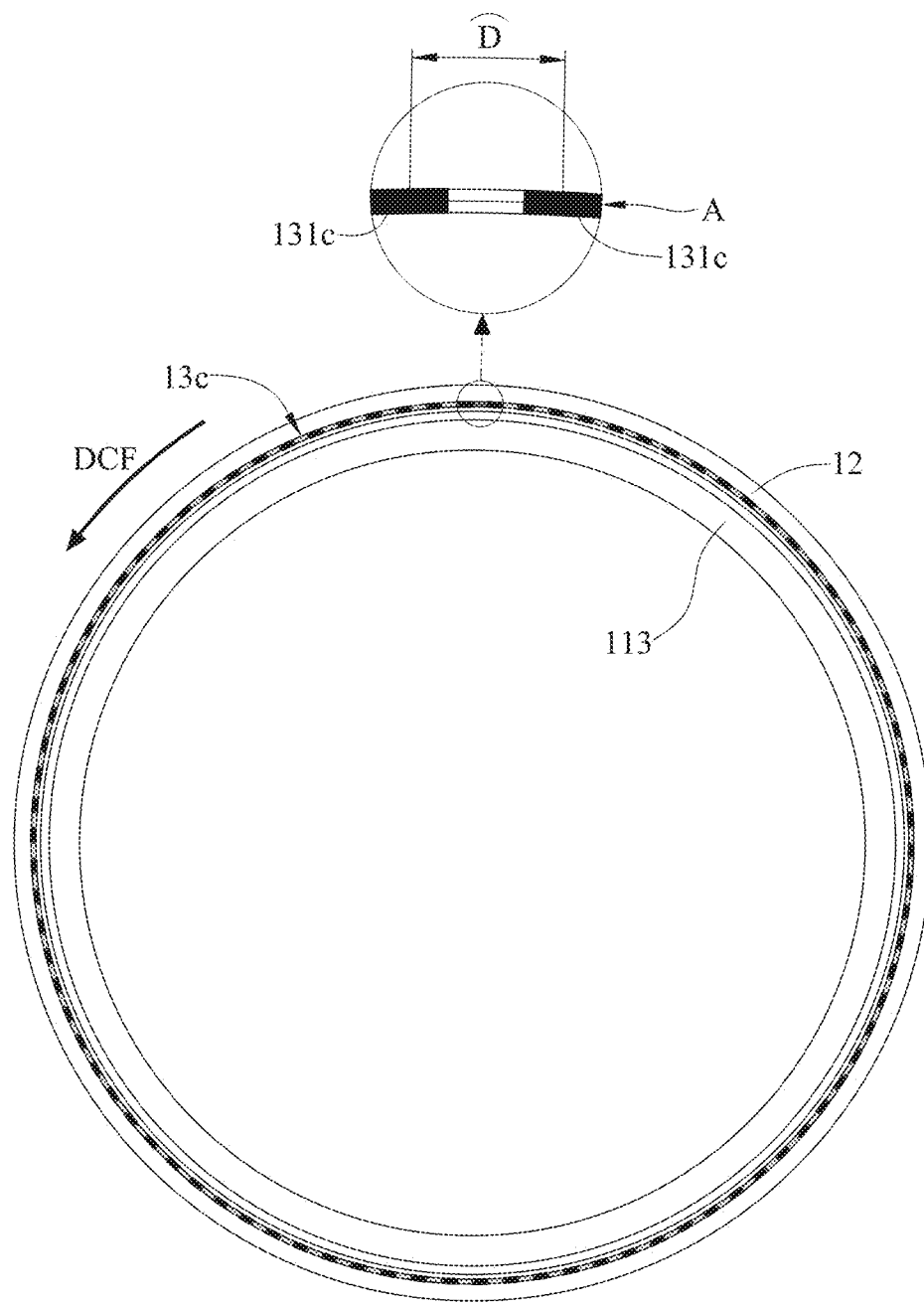
FIG. 7 is a cross-sectional view of the imaging lens system along line Y-Y in FIG. 1.
Figure 8:
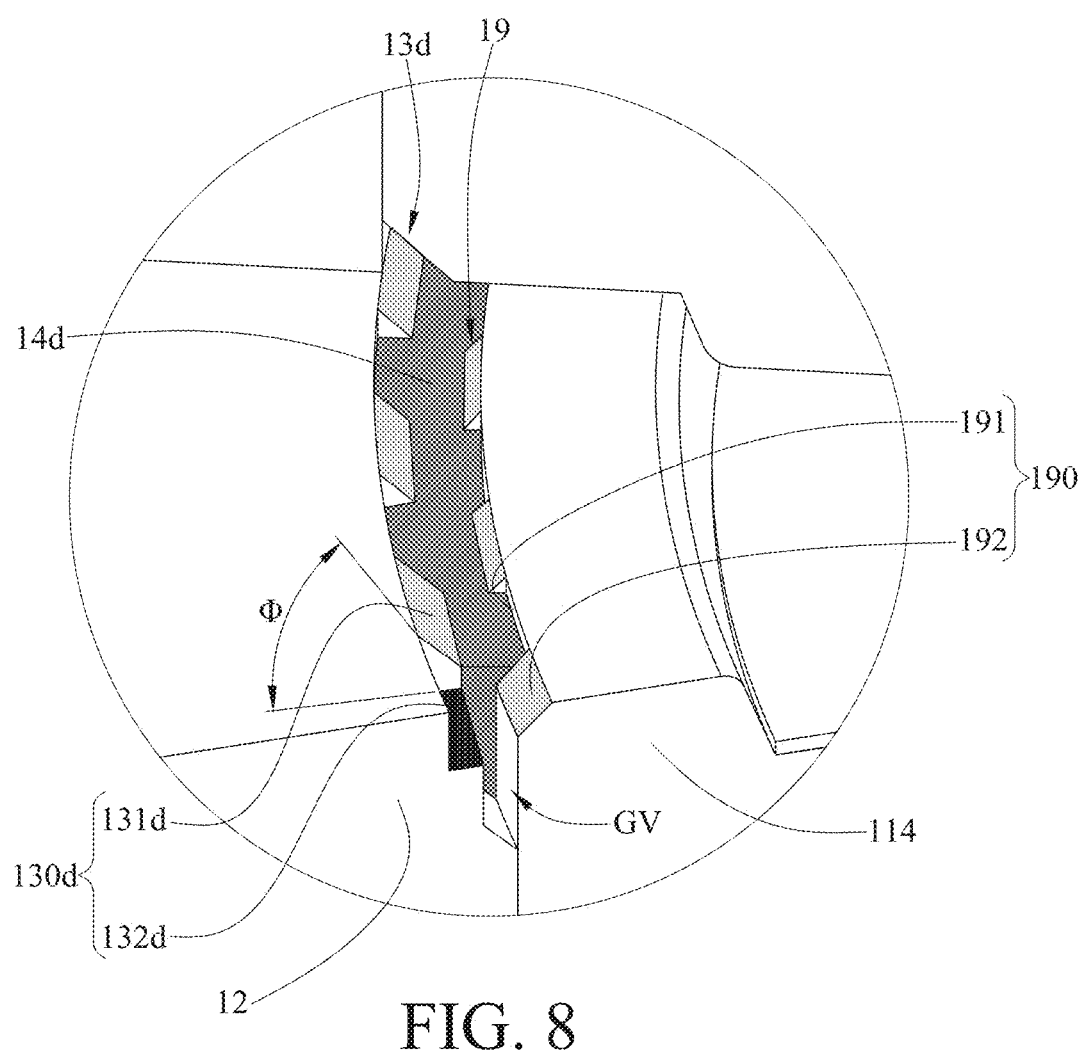
FIG. 8 is an enlarged view showing a curable liquid is disposed on an optical mark structure of the RR region of the imaging lens system of FIG. 2.
Figure 9:
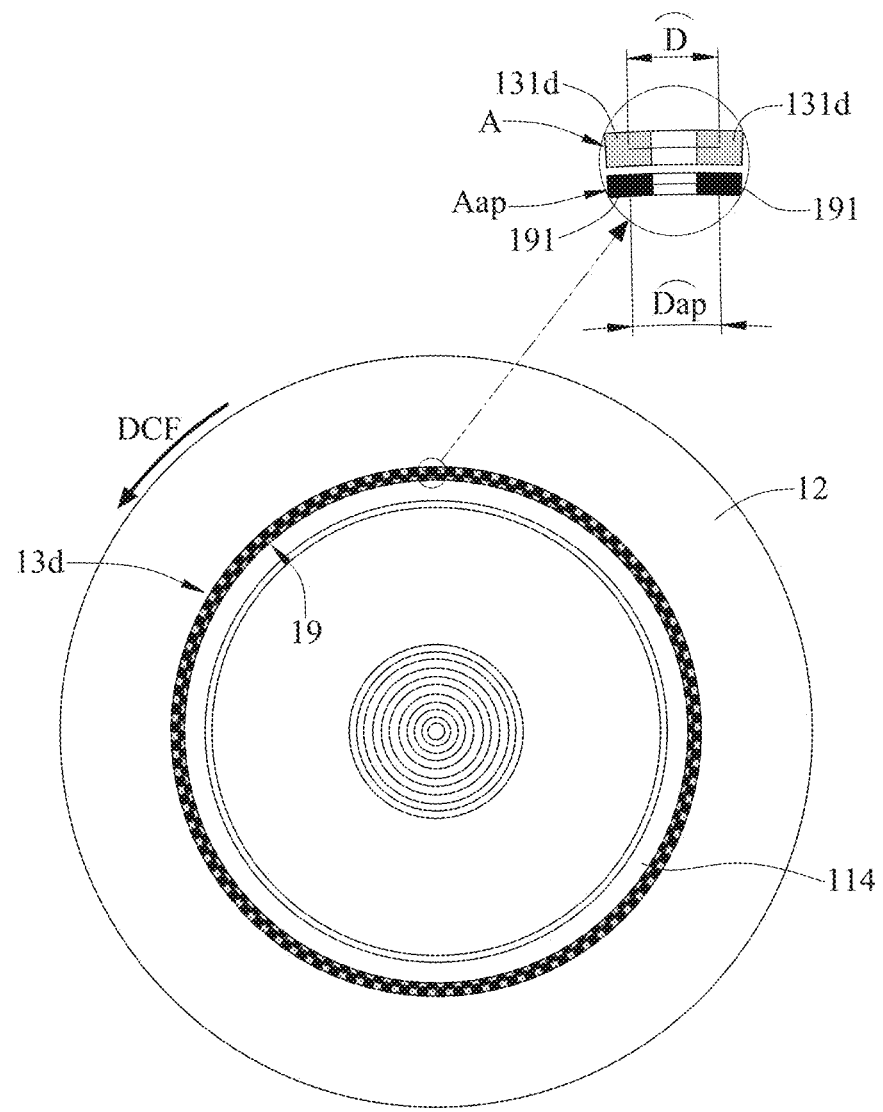
FIG. 9 is a cross-sectional view of the imaging lens system along line Z-Z in FIG. 1.

Please refer to FIG. 1 to FIG. 9, wherein FIG. 1 is a cross-sectional view of an imaging lens system according to the 1st embodiment of the present disclosure, FIG. 2 is a perspective view of the sectioned imaging lens system of FIG. 1, FIG. 3 is an enlarged view showing curable liquids are disposed on optical mark structures of the PP region of the imaging lens system of FIG. 2, FIG. 4 is a cross-sectional view of the imaging lens system along line W-W in FIG. 1, FIG. 5 is a cross-sectional view of the imaging lens system along line X-X in FIG. 1, FIG. 6 is an enlarged view showing a curable liquid is disposed on an optical mark structure of the QQ region of the imaging lens system of FIG. 2, FIG. 7 is a cross-sectional view of the imaging lens system along line Y-Y in FIG. 1, FIG. 8 is an enlarged view showing a curable liquid is disposed on an optical mark structure of the RR region of the imaging lens system of FIG. 2, and FIG. 9 is a cross-sectional view of the imaging lens system along line Z-Z in FIG. 1.

In this embodiment, an imaging lens system 1 is provided. The imaging lens system 1 has an optical axis 101 and an image surface 102. The imaging lens system 1 includes a plurality of optical elements 11 and a lens barrel 12. The optical elements 11 are arranged along the optical axis 101. The lens barrel 12 surrounds the optical axis 101, and the optical elements 11 are accommodated in the lens barrel 12.

Specifically, the optical elements 11 includes a first optical element 111, a second optical element 112, a third optical element 113 and a fourth optical element 114. In detail, the first optical element 111 is a spacer, the second optical element 112 is a light-blocking element, the third optical element 113 is a retainer, and the fourth optical element 114 is a lens element. The fourth optical element 114, the first optical element 111, the second optical element 112 and the third optical element 113 are arranged in order from an object side to an image side along an optical path.

The imaging lens system 1 further includes four optical mark structures 13a, 13b, 13c and 13d. The optical mark structure 13a is disposed on the lens barrel 12, is perpendicular to the optical axis 101 and faces the first optical element 111. The optical mark structure 13b is disposed on the first optical element 111, is perpendicular to the optical axis 101 and faces the second optical element 112, and at least part of the optical mark structure 13b is covered by the second optical element 112 in a direction parallel to the optical axis 101. The optical mark structure 13c is disposed on the lens barrel 12, is located in a groove GV formed between the lens barrel 12 and the third optical element 113, is perpendicular to the optical axis 101 and faces the image surface 102. The optical mark structure 13d is disposed on the lens barrel 12 and located in a groove GV formed between the lens barrel 12 and the fourth optical element 114.

The optical mark structure 13a is a two-dimensional optical mark structure and includes a plurality of optical mark units 130a. The optical mark structure 13b is a two-dimensional optical mark structure and includes a plurality of optical mark units 130b. The optical mark structure 13c is a two-dimensional optical mark structure and includes a plurality of optical mark units 130c. The optical mark structure 13d is a three-dimensional optical mark structure and includes a plurality of optical mark units 130d.

Each of the optical mark units 130a includes a first optical mark surface 131a, a second optical mark surface 132a, a third optical mark surface 133a and a fourth optical mark surface 134a. The first optical mark surface 131a and the second optical mark surface 132a are arranged side by side in a circumference direction DCF that surrounds the optical axis 101. The third optical mark surface 133a and the fourth optical mark surface 134a are arranged side by side in the circumference direction DCF and are located closer to the optical axis 101 than the first optical mark surface 131a and the second optical mark surface 132a. That is, in each optical mark unit 130a, the first optical mark surface 131a, the second optical mark surface 132a, the third optical mark surface 133a and the fourth optical mark surface 134a can be regarded as a 2×2 matrix. The optical mark units 130a are arranged side by side along the circumference direction DCF and a direction away from the optical axis 101, such that the optical mark structure 13a forms a mesh pattern.

As shown in FIG. 4, when a projection area of one of the first optical mark surfaces 131a on a reference surface perpendicular to the optical axis 101 is A, the following condition is satisfied: $A = 2.2 \times 10E-2$ [mm$^2$].

As shown in FIG. 4, when a distance along the circumference direction DCF between center points of two of the first optical mark surfaces 131a adjacent in the circumference direction DCF is D, the following condition is satisfied: $D = 0.273$ [mm]. In this embodiment, two of the first optical mark surfaces 131a adjacent in the circumference direction DCF refer to two adjacent first optical mark surfaces 131a that are substantially equidistant from the optical axis 101.

When the projection area of one of the first optical mark surfaces 131a on the reference surface perpendicular to the optical axis 101 is A, and the distance along the circumference direction DCF between center points of two of the first optical mark surfaces 131a adjacent in the circumference direction DCF is D, the following condition is satisfied: $\sqrt{(A)}/D = 0.543$.

The first optical mark surfaces 131a and the second optical mark surfaces 132a have different gloss values in a direction, the first optical mark surfaces 131a and the third optical mark surfaces 133a have the same gloss value in a direction, and the second optical mark surfaces 132a and the fourth optical mark surfaces 134a have the same gloss value in a direction.

When an angle between an observation direction and the optical mark structure 13a is θ, the following condition is satisfied: 50 [deg.] ≤ θ ≤ 90 [deg.]. When a gloss value difference in the observation direction between the first optical mark surface 131a and the second optical mark surface 132a of each of the plurality of optical mark units 130a is ΔG, the following condition is satisfied: 15 [GU] ≤ ΔG ≤ 50 [GU].

The first optical mark surfaces 131a have an arithmetical mean roughness Ra in a direction smaller than 0.1 micrometers (μm), and the second optical mark surfaces 132a have an arithmetical mean roughness Ra in the direction ranging between 0.3 and 0.5 micrometers. When a roughness value difference in the direction between the first optical mark surface 131a and the second optical mark surface 132a of each of the plurality of optical mark units 130a is ΔR, the following condition is satisfied: 0.2 [μm]≤ΔR≤0.5 [μm].

The imaging lens system 1 further includes a curable liquid 14a disposed on the optical mark structure 13a. The curable liquid 14a is in physical contact with the first optical mark surfaces 131a, the second optical mark surfaces 132a, the third optical mark surfaces 133a and the fourth optical mark surfaces 134a of several of the plurality of optical mark units 130a. The first optical element 111 is fixed to the lens barrel 12 in a direction perpendicular to the optical mark structure 13a while the curable liquid 14a is cured.

Each of the optical mark units 130b includes a first optical mark surface 131b, a second optical mark surface 132b, a third optical mark surface 133b, a fourth optical mark surface 134b, a fifth optical mark surface 135b, a sixth optical mark surface 136b, a seventh optical mark surface 137b and an eighth optical mark surface 138b. The first optical mark surface 131b, the fourth optical mark surface 134b, the eighth optical mark surface 138b and the seventh optical mark surface 137b are sequentially arranged side by side in a circumference direction DCF that surrounds the optical axis 101. The second optical mark surface 132b and the third optical mark surface 133b are arranged side by side in the circumference direction DCF and are located farther away from the optical axis 101 than the first optical mark surface 131b, the fourth optical mark surface 134b, the eighth optical mark surface 138b and the seventh optical mark surface 137b. The fifth optical mark surface 135b and the sixth optical mark surface 136b are arranged side by side in the circumference direction DCF and are located closer to the optical axis 101 than the first optical mark surface 131b, the fourth optical mark surface 134b, the eighth optical mark surface 138b and the seventh optical mark surface 137b. In each optical mark unit 130b, the first optical mark surface 131b, the second optical mark surface 132b, the third optical mark surface 133b, the fourth optical mark surface 134b, the fifth optical mark surface 135b, the sixth optical mark surface 136b, the seventh optical mark surface 137b and the eighth optical mark surface 138b can be regarded as a diamond (or trapezoid) pattern formed by eight triangles. The optical mark units 130b are arranged side by side along the circumference direction DCF and a direction away from the optical axis 101, such that the optical mark structure 13b forms a mesh pattern. As shown in FIG. 5, the optical mark structure 13b further includes a plurality of ½ optical mark units (not numbered) located at the inner and outer rim positions, and each ½ optical mark unit has an area approximately half of the area of the optical mark unit 130b. Accordingly, the optical mark structure 13b can form a ring pattern as shown in FIG. 5.

As shown in FIG. 5, when a projection area of one of the first optical mark surfaces 131b on a reference surface perpendicular to the optical axis 101 is A, the following condition is satisfied: $A=8.8\times10E-3$ [mm$^2$]. In addition, a projection area of a ½ first optical mark surface (not numbered) of one of the ½ optical mark units on the reference surface perpendicular to the optical axis 101 is $3.8\times10E-3$ square millimeters (mm$^2$).

As shown in FIG. 5, when a distance along the circumference direction DCF between center points of two of the first optical mark surfaces 131b adjacent in the circumference direction DCF is D, the following condition is satisfied: $D=0.526$ [mm]. In this embodiment, two of the first optical mark surfaces 131b adjacent in the circumference direction DCF refer to two adjacent first optical mark surfaces 131b that are substantially equidistant from the optical axis 101.

When the projection area of one of the first optical mark surfaces 131b on the reference surface perpendicular to the optical axis 101 is A, and the distance along the circumference direction DCF between center points of two of the first optical mark surfaces 131b adjacent in the circumference direction DCF is D, the following condition is satisfied: $\sqrt{(A)}/D=0.178$.

The first optical mark surfaces 131b, the second optical mark surfaces 132b, the third optical mark surfaces 133b and the fourth optical mark surfaces 134b have different gloss values in a direction caused by the microstructures in different directions thereon, the first optical mark surfaces 131b and the seventh optical mark surfaces 137b have the same gloss value in a direction, the second optical mark surfaces 132b and the sixth optical mark surfaces 136b have the same gloss value in a direction, the third optical mark surfaces 133b and the fifth optical mark surfaces 135b have the same gloss value in a direction, and the fourth optical mark surfaces 134b and the eighth optical mark surfaces 138b have the same gloss value in a direction.

When an angle between an observation direction and the optical mark structure 13b is θ, the following condition is satisfied: 50 [deg.]≤θ≤90 [deg.]. When a gloss value difference in the observation direction between the first optical mark surface 131b and the second optical mark surface 132b of each of the plurality of optical mark units 130b is ΔG, the following condition is satisfied: 15 [GU]≤ΔG≤50 [GU].

When a height difference in a direction parallel to the optical axis 101 between the fourth and eighth optical mark surfaces 134b and 138b and the other optical mark surfaces (the first, second, third, fifth, sixth and seventh optical mark surfaces 131b, 132b, 133b, 135b, 136b and 137b) of each of the plurality of optical mark units 130b is ΔH, the following condition is satisfied: ΔH=0.005 [mm].

The imaging lens system 1 further includes a curable liquid 14b disposed on the optical mark structure 13b. The curable liquid 14b is in physical contact with the first optical mark surfaces 131b, the second optical mark surfaces 132b, the third optical mark surfaces 133b, the fifth optical mark surfaces 135b, the sixth optical mark surfaces 136b and the seventh optical mark surfaces 137b of several of the plurality of optical mark units 130b. It is noted that when the curable liquid 14b is in physical contact with the fourth optical mark surfaces 134b or the eighth optical mark surfaces 138b in the adhesive dispensing process, the curable liquid 14b would flow to the other optical mark surfaces (the first, second, third, fifth, sixth and seventh optical mark surfaces 131b, 132b, 133b, 135b, 136b and 137b) due to the above-mentioned height difference ΔH. The first optical element 111 is fixed to the second optical element 112 in a direction perpendicular to the optical mark structure 13b while the curable liquid 14b is cured.

Each of the optical mark units 130c includes a first optical mark surface 131c and a second optical mark surface 132c. The first optical mark surface 131c and the second optical mark surface 132c are arranged side by side in a circumference direction DCF that surrounds the optical axis 101. The optical mark units 130c are arranged side by side along the circumference direction DCF.

When a projection area of each of the first optical mark surfaces 131c on a reference surface perpendicular to the optical axis 101 is A, the following condition is satisfied: $A=9.9\times10E-3$ [mm$^2$].

When a distance along the circumference direction DCF between center points of each two of the first optical mark surfaces 131c adjacent in the circumference direction DCF is D, the following condition is satisfied: D=0.361 [mm].

When the projection area of each of the first optical mark surfaces 131c on the reference surface perpendicular to the optical axis 101 is A, and the distance along the circumference direction DCF between center points of each two of the first optical mark surfaces 131c adjacent in the circumference direction DCF is D, the following condition is satisfied: $\sqrt{(A)}/D=0.276$.

The first optical mark surfaces 131c and the second optical mark surfaces 132c have different gloss values in a direction.

When an angle between an observation direction and the optical mark structure 13c is θ, the following condition is satisfied: 50 [deg.]≤θ≤90 [deg.]. When a gloss value difference in the observation direction between the first optical mark surface 131c and the second optical mark surface 132c of each of the plurality of optical mark units 130c is ΔG, the following condition is satisfied: 15 [GU]≤ΔG≤50 [GU]. Specifically, the gloss value of the first optical mark surfaces 131c in the observation direction ranges between 20 and 30 gloss units, and the gloss value of the second optical mark surfaces 132c in the observation direction is smaller than 5 gloss units.

The first optical mark surfaces 131c have an arithmetical mean roughness Ra in a direction smaller than 0.1 micrometers, and the second optical mark surfaces 132c have an arithmetical mean roughness Ra in the direction ranging between 0.3 and 0.5 micrometers. When a roughness value difference in the direction between the first optical mark surface 131c and the second optical mark surface 132c of each of the plurality of optical mark units 130c is ΔR, the following condition is satisfied: 0.2 [μm]≤ΔR≤0.5 [μm].

The imaging lens system 1 further includes a curable liquid 14c disposed on the optical mark structure 13c in the groove GV. The curable liquid 14c is in physical contact with the first optical mark surfaces 131c and the second optical mark surfaces 132c of several of the plurality of optical mark units 130c. The third optical element 113 is fixed to the lens barrel 12 while the curable liquid 14c is cured.

Each of the optical mark units 130d includes a first optical mark surface 131d and a second optical mark surface 132d. The first optical mark surface 131d and the second optical mark surface 132d are arranged side by side in a circumference direction DCF that surrounds the optical axis 101. The optical mark units 130d are arranged side by side along the circumference direction DCF.

When a projection area of each of the first optical mark surfaces 131d on a reference surface perpendicular to the optical axis 101 is A, the following condition is satisfied: $A=8.5\times10E-3$ [mm$^2$].

When a distance along the circumference direction DCF between center points of each two of the first optical mark surfaces 131d adjacent in the circumference direction DCF is D, the following condition is satisfied: D=0.2136 [mm].

When the projection area of each of the first optical mark surfaces 131d on the reference surface perpendicular to the optical axis 101 is A, and the distance along the circumference direction DCF between center points of each two of the first optical mark surfaces 131d adjacent in the circumference direction DCF is D, the following condition is satisfied: $\sqrt{(A)}/D=0.432$.

The first optical mark surfaces 131d and the second optical mark surfaces 132d have different gloss values in a direction.

When an angle between an observation direction and the optical mark structure 13d is θ, the following condition is satisfied: 50 [deg.]≤θ≤90 [deg.]. When a gloss value difference in the observation direction between the first optical mark surface 131d and the second optical mark surface 132d of each of the plurality of optical mark units 130d is ΔG, the following condition is satisfied: 15 [GU]≤ΔG≤50 [GU].

When an angle between the first optical mark surface 131d and the second optical mark surface 132d of each of the plurality of optical mark units 130d is Φ, the following condition is satisfied: Φ=45 [deg.].

The imaging lens system 1 further includes a counterpart optical mark structure 19 disposed on the fourth optical element 114. The counterpart optical mark structure 19 includes a plurality of counterpart optical mark units 190 disposed corresponding to the optical mark units 130d of the optical mark structure 13d. Specifically, each of the counterpart optical mark units 190 includes a first counterpart optical mark surface 191 and a second counterpart optical mark surface 192 that is at an angle of 45 degrees with respect to the first counterpart optical mark surface 191. The first counterpart optical mark surfaces 191 and the first optical mark surfaces 131d are disposed at two opposite sides of the groove GV in a direction perpendicular to the optical axis 101, and the second counterpart optical mark surfaces 192 and the second optical mark surfaces 132d are disposed at two opposite sides of the groove GV in a direction perpendicular to the optical axis 101. As shown in FIG. 8, the counterpart optical mark units 190 of the counterpart optical mark structure 19 and the optical mark units 130d of the optical mark structure 13d are disposed in a manner that an inclined surface corresponds to a horizontal surface.

When a projection area of each of the first counterpart optical mark surfaces 191 on the reference surface perpendicular to the optical axis 101 is Aap, the following condition is satisfied: $Aap=5.2\times10E-3$ [mm$^2$].

When a distance along the circumference direction DCF between center points of two of the first counterpart optical mark surfaces 191 adjacent in the circumference direction DCF is Dap, the following condition is satisfied: Dap=0.2077 [mm].

When the projection area of each of the first counterpart optical mark surfaces 191 on the reference surface perpendicular to the optical axis 101 is Aap, and the distance along the circumference direction DCF between center points of two of the first counterpart optical mark surfaces 191 adjacent in the circumference direction DCF is Dap, the following condition is satisfied: $\sqrt{(Aap)}/Dap=0.347$.

The first counterpart optical mark surfaces 191 and the second counterpart optical mark surfaces 192 have different gloss values that are respectively the same as the gloss values of the second optical mark surfaces 132d and the first optical mark surfaces 131d, and an explanation in this regard will not be provided again.

The imaging lens system 1 further includes a curable liquid 14d disposed on the optical mark structure 13d and the counterpart optical mark structure 19 in the groove GV. The curable liquid 14d is in physical contact with part of the first optical mark surfaces 131d and the second optical mark surfaces 132d of several of the optical mark units 130d and the first counterpart optical mark surfaces 191 and part of the second counterpart optical mark surfaces 192 of several of the counterpart optical mark units 190. Specifically, when the groove GV is dispensed with the curable liquid 14d, the first optical mark surfaces 131d and the second counterpart optical mark surfaces 192 that are perpendicular to the optical axis 101 are covered by the curable liquid 14d, while the second optical mark surfaces 132d and the first counterpart optical mark surfaces 191 that are at an angle of 45 degrees with respect to the optical axis 101 are only partially covered by the curable liquid 14d. This dispensing situation can be detected by an optical mark system and represents the current dispensing amount of the curable liquid 14d is appropriate. Therefore, it is favorable for prevent the situation of insufficient adhesive or spilled adhesive. The fourth optical element 114 is fixed to the lens barrel 12 while the curable liquid 14d is cured.

2nd Embodiment

Figure 10:
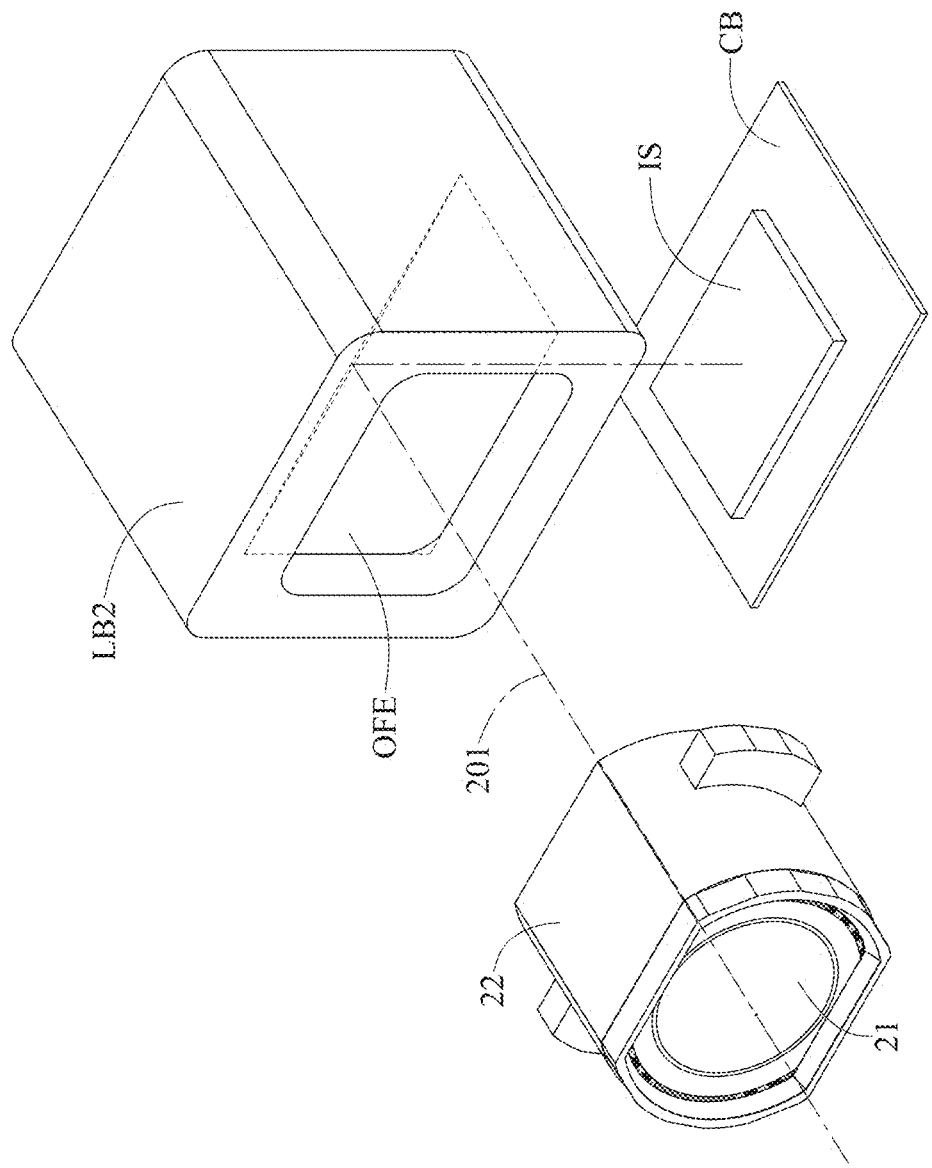
FIG. 10 is a perspective view of an imaging lens system according to the 2nd embodiment of the present disclosure.
Figure 11:
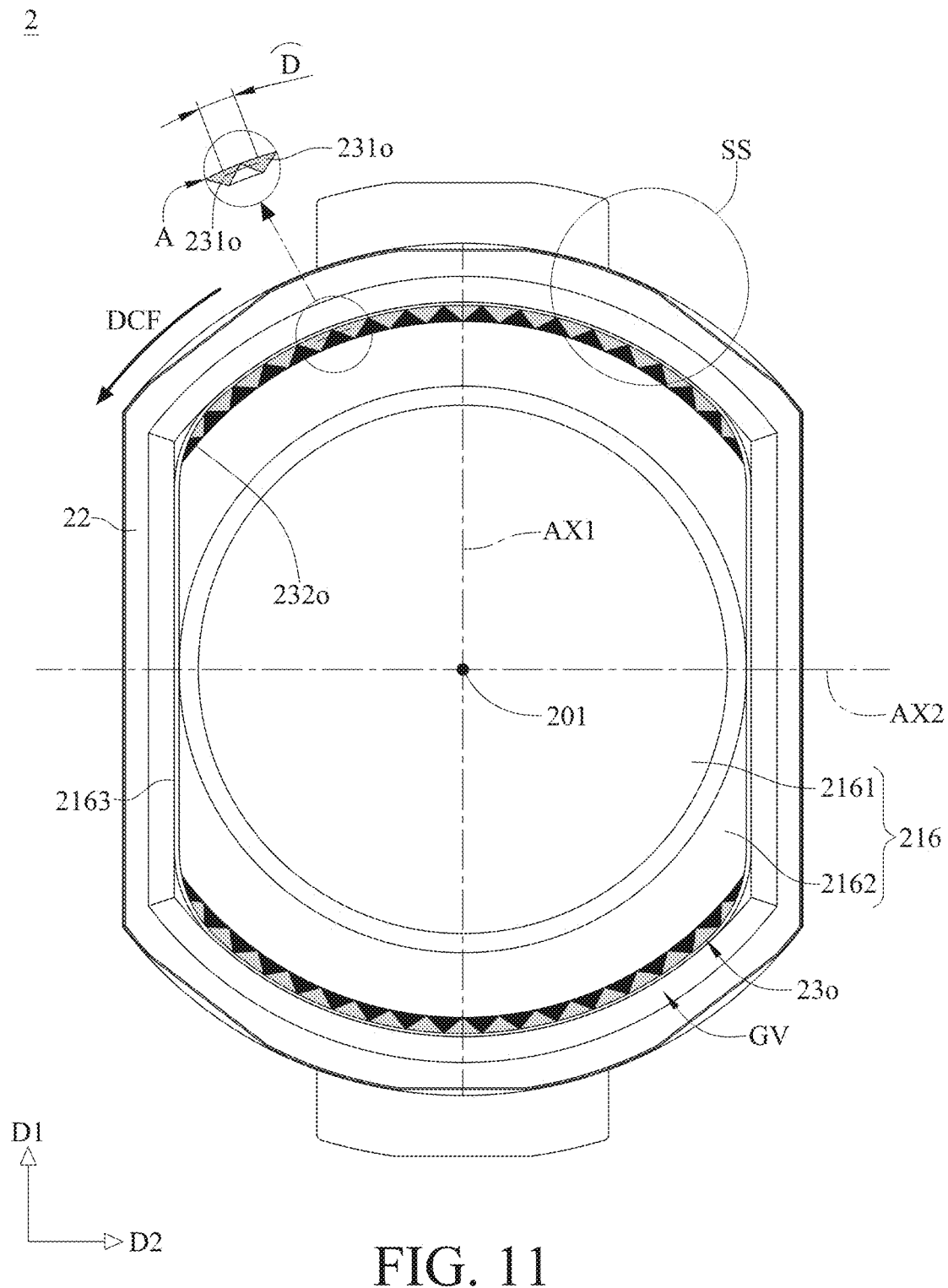
FIG. 11 is a front view of the imaging lens system of FIG. 10.
Figure 12:
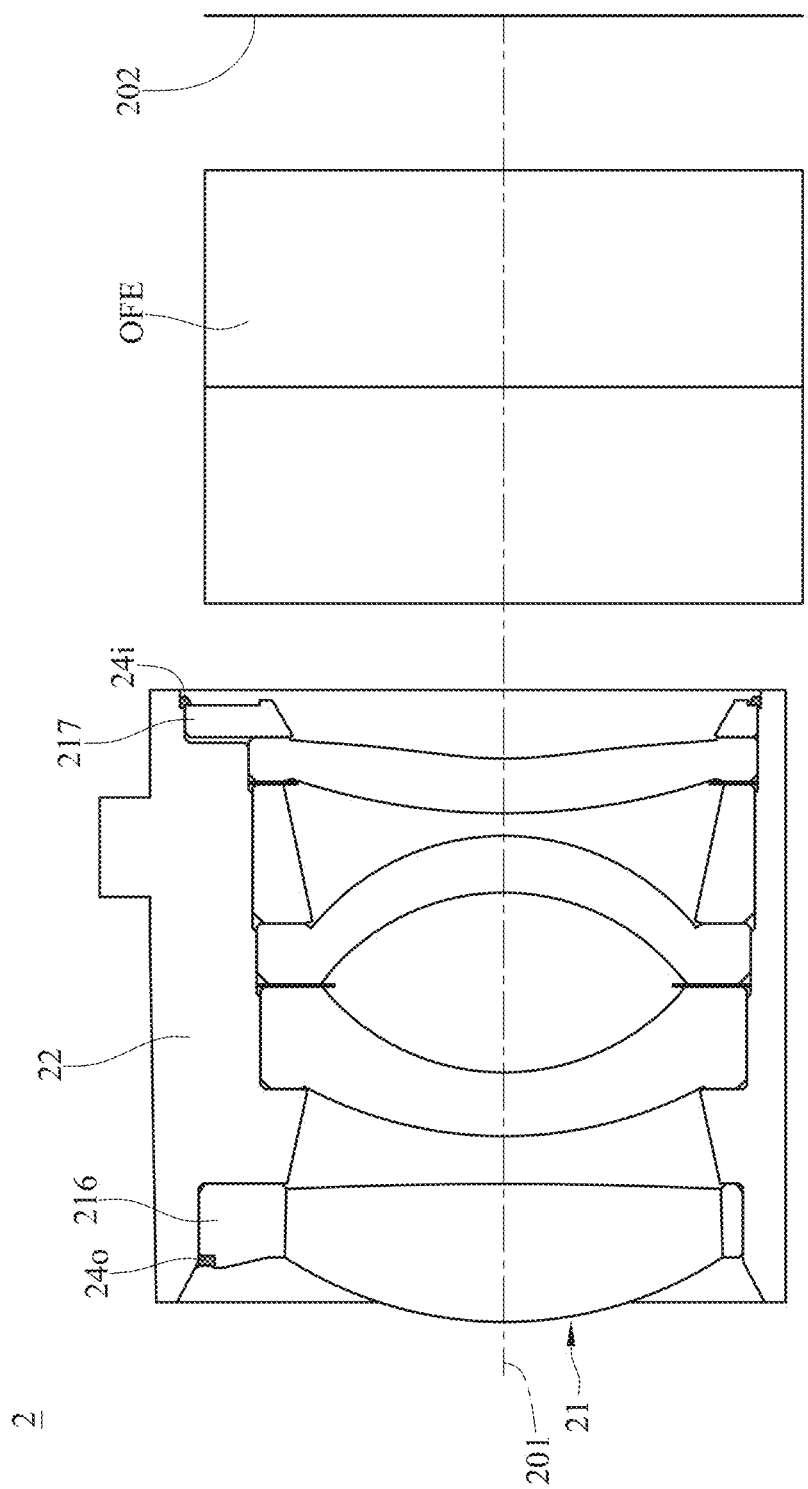
FIG. 12 is a side view of the imaging lens system of FIG. 10.
Figure 14:
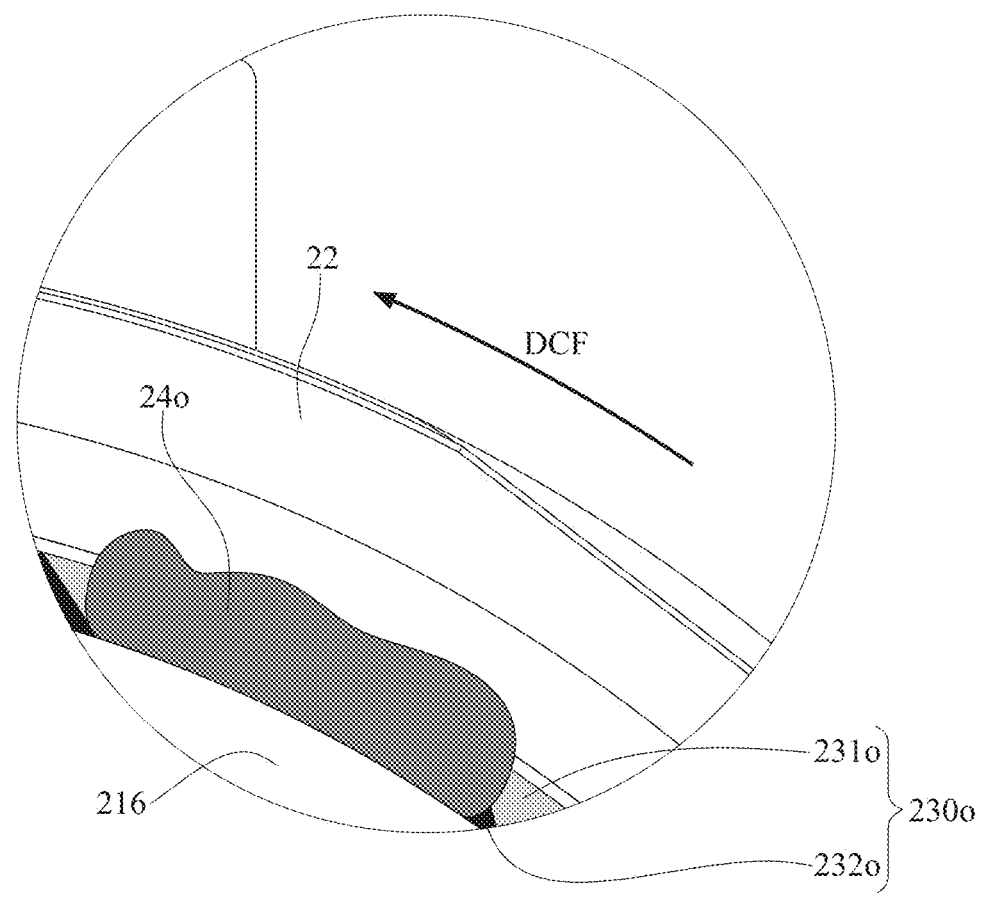
FIG. 14 is an enlarged view showing a curable liquid is disposed on an optical mark structure of the SS region of the imaging lens system of FIG. 11.
Figure 16:
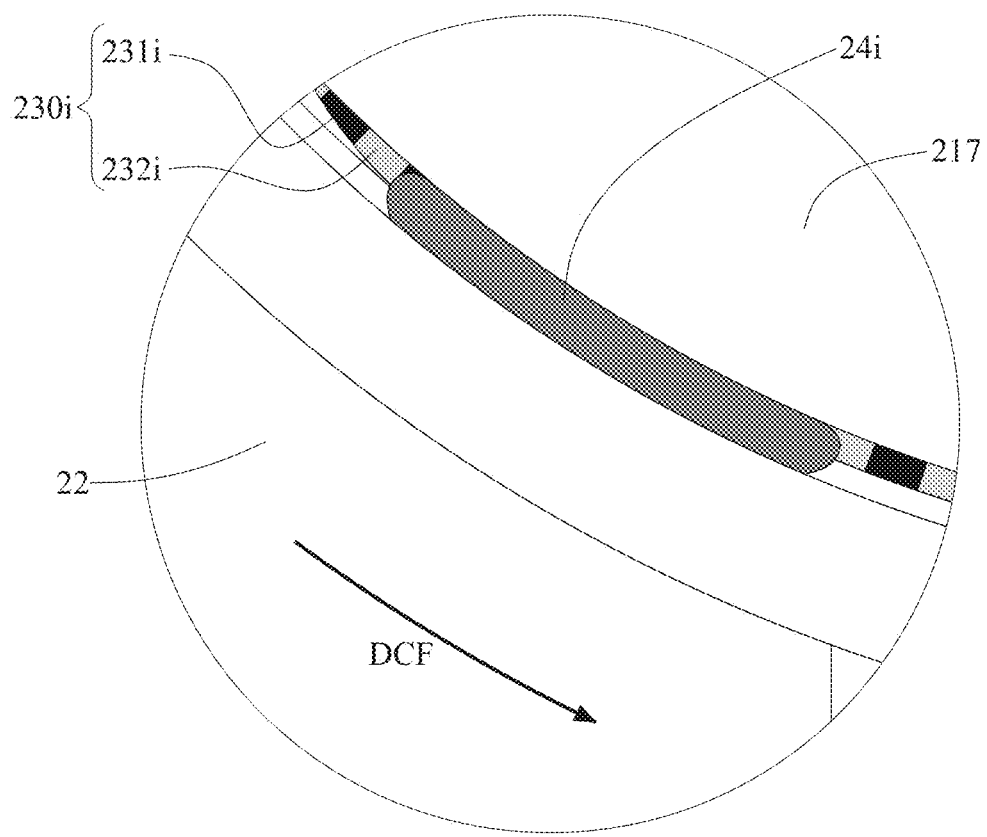
FIG. 16 is an enlarged view showing a curable liquid is disposed on an optical mark structure of the TT region of the imaging lens system of FIG. 13.

Please refer to FIG. 10 to FIG. 16, wherein FIG. 10 is a perspective view of an imaging lens system according to the 2nd embodiment of the present disclosure, FIG. 11 is a front view of the imaging lens system of FIG. 10, FIG. 12 is a side view of the imaging lens system of FIG. 10, FIG. 13 is a rear view of the imaging lens system of FIG. 10, FIG. 14 is an enlarged view showing a curable liquid is disposed on an optical mark structure of the SS region of the imaging lens system of FIG. 11, FIG. 15 is an exploded view of a lens barrel and one of optical elements viewing from an image side of the imaging lens system of FIG. 10, and FIG. 16 is an enlarged view showing a curable liquid is disposed on an optical mark structure of the TT region of the imaging lens system of FIG. 13.

In this embodiment, an imaging lens system 2 is provided. The imaging lens system 2 has an optical axis 201 and an image surface 202. The imaging lens system 2 includes a plurality of optical elements 21, a lens barrel 22 and a secondary lens barrel LB2. The optical elements 21 are arranged along the optical axis 201 and include an optical-folding element OFE. The lens barrel 22 surrounds the optical axis 201, and several of the optical elements 21 are accommodated in the lens barrel 22. The secondary lens barrel LB2 is disposed between the lens barrel 22 and the image surface 202, and the optical-folding element OFE is accommodated in the secondary lens barrel LB2. As shown in FIG. 10, the optical-folding element OFE is, for example, a prism or a mirror, and the optical axis 201 extending from an image side of the imaging lens system 2 is folded by 90 degrees through the optical-folding element OFE so as to be more flexible in space arrangement. In addition, the imaging lens system 2 is coupled with an image sensor IS and a circuit board CB. The image sensor IS is disposed on the image surface 202 and electrically connected to the circuit board CB so as to receive the imaging light information on the image surface 202 and then transmit the imaging light information to the circuit board CB. For simplicity, only FIG. 10 is illustrated for showing the folded optical axis 201, while the optical axis 201 in the other drawings of this embodiment is illustrated in a straight line.

Specifically, the optical elements 21 include an object-side optical element 216, an image-side optical element 217 and the optical-folding element OFE located at an image side of the image-side optical element 217. The optical elements 21 further include a plurality of additional optical elements (not numbered) located between the object-side optical element 216 and the image-side optical element 217. That is, the optical elements 21 include, in order from an object side to the image side along an optical path, the object-side optical element 216, the additional optical elements, the image-side optical element 217 and the optical-folding element OFE. In detail, the object-side optical element 216 is a lens element, and the image-side optical element 217 is a retainer for fixing the object-side optical element 216 and the other optical elements from the image side.

The object-side optical element 216 includes an optical part 2161 and an abutment part 2162. The optical axis 201 passes through the optical part 2161, and the optical part 2161 is made of light-passable material. The abutment part 2162 surrounds the optical part 2161 and is made of light-impassable material. The optical part 2161 and the abutment part 2162 are molded into an integral optical element by a two-shot injection molding process. The abutment part 2162 is in physical contact with the lens barrel 22 in a first direction D1 and a second direction D2. In detail, the first direction D1 is defined as a direction along a first axis AX1 and toward a position away from an intersection of the first axis AX1 and the optical axis 201, the second direction D2 is defined as a direction along a second axis AX2 and toward a position away from an intersection of the second axis AX2 and the optical axis 201, the first axis AX1 is perpendicular to the second axis AX2, and each of the first axis AX1 and the second axis AX2 is perpendicular to the optical axis 201. The abutment part 2162 has two trimmed surfaces 2163 in the second direction D2, such that the object-side optical element 216 has a non-circular appearance and can be regarded as a non-circular element.

The image-side optical element 217 includes an optical part 2171 and an abutment part 2172. The optical part 2171 faces the optical axis 201. The abutment part 2172 surrounds the optical part 2171 and faces the lens barrel 22. The abutment part 2172 is in physical contact with the lens barrel 22 in the first direction D1 The abutment part 2172 has two trimmed surfaces 2173 in the second direction D2, such that the image-side optical element 217 has a non-circular appearance and can be regarded as a non-circular element.

The imaging lens system 2 further includes two optical mark structures 23o and two optical mark structures 23i. The optical mark structures 23o are disposed on an object side of the abutment part 2162 of the object-side optical element 216 in two opposite directions of the first axis AX1 and are located in grooves GV formed between the lens barrel 22 and the object-side optical element 216. The optical mark structures 23o are perpendicular to the optical axis 201 and face the object side. The optical mark structures 23i are disposed on an image side of the abutment part 2172 of the image-side optical element 217 in two opposite directions of the first axis AX1 and are located in grooves GV formed between the lens barrel 22 and the image-side optical element 217. The optical mark structures 23i are perpendicular to the optical axis 201 and face the image side. Each of the optical mark structures 23o and 23i extends towards the second axis AX2 along a circumference direction DCF surrounding the optical axis 201 so as to be in an arc shape. Each of the optical mark structures 23o and 23i tapers off along the circumference direction DCF from the first axis AX1 to the second axis AX2.

Each of the optical mark structures 23o is a two-dimensional optical mark structure and includes a plurality of optical mark units 230o. Each of the optical mark structures 23i is a two-dimensional optical mark structure and includes a plurality of optical mark units 230i.

Each of the optical mark units 230o includes a first optical mark surface 231o and a second optical mark surface 232o. The first optical mark surfaces 231o and the second optical mark surfaces 232o are arranged side by side in the circumference direction DCF that surrounds the optical axis 201. One of the second optical mark surfaces 232o located closest to the second axis AX2 has an area slightly smaller than that of the other second optical mark surfaces 232o, such that the optical mark structure 23o has a tapered appearance. The other second optical mark surfaces 232o and the first optical mark surfaces 231o each have a range formed by an arc and two straight lines.

When a projection area of each of the first optical mark surfaces 231o on a reference surface perpendicular to the optical axis 201 is A, the following condition is satisfied: $A=2.14\times10E-2$ [mm$^2$].

When a distance along the circumference direction DCF between center points of each two of the first optical mark surfaces 231o adjacent in the circumference direction DCF is D, the following condition is satisfied: D=0.313 [mm].

When the projection area of each of the first optical mark surfaces 231o on the reference surface perpendicular to the optical axis 201 is A, and the distance along the circumference direction DCF between center points of each two of the first optical mark surfaces 231o adjacent in the circumference direction DCF is D, the following condition is satisfied: $\sqrt{(A)}/D=0.467$.

The first optical mark surfaces 231o and the second optical mark surfaces 232o have different gloss values in a direction.

When an angle between an observation direction and the optical mark structure 23o is θ, the following condition is satisfied: 50 [deg.]≤θ≤90 [deg.]. When a gloss value difference in the observation direction between the first optical mark surface 231o and the second optical mark surface 232o of each of the plurality of optical mark units 230o is ΔG, the following condition is satisfied: 15 [GU]≤ΔG≤50 [GU].

The first optical mark surfaces 231o have an arithmetical mean roughness Ra in a direction ranging between 0.3 and 0.5 micrometers, and the second optical mark surfaces 232o have an arithmetical mean roughness Ra in the direction ranging between 2.8 and 3.5 micrometers. When a roughness value difference in the direction between the first optical mark surface 231o and the second optical mark surface 232o of each of the plurality of optical mark units 230o is ΔR, the following condition is satisfied: 2.3 [μm] ΔR≤3.2 [μm].

The imaging lens system 2 further includes two curable liquids 24o respectively disposed on the optical mark structures 23o in the grooves GV. The curable liquids 24o are in physical contact with the first optical mark surfaces 231o and the second optical mark surfaces 232o of several of the plurality of optical mark units 230o. The object-side optical element 216 is fixed to the lens barrel 22 while the curable liquids 24o are cured.

Each of the optical mark units 230i includes a first optical mark surface 231i and a second optical mark surface 232i. The first optical mark surface 231i and the second optical mark surface 232i are arranged side by side in the circumference direction DCF that surrounds the optical axis 201. One of the second optical mark surfaces 232i located closest to the second axis AX2 has an area slightly smaller than that of the other second optical mark surfaces 232i, such that the optical mark structure 23i has a tapered appearance.

When a projection area of each of the first optical mark surfaces 231i on a reference surface perpendicular to the optical axis 201 is A, the following condition is satisfied: $A=6.6\times10E-3$ [mm$^2$].

When a distance along the circumference direction DCF between center points of each two of the first optical mark surfaces 231i adjacent in the circumference direction DCF is D, the following condition is satisfied: D=0.221 [mm].

When the projection area of each of the first optical mark surfaces 231i on the reference surface perpendicular to the optical axis 201 is A, and the distance along the circumference direction DCF between center points of each two of the first optical mark surfaces 231i adjacent in the circumference direction DCF is D, the following condition is satisfied: $\sqrt{(A)}/D=0.368$.

The first optical mark surfaces 231i and the second optical mark surfaces 232i have different gloss values in a direction.

When an angle between an observation direction and the optical mark structure 23i is θ, the following condition is satisfied: 50 [deg.]≤θ≤90 [deg.]. When a gloss value difference in the observation direction between the first optical mark surface 231i and the second optical mark surface 232i of each of the plurality of optical mark units 230i is ΔG, the following condition is satisfied: 15 [GU]≤ΔG≤50 [GU].

The imaging lens system 2 further includes two curable liquids 24i respectively disposed on the optical mark structures 23i in the grooves GV. The curable liquids 24i are in physical contact with the first optical mark surfaces 231i and the second optical mark surfaces 232i of several of the plurality of optical mark units 230i. The image-side optical element 217 is fixed to the lens barrel 22 while the curable liquids 24i are cured.

3rd Embodiment

Figure 17:
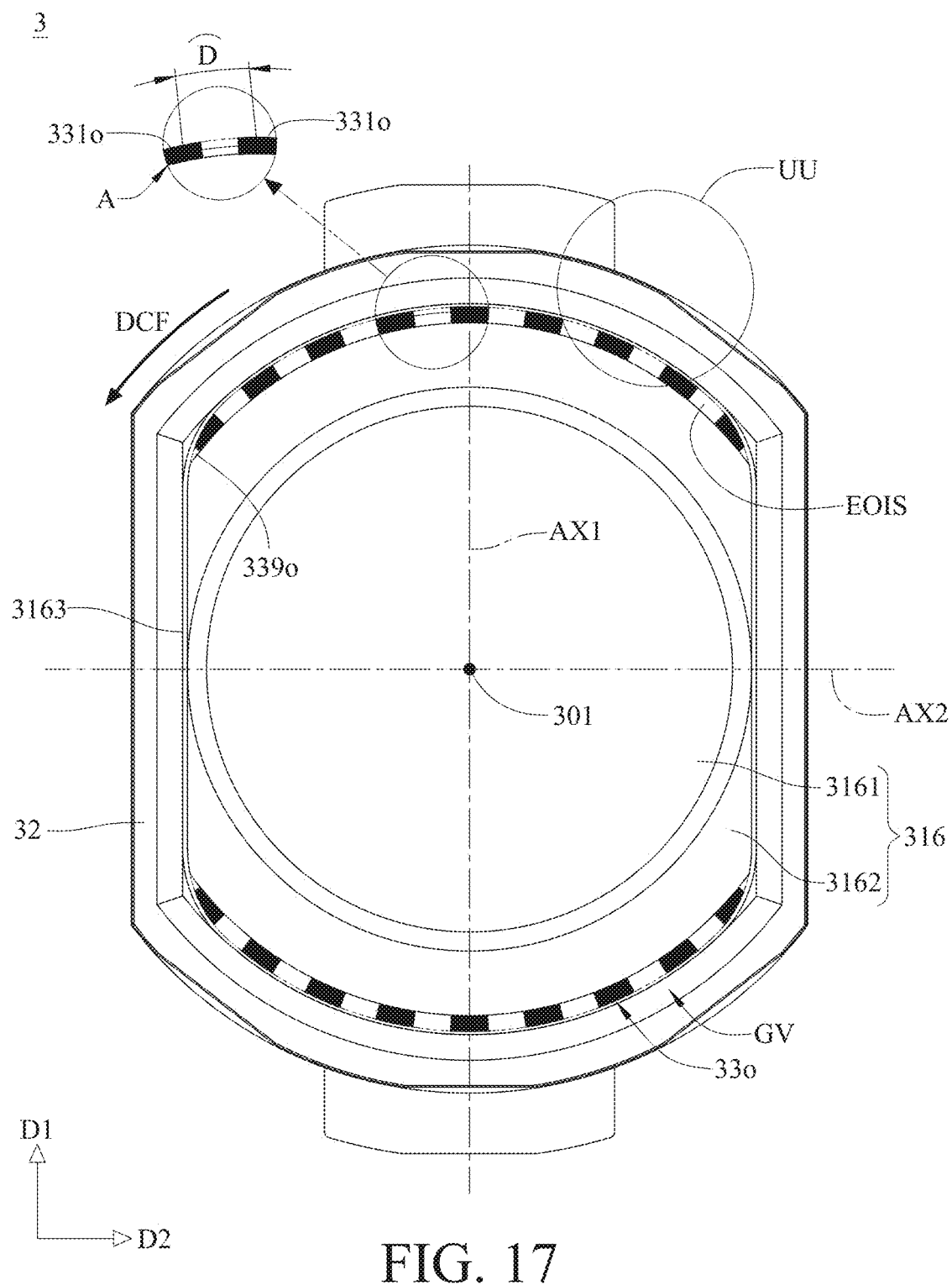
FIG. 17 is a front view of an imaging lens system according to the 3rd embodiment of the present disclosure.
Figure 18:
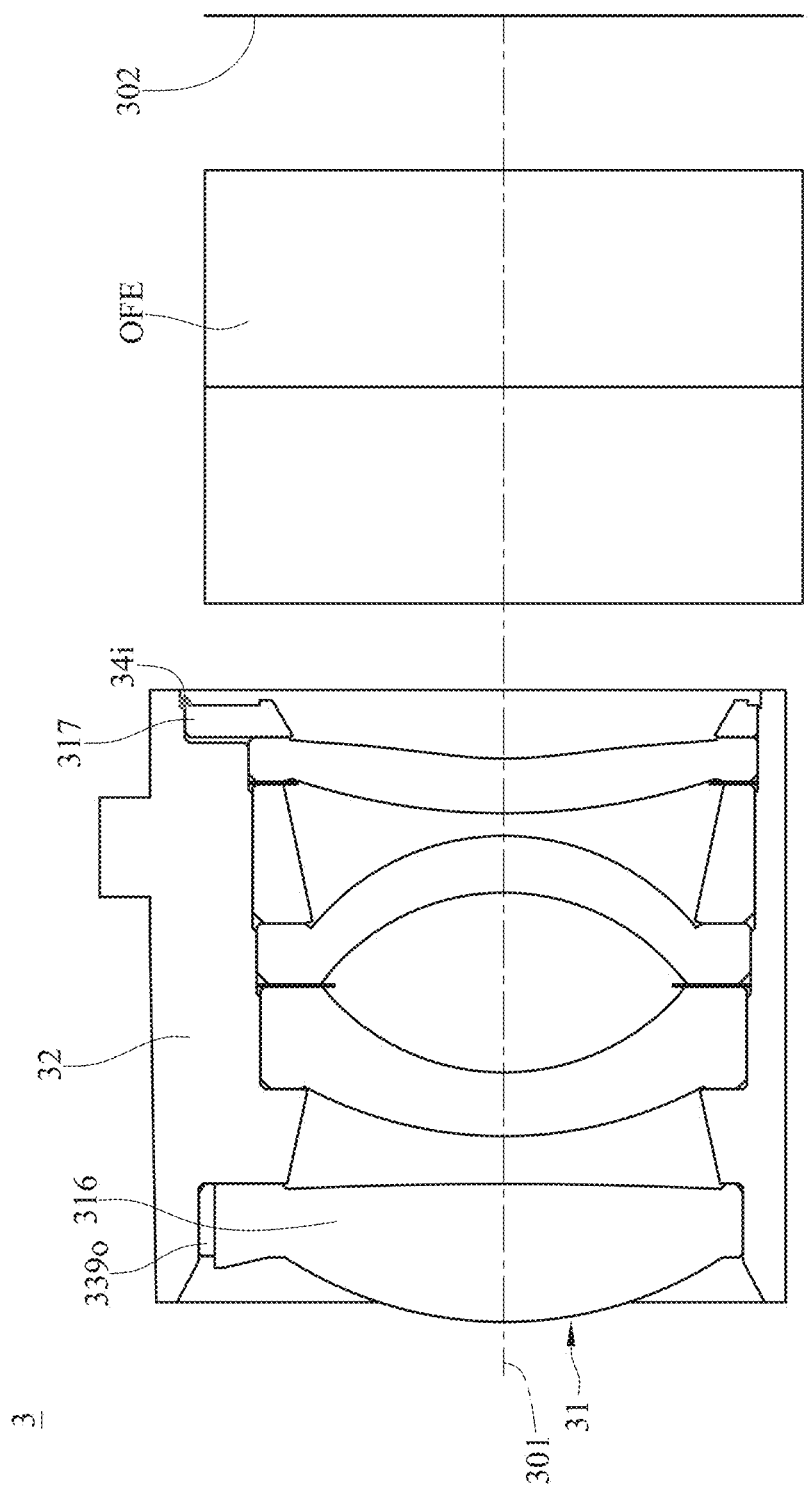
FIG. 18 is a side view of the imaging lens system of FIG. 17.
Figure 19:
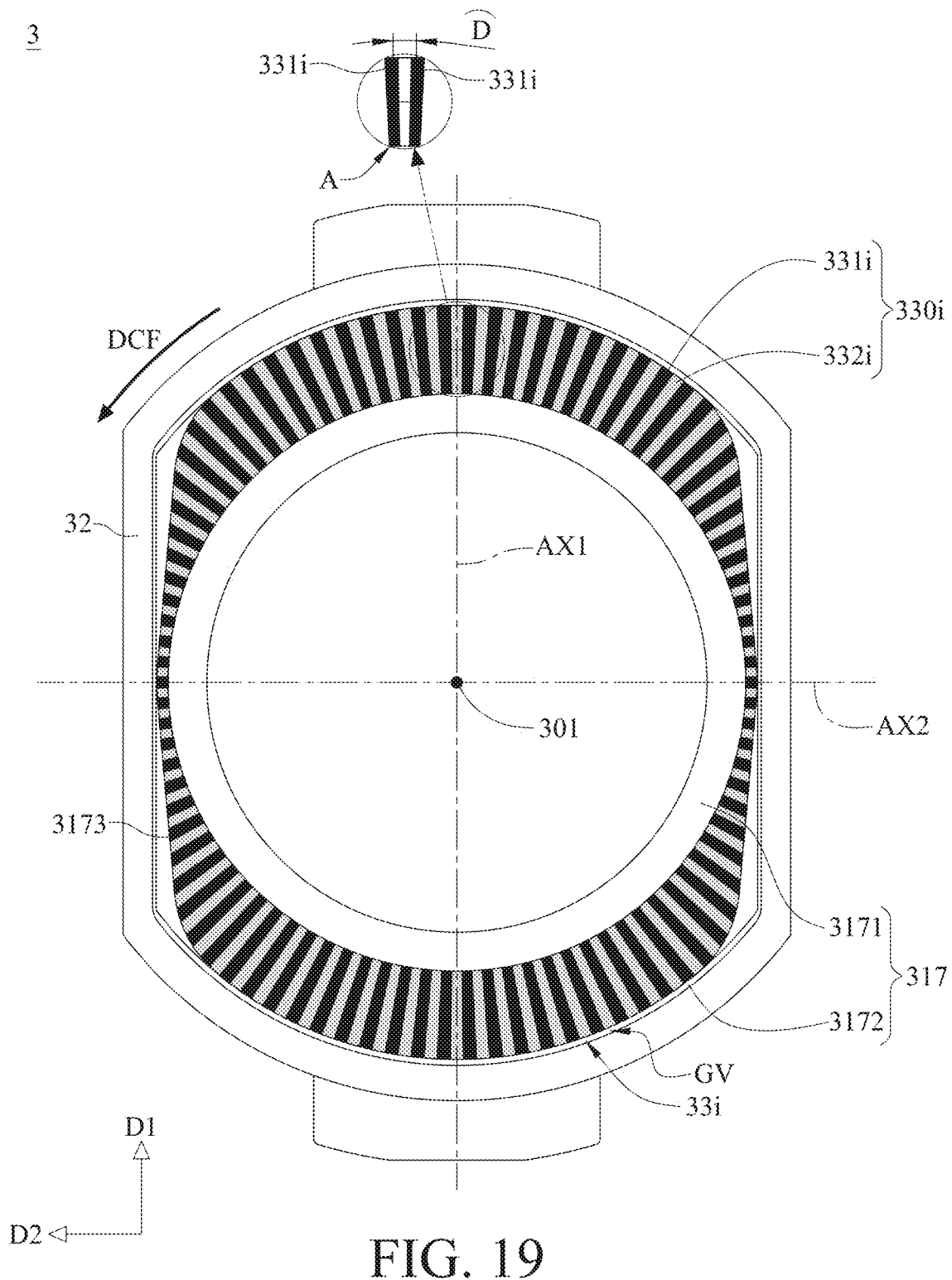
FIG. 19 is a rear view of the imaging lens system of FIG. 17.
Figure 20:
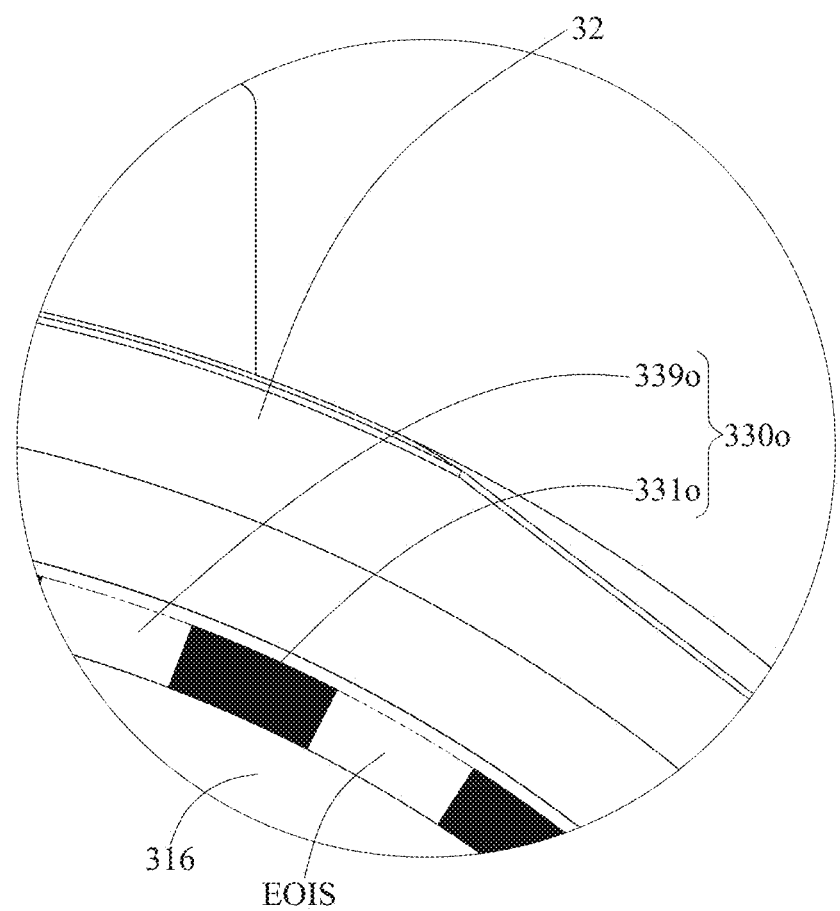
FIG. 20 is an enlarged view of the UU region of the imaging lens system of FIG. 17.
Figure 21:
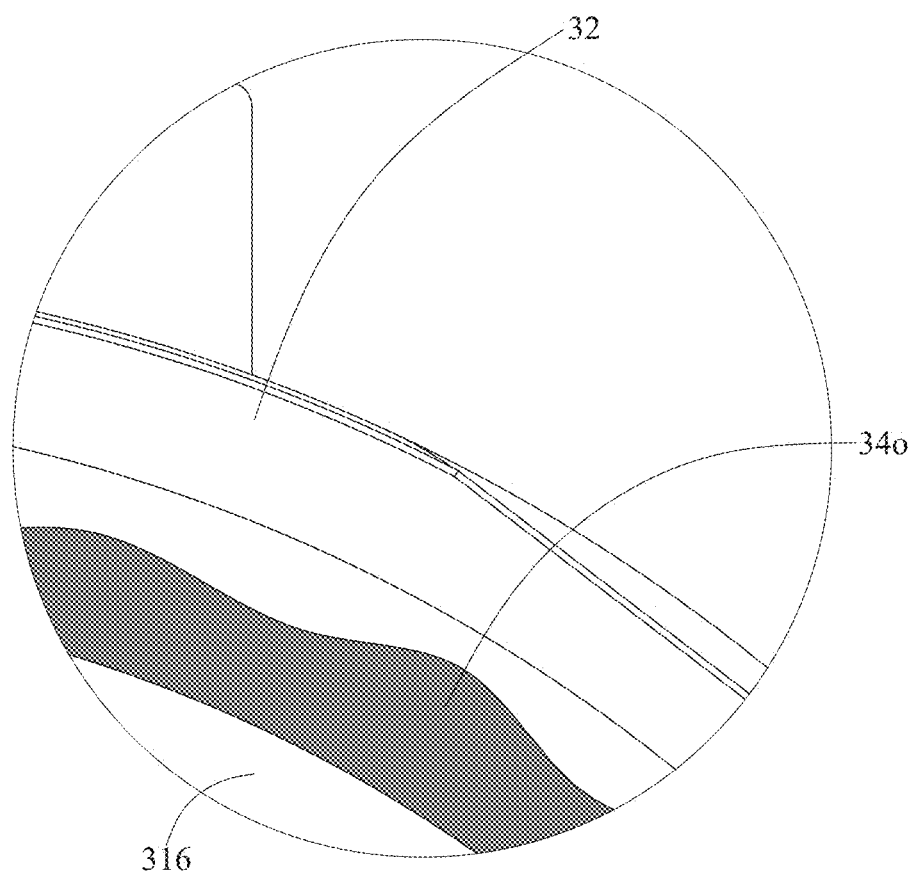
FIG. 21 is a schematic view showing a curable liquid is disposed on an optical mark structure of the imaging lens system of FIG. 20.

Please refer to FIG. 17 to FIG. 21, wherein FIG. 17 is a front view of an imaging lens system according to the 3rd embodiment of the present disclosure, FIG. 18 is a side view of the imaging lens system of FIG. 17, FIG. 19 is a rear view of the imaging lens system of FIG. 17, FIG. 20 is an enlarged view of the UU region of the imaging lens system of FIG. 17, and FIG. 21 is a schematic view showing a curable liquid is disposed on an optical mark structure of the imaging lens system of FIG. 20.

In this embodiment, an imaging lens system 3 is provided. The imaging lens system 3 has an optical axis 301 and an image surface 302. The imaging lens system 3 includes a plurality of optical elements 31 and a lens barrel 32. The optical elements 31 are arranged along the optical axis 301. The lens barrel 32 surrounds the optical axis 301, and several of the optical elements 31 are accommodated in the lens barrel 32. Moreover, as in the 2nd embodiment, the optical elements 31 include an optical-folding element OFE at an image side of the imaging lens system 3, the description for the optical-folding element OFE can refer to the description in the 2nd embodiment, and an explanation in this regard will not be provided again. Also, for simplicity, the optical axis 301 in the drawings of this embodiment is illustrated in a straight line.

Specifically, the optical elements 31 include an object-side optical element 316, an image-side optical element 317 and the optical-folding element OFE located at an image side of the image-side optical element 317. The optical elements 31 further include a plurality of additional optical elements (not numbered) located between the object-side optical element 316 and the image-side optical element 317. That is, the optical elements 31 include, in order from an object side to the image side along an optical path, the object-side optical element 316, the additional optical elements, the image-side optical element 317 and the optical-folding element OFE. In detail, the object-side optical element 316 is a lens element, and the image-side optical element 317 is a retainer for fixing the object-side optical element 316 and the other optical elements from the image side.

The object-side optical element 316 includes an optical part 3161 and an abutment part 3162. The optical axis 301 passes through the optical part 3161. The abutment part 3162 surrounds the optical part 3161. The abutment part 3162 is in physical contact with the lens barrel 32 in a first direction D1 and a second direction D2. In detail, the first direction D1 is defined as a direction along a first axis AX1 and toward a position away from an intersection of the first axis AX1 and the optical axis 301, the second direction D2 is defined as a direction along a second axis AX2 and toward a position away from an intersection of the second axis AX2 and the optical axis 301, the first axis AX1 is perpendicular to the second axis AX2, and each of the first axis AX1 and the second axis AX2 is perpendicular to the optical axis 301. The abutment part 3162 has two trimmed surfaces 3163 in the second direction D2, such that the object-side optical element 316 has a non-circular appearance and can be regarded as a non-circular element.

The image-side optical element 317 includes an optical part 3171 and an abutment part 3172. The optical part 3171 faces the optical axis 301. The abutment part 3172 surrounds the optical part 3171 and faces the lens barrel 32. The abutment part 3172 is in physical contact with the lens barrel 32 in the first direction D1. The abutment part 3172 has two trimmed surfaces 3173 in the second direction D2, such that the image-side optical element 317 has a non-circular appearance and can be regarded as a non-circular element.

The imaging lens system 3 further includes two optical mark structures 33$o$ and one optical mark structure 33$i$. The optical mark structures 33$o$ are disposed on an object side of the abutment part 3162 of the object-side optical element 316 in two opposite directions of the first axis AX1 and are located in grooves GV formed between the lens barrel 32 and the object-side optical element 316. The optical mark structures 33$o$ are perpendicular to the optical axis 301 and face the object side. The optical mark structure 33$i$ is disposed in a loop shape and on an image side of the abutment part 3172 of the image-side optical element 317 and is partially located in grooves GV formed between the lens barrel 32 and the image-side optical element 317. The optical mark structure 33$i$ is perpendicular to the optical axis 301 and faces the image side. Each of the optical mark structures 33$o$ extends towards the second axis AX2 along a circumference direction DCF surrounding the optical axis 301 so as to be in an arc shape, and the optical mark structures 33$o$ and 33$i$ taper off along the circumference direction DCF from the first axis AX1 to the second axis AX2.

Each of the optical mark structures 33$o$ is a three-dimensional optical mark structure and includes a plurality of optical mark units 330$o$. The optical mark structure 33$i$ is a two-dimensional optical mark structure and includes a plurality of optical mark units 330$i$.

Each of the optical mark units 330$o$ includes a first optical mark surface 331$o$ and a recessed structure 339$o$. The first optical mark surfaces 331$o$ and the recessed structures 339$o$ are arranged side by side in the circumference direction DCF that surrounds the optical axis 301. The recessed structures 339$o$ are recessed towards the image side from a plane where the first optical mark surfaces are located. One of the recessed structures 339$o$ located closest to the second axis AX2 has an upper area slightly smaller than that of the other recessed structures 339$o$, such that the optical mark structure 33$o$ has a tapered appearance.

When a projection area of each of the first optical mark surfaces 331$o$ on a reference surface perpendicular to the optical axis 301 is A, the following condition is satisfied: A=4.15×10E-2 [mm$^2$].

When a distance along the circumference direction DCF between center points of each two of the first optical mark surfaces 331$o$ adjacent in the circumference direction DCF is D, the following condition is satisfied: D=0.6214 [mm].

When the projection area of each of the first optical mark surfaces 331$o$ on the reference surface perpendicular to the optical axis 301 is A, and the distance along the circumference direction DCF between center points of each two of the first optical mark surfaces 331$o$ adjacent in the circumference direction DCF is D, the following condition is satisfied: $\sqrt{(A)}/D$=0.3278.

The first optical mark surfaces 331$o$ and the recessed structures 339$o$ have different gloss values in a direction. When an angle between an observation direction and the optical mark structure 33$o$ is θ, the following condition is satisfied: 50 [deg.]≤θ≤90 [deg.]. When a gloss value difference in the observation direction between the first optical mark surface 331$o$ and the recessed structure 3320 of each of the optical mark units 330$o$ is ΔG, the following condition is satisfied: 15 [GU]≤ΔG≤50 [GU].

A projection of one of the recessed structures 339$o$ on the reference surface perpendicular to the optical axis 301 defines an equivalent optical mark surface EOIS. When a ratio of an area of the equivalent optical mark surface EOIS to a projection area of each of the optical mark units 330$o$ on the reference surface is AR, the following condition is satisfied: AR=0.5.

The imaging lens system 3 further includes two curable liquids 340 respectively disposed on the optical mark structures 33$o$ in the grooves GV. The curable liquids 34$o$ are in physical contact with the first optical mark surfaces 331$o$ of several of the optical mark units 330$o$, and the curable liquids 34$o$ are accommodated in the recessed structures 339$o$ of several of the optical mark units 330$o$. The object-side optical element 316 is fixed to the lens barrel 32 while the curable liquids 34$o$ are cured.

Each of the optical mark units 330$i$ includes a first optical mark surface 331$i$ and a second optical mark surface 332$i$. The first optical mark surface 331$i$ and the second optical mark surface 332$i$ are arranged side by side in the circumference direction DCF that surrounds the optical axis 301. Each of the first optical mark surfaces 331$i$ and the second optical mark surfaces 332$i$ has an area decreasing from the position close to the first axis AX1 to the position close to the second axis AX2.

When a projection area of one of the first optical mark surfaces 331$i$ closest to the first axis AX1 on a reference surface perpendicular to the optical axis 301 is A, the following condition is satisfied: A=7.40×10E-2 [mm$^2$].

When a distance along the circumference direction DCF between center points of two of the first optical mark surfaces 331$i$ adjacent in the circumference direction DCF and closest to the first axis AX1 is D, the following condition is satisfied: D=0.197 [mm].

When the projection area of one of the first optical mark surfaces 331$i$ closest to the first axis AX1 on the reference surface perpendicular to the optical axis 301 is A, and the distance along the circumference direction DCF between center points of two of the first optical mark surfaces 331$i$ adjacent in the circumference direction DCF and closest to the first axis AX1 is D, the following condition is satisfied: $\sqrt{(A)}/D$=1.38.

The first optical mark surfaces 331$i$ and the second optical mark surfaces 332$i$ have different gloss values in a direction. When an angle between an observation direction and the optical mark structure 33$i$ is θ, the following condition is satisfied: 50 [deg.]≤θ≤90 [deg.]. When a gloss value difference in the observation direction between the first optical mark surface 331$i$ and the second optical mark surface 332$i$ of each of the optical mark units 330$i$ is ΔG, the following condition is satisfied: 15 [GU]≤ΔG≤50 [GU].

The imaging lens system 3 further includes one curable liquid 34$i$ partially disposed on the optical mark structure 33$i$ in the grooves GV. The curable liquid 34$i$ is in physical contact with the first optical mark surfaces 331$i$ and the second optical mark surfaces 332$i$ of several of the optical mark units 330$i$. The image-side optical element 317 is fixed to the lens barrel 32 while the curable liquid 34$i$ is cured.

The present disclosure is not limited to the optical mark structures in the above-mentioned embodiments. Any one of the above-mentioned optical mark structures can be replaced with another one of the above-mentioned optical mark structures or one of the following two-dimensional or three-dimensional optical mark structures depending on actual requirement.

Figure 31:
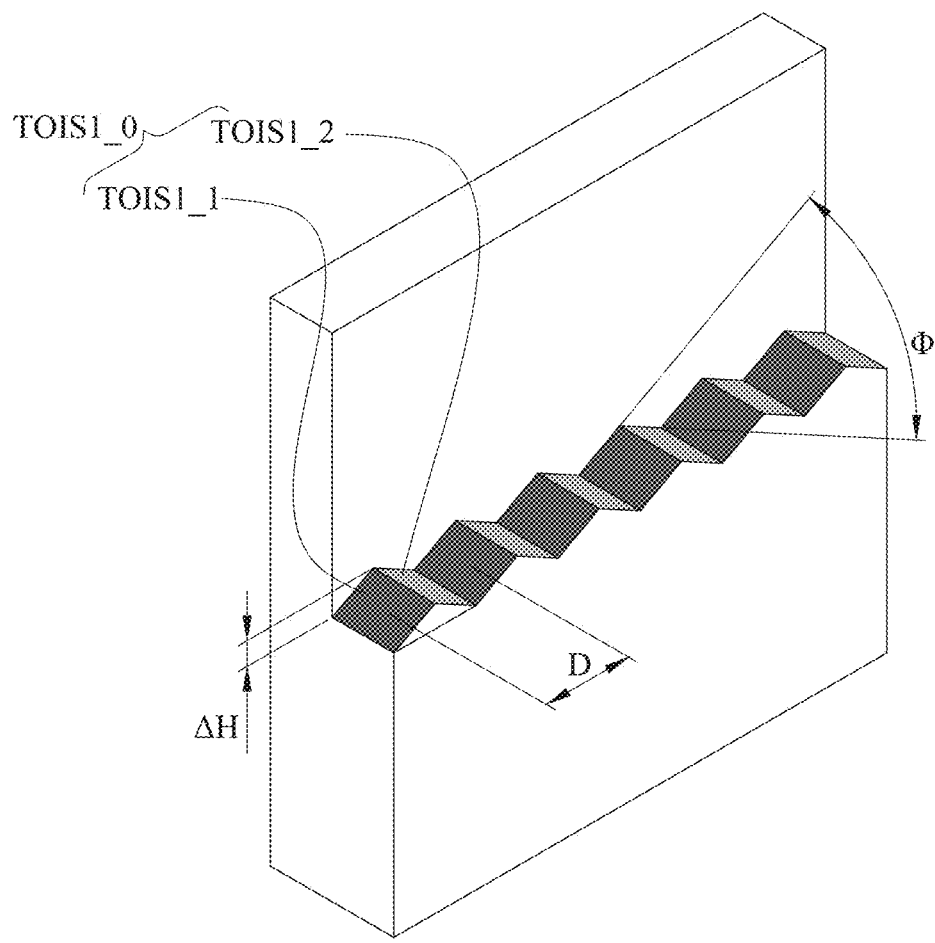
FIG. 31 is a perspective view of a three-dimensional optical mark structure according to another embodiment of the present disclosure.

Please refer to FIG. 31, which is a perspective view of a three-dimensional optical mark structure according to another embodiment of the present disclosure. As shown in FIG. 31, a three-dimensional optical mark structure TOIS1 includes a plurality of optical mark units TOIS1_0. Each of the optical mark units TOIS1_0 includes a first optical mark surface TOIS1_1 and a second optical mark surface TOIS1_2. The first optical mark surfaces TOIS1_1 and the second optical mark surfaces TOIS1_2 are arranged side by side.

The first optical mark surfaces TOIS1_1 and the second optical mark surfaces TOIS1_2 can have different gloss values and the same roughness value in a direction.

When a projection area of each of the first optical mark surfaces TOIS1_1 on a reference surface perpendicular to an optical axis is A, the following condition is satisfied: $A=6.7\times 10E-3$ [mm$^2$].

When a distance between center points of each adjacent two of the first optical mark surfaces TOIS1_1 is D, the following condition is satisfied: D=0.1333 [mm].

When the projection area of each of the first optical mark surfaces TOIS1_1 on the reference surface perpendicular to the optical axis is A, and the distance between center points of each adjacent two of the first optical mark surfaces TOIS1_1 is D, the following condition is satisfied: $\sqrt{(A)}/D=0.614$.

When an angle between the first optical mark surface TOIS1_1 and the second optical mark surface TOIS1_2 of each of the plurality of optical mark units TOIS1_0 is Φ, the following condition is satisfied: Φ=57 [deg.].

Figure 32:
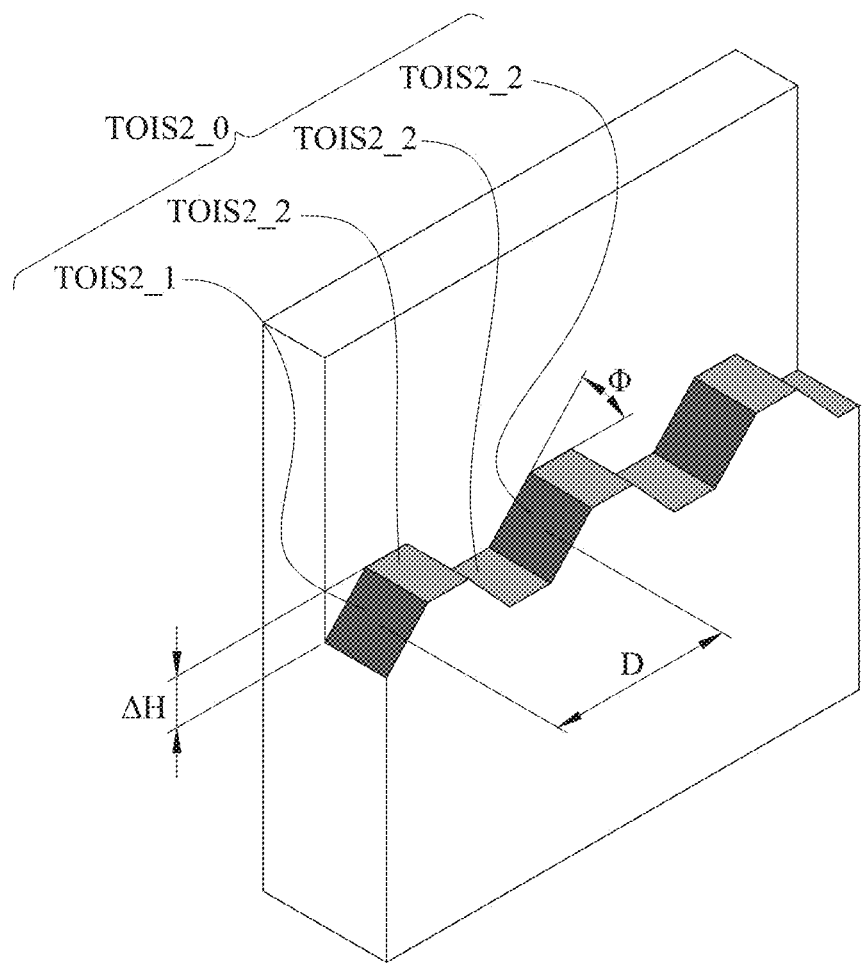
FIG. 32 is a perspective view of a three-dimensional optical mark structure according to another embodiment of the present disclosure.

Please refer to FIG. 32, which is a perspective view of a three-dimensional optical mark structure according to another embodiment of the present disclosure. As shown in FIG. 32, a three-dimensional optical mark structure TOIS2 includes a plurality of optical mark units TOIS2_0. Each of the optical mark units TOIS2_0 includes a first optical mark surface TOIS2_1, a second optical mark surface TOIS2_2, a third optical mark surface TOIS2_3 and a fourth optical mark surface TOIS2_4. The first optical mark surfaces TOIS2_1, the second optical mark surfaces TOIS2_2, the third optical mark surface TOIS2_3 and the fourth optical mark surface TOIS2_4 are sequentially arranged.

The first optical mark surfaces TOIS2_1 and the second optical mark surfaces TOIS2_2 have different gloss values in a direction, the first optical mark surfaces TOIS2_1 and the third optical mark surfaces TOIS2_3 have the same gloss value in a direction, and the second optical mark surfaces TOIS2_2 and the fourth optical mark surfaces TOIS2_4 have the same gloss value in a direction.

When a projection area of each of the first optical mark surfaces TOIS2_1 on a reference surface perpendicular to an optical axis is A, the following condition is satisfied: $A=6.7\times 10E-3$ [mm$^2$].

When a distance between center points of each adjacent two of the first optical mark surfaces TOIS2_1 is D, the following condition is satisfied: D=0.2667 [mm].

When the projection area of each of the first optical mark surfaces TOIS2_1 on the reference surface perpendicular to the optical axis is A, and the distance between center points of each adjacent two of the first optical mark surfaces TOIS2_1 is D, the following condition is satisfied: $\sqrt{(A)}/D=0.307$.

When a height difference in a direction parallel to the optical axis between the second optical mark surfaces TOIS2_2 and the fourth optical mark surfaces TOIS2_4 of each of the optical mark units TOIS2_0 is ΔH, the following condition is satisfied: ΔH=0.072 [mm].

When an angle between the first optical mark surface TOIS2_1 and the second optical mark surface TOIS2_2 of each of the optical mark units TOIS2_0 is Φ, the following condition is satisfied: Φ=47 [deg.].

Figure 33:
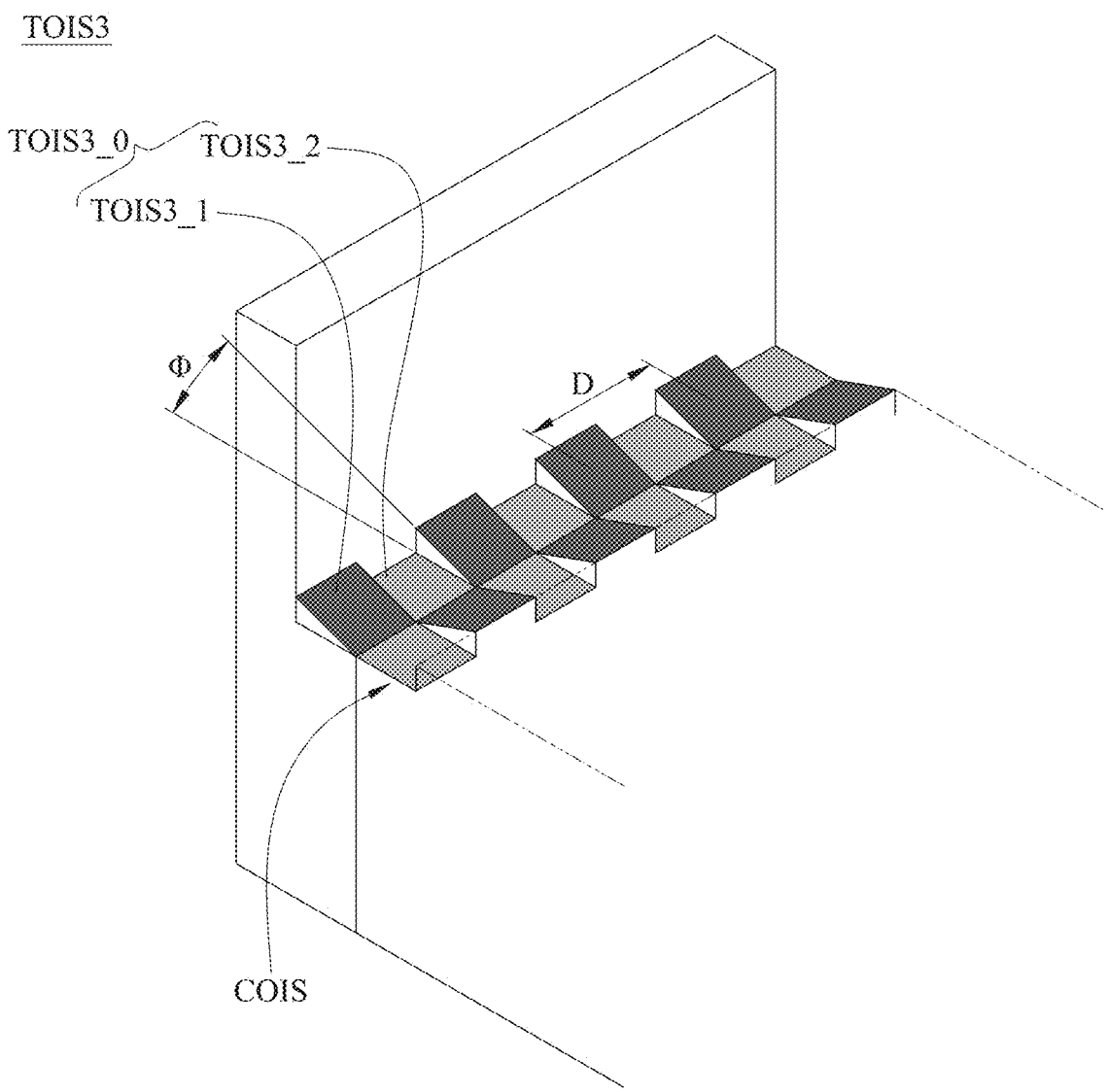
FIG. 33 is a perspective view of a three-dimensional optical mark structure according to another embodiment of the present disclosure.

Please refer to FIG. 33, which is a perspective view of a three-dimensional optical mark structure according to another embodiment of the present disclosure. As shown in FIG. 33, a three-dimensional optical mark structure TOIS3 includes a plurality of optical mark units TOIS3_0. Each of the optical mark units TOIS3_0 includes a first optical mark surface TOIS3_1 and a second optical mark surface TOIS3_2. The first optical mark surfaces TOIS3_1 and the second optical mark surfaces TOIS3_2 are arranged side by side.

The first optical mark surfaces TOIS3_1 and the second optical mark surfaces TOIS3_2 have different gloss values in a direction.

When a projection area of each of the first optical mark surfaces TOIS3_1 on a reference surface perpendicular to an optical axis is A, the following condition is satisfied: $A=1.0\times 10E-2$ [mm$^2$].

When a distance between center points of each adjacent two of the first optical mark surfaces TOIS3_1 is D, the following condition is satisfied: D=0.20 [mm].

When the projection area of each of the first optical mark surfaces TOIS3_1 on the reference surface perpendicular to the optical axis is A, and the distance between center points of each adjacent two of the first optical mark surfaces TOIS3_1 is D, the following condition is satisfied: $\sqrt{(A)}/D=0.5$.

When an angle between the first optical mark surface TOIS3_1 and the second optical mark surface TOIS3_2 of each of the optical mark units TOIS3_0 is Φ, the following condition is satisfied: t=20 [deg.].

As shown in FIG. 33, there is a counterpart optical mark structure COIS disposed corresponding to the optical mark structure TOIS3 in a manner that an inclined surface corresponds to a horizontal surface. The description about the manner can refer to the above-mentioned description about the counterpart optical mark structure 19, and an explanation in this regard will not be provided again. Further, the definitions of parameters A, D, $\sqrt{(A)}/D$ and Φ of the counterpart optical mark structure COIS are substantially the same as the definitions of the corresponding parameters of the optical mark structure TOIS3, and an explanation in this regard will not be provided again. Furthermore, a groove GV is formed between the optical mark structure TOIS3 and the counterpart optical mark structure COIS.

Figure 34:
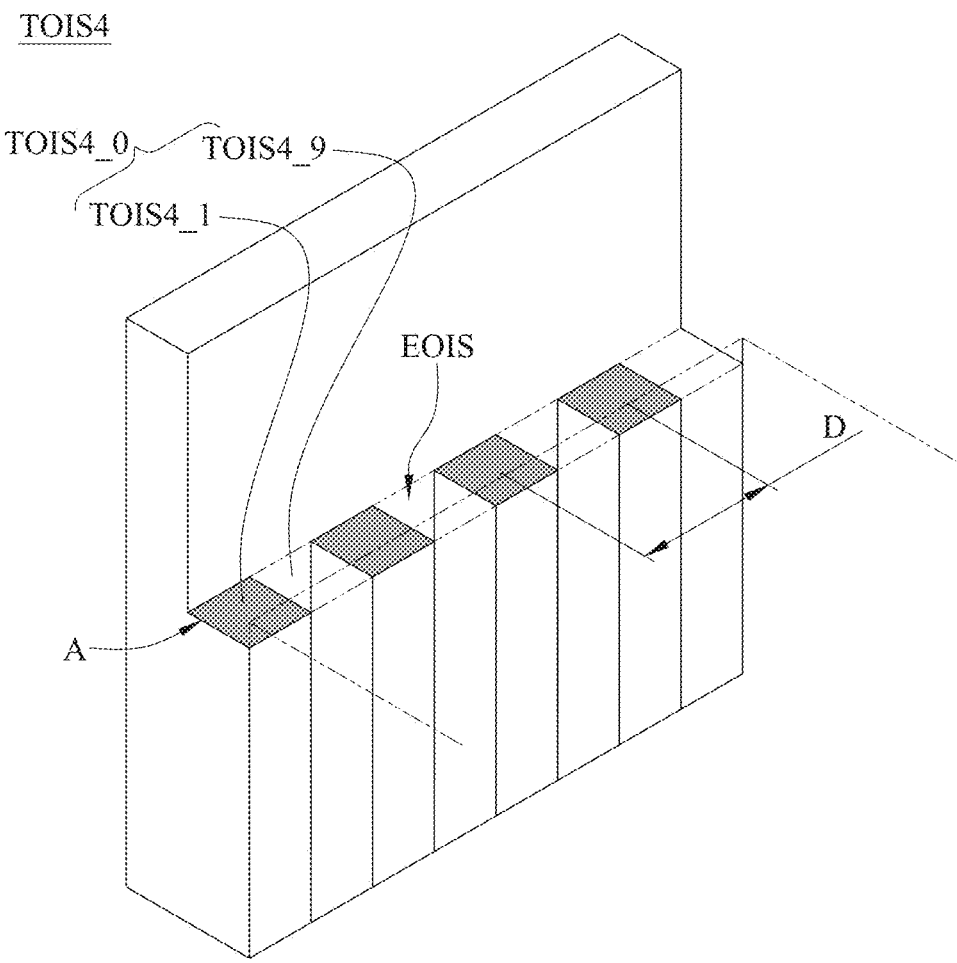
FIG. 34 is a perspective view of a three-dimensional optical mark structure according to another embodiment of the present disclosure.

Please refer to FIG. 34, which is a perspective view of a three-dimensional optical mark structure according to another embodiment of the present disclosure. As shown in FIG. 34, a three-dimensional optical mark structure TOIS4 includes a plurality of optical mark units TOIS4_0. Each of the optical mark units TOIS4_0 includes a first optical mark surface TOIS4_1 and a recessed structure TOIS4_9. The first optical mark surfaces TOIS4_1 and the recessed structures TOIS4_9 are arranged side by side.

The first optical mark surfaces TOIS4_1 and the recessed structures TOIS4_9 have different gloss values in a direction.

When a projection area of each of the first optical mark surfaces TOIS4_1 on a reference surface perpendicular to an optical axis is A, the following condition is satisfied: $A=1.0\times10E\text{-}2$ [mm$^2$].

When a distance between center points of each adjacent two of the first optical mark surfaces TOIS4_1 is D, the following condition is satisfied: $D=0.2$ [mm].

When the projection area of each of the first optical mark surfaces TOIS4_1 on the reference surface perpendicular to the optical axis is A, and the distance between center points of each adjacent two of the first optical mark surfaces TOIS4_1 is D, the following condition is satisfied: $\sqrt{(A)}/D=0.5$.

A projection of one of the recessed structure TOIS4_9 on the reference surface perpendicular to the optical axis defines an equivalent optical mark surface EOIS. When a ratio of an area of the equivalent optical mark surface EOIS to a projection area of each of the plurality of optical mark units TOIS4_0 on the reference surface is AR, the following condition is satisfied: $AR=0.5$.

Figure 35:
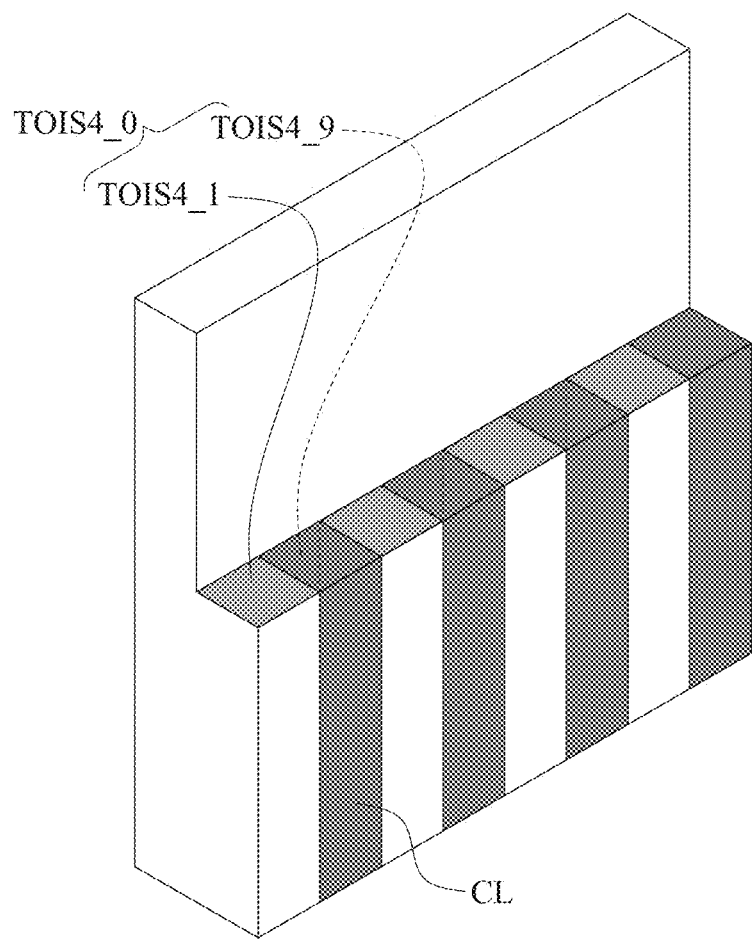
FIG. 35 is a schematic view showing a curable liquid is disposed on an optical mark structure of the imaging lens system of FIG. 34.

Please refer to FIG. 35, which is a schematic view showing a curable liquid is disposed on an optical mark structure of the imaging lens system of FIG. 34. As shown in FIG. 35, the curable liquid CL is accommodated in the recessed structures TOIS4_9 such that an upper of each of the recessed structures TOIS4_9 has an area with the same size as each of the first optical mark surfaces TOIS4_1, but the present disclosure is not limited thereto.

Figure 36:
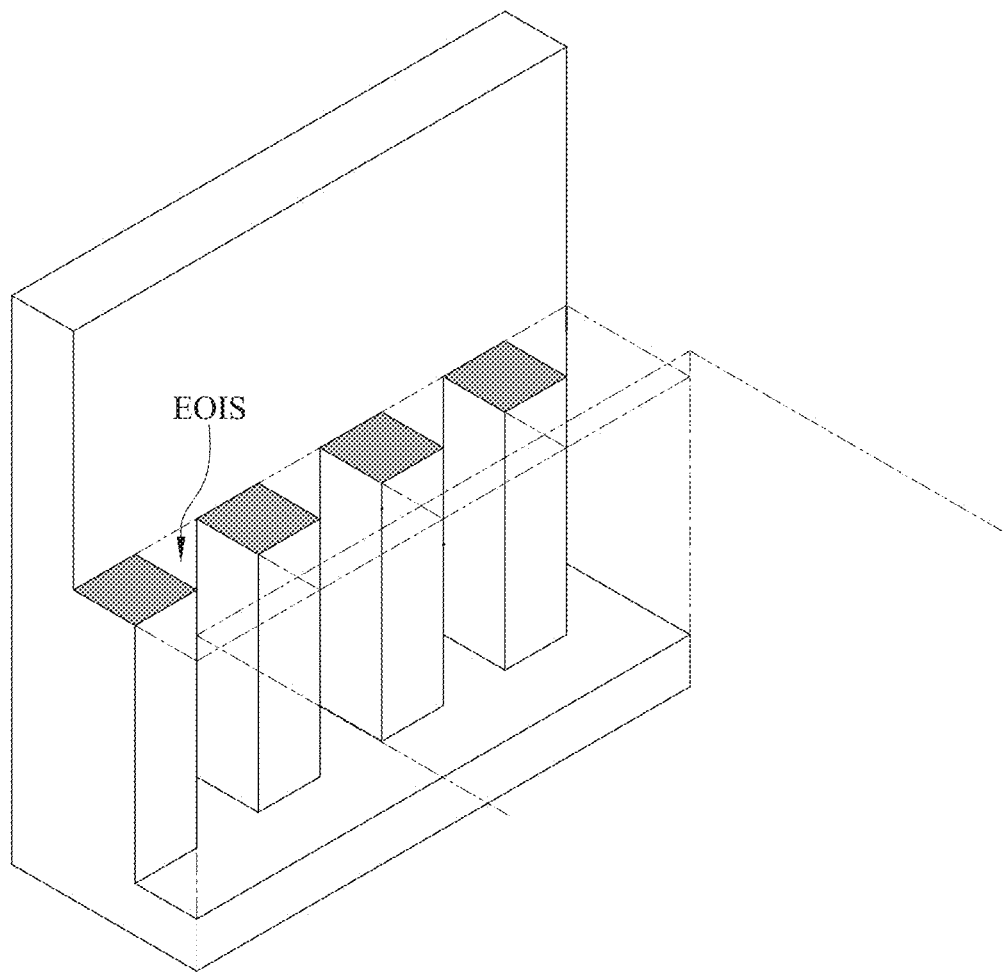
FIG. 36 is a perspective view of a three-dimensional optical mark structure according to another embodiment of the present disclosure.
Figure 37:
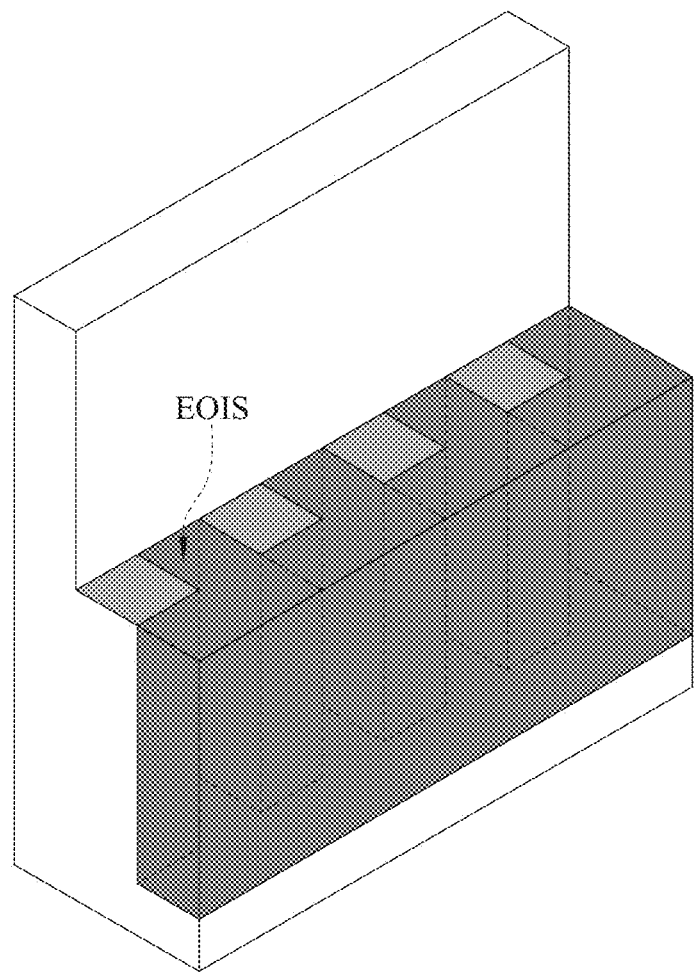
FIG. 37 is a schematic view showing a curable liquid is disposed on an optical mark structure of the imaging lens system of FIG. 36.

Please refer to FIG. 36 and FIG. 37, wherein FIG. 36 is a perspective view of a three-dimensional optical mark structure according to another embodiment of the present disclosure, and FIG. 37 is a schematic view showing a curable liquid is disposed on an optical mark structure of the imaging lens system of FIG. 36.

As shown in FIG. 36 and FIG. 37, a three-dimensional optical mark structure (not numbered) is substantially similar to the three-dimensional optical mark structure TOIS4 in FIG. 34 and FIG. 35, except for a ratio of an area of an equivalent optical mark surface EOIS to a projection area of each of a plurality of optical mark units (not numbered) of the three-dimensional optical mark structure in FIG. 36 and FIG. 37 on a reference surface (i.e., parameter AR) is 0.75.

Figure 38:
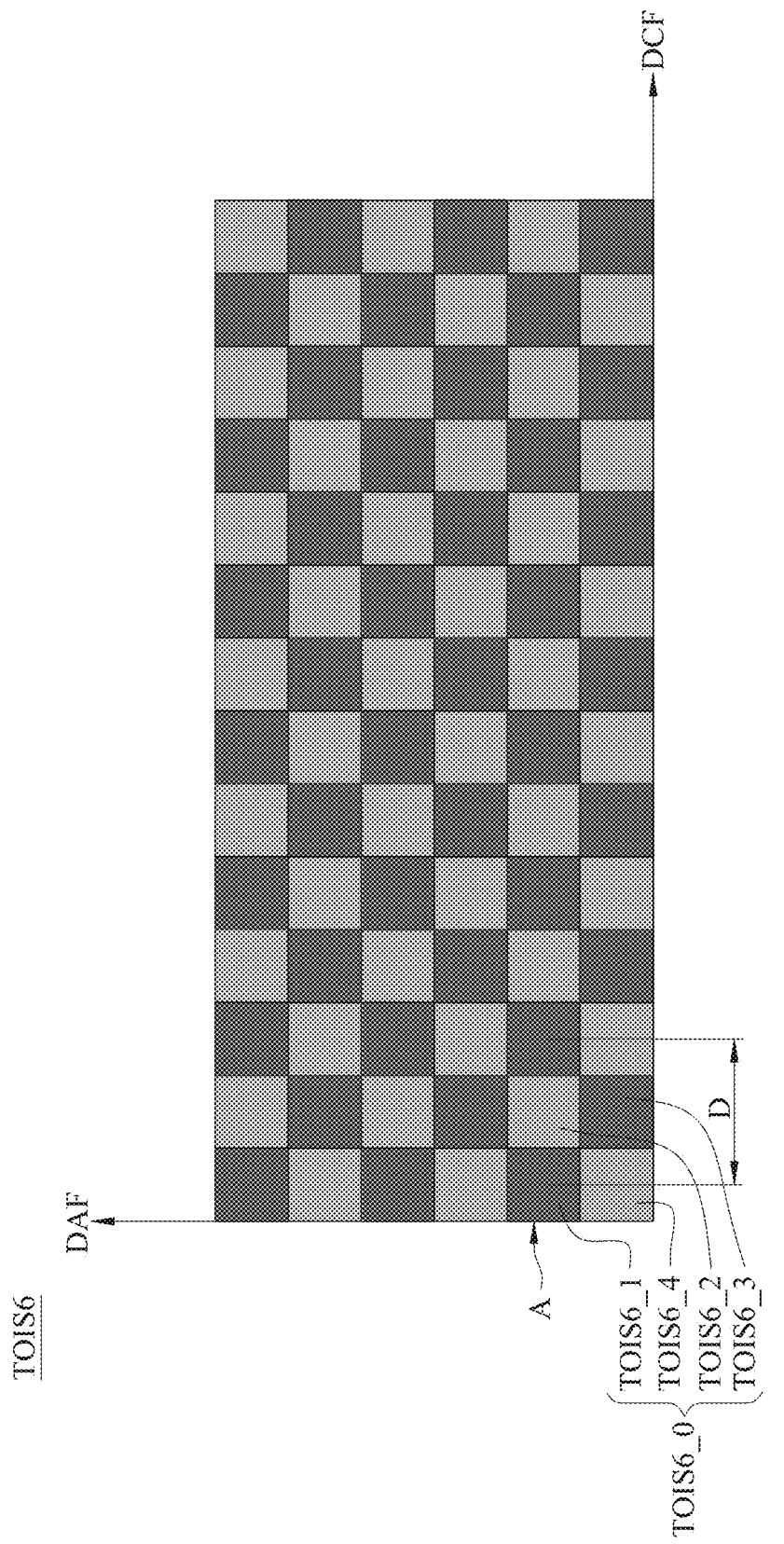
FIG. 38 is a perspective view of a two-dimensional optical mark structure according to another embodiment of the present disclosure.

Please refer to FIG. 38, which is a perspective view of a two-dimensional optical mark structure according to another embodiment of the present disclosure. As shown in FIG. 38, a two-dimensional optical mark structure TOIS6 includes a plurality of optical mark units TOIS6_0. Each of the optical mark units TOIS6_0 includes a first optical mark surface TOIS6_1, a second optical mark surface TOIS6_2, a third optical mark surface TOIS6_3 and a fourth optical mark surface TOIS6_4. The first optical mark surfaces TOIS6_1 and the second optical mark surfaces TOIS6_2 are arranged side by side in a circumference direction DCF that surrounds an optical axis. The third optical mark surface TOIS6_3 and the fourth optical mark surface TOIS6_4 are arranged side by side in the circumference direction DCF and are located closer to the optical axis than the first optical mark surfaces TOIS6_1 and the second optical mark surfaces TOIS6_2. That is, in each optical mark unit TOIS6_0, the first optical mark surface TOIS6_1, the second optical mark surface TOIS6_2, the third optical mark surface TOIS6_3 and the fourth optical mark surface TOIS6_4 can be regarded as a 2×2 matrix. The optical mark units TOIS6_0 are arranged side by side along the circumference direction DCF and a direction DAF away from the optical axis, such that the optical mark structure TOIS6 forms a mesh pattern.

The first optical mark surfaces TOIS6_1 and the second optical mark surfaces TOIS6_2 have different gloss values in a direction, the first optical mark surfaces TOIS6_1 and the third optical mark surfaces TOIS6_3 have the same gloss value in a direction, and the second optical mark surfaces TOIS6_2 and the fourth optical mark surfaces TOIS6_4 have the same gloss value in a direction.

When a projection area of each of the first optical mark surfaces TOIS6_1 on a reference surface perpendicular to the optical axis is A, the following condition is satisfied: $A=1.21\times10E\text{-}2$ [mm$^2$].

When a distance between center points of each adjacent two of the first optical mark surfaces TOIS6_1 is D, the following condition is satisfied: $D=0.22$ [mm].

When the projection area of each of the first optical mark surfaces TOIS6_1 on the reference surface perpendicular to the optical axis is A, and the distance between center points of each adjacent two of the first optical mark surfaces TOIS6_1 is D, the following condition is satisfied: $\sqrt{(A)}/D=0.5$.

Figure 39:
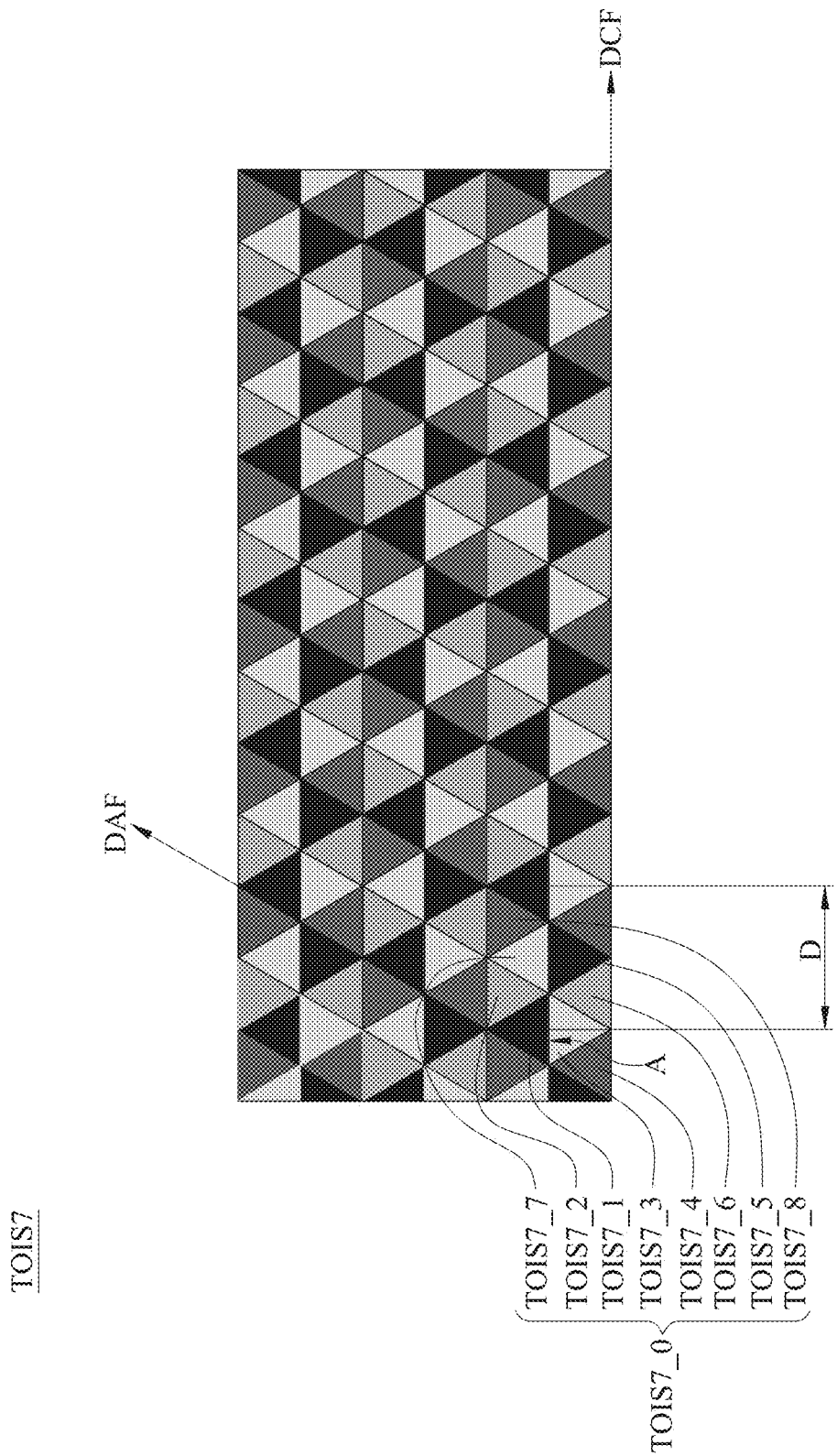
FIG. 39 is a perspective view of a two-dimensional optical mark structure according to another embodiment of the present disclosure.

Please refer to FIG. 39, which is a perspective view of a two-dimensional optical mark structure according to another embodiment of the present disclosure. As shown in FIG. 39, a two-dimensional optical mark structure TOIS7 includes a plurality of optical mark units TOIS7_0. Each of the optical mark units TOIS7_0 includes a first optical mark surface TOIS7_1, a second optical mark surface TOIS7_2, a third optical mark surface TOIS7_3, a fourth optical mark surface TOIS7_4, a fifth optical mark surface TOIS7_5, a sixth optical mark surface TOIS7_6, a seventh optical mark surface TOIS7_7 and an eighth optical mark surface TOIS7_8. The first optical mark surfaces TOIS7_1, the second optical mark surfaces TOIS7_2, the seventh optical mark surface TOIS7_7 and the eighth optical mark surface TOIS7_8 are sequentially arranged side by side in a circumference direction DCF that surrounds an optical axis. The fourth optical mark surface TOIS7_4, the third optical mark surface TOIS7_3, the sixth optical mark surface TOIS7_6 and the fifth optical mark surface TOIS7_5 are sequentially arranged side by side in the circumference direction DCF and are located closer to the optical axis than the first optical mark surfaces TOIS7_1, the second optical mark surfaces TOIS7_2, the seventh optical mark surface TOIS7_7 and the eighth optical mark surface TOIS7_8. As shown in FIG. 39, in each optical mark unit TOIS7_0, the first optical mark surface TOIS7_1, the second optical mark surface TOIS7_2, the third optical mark surface TOIS7_3, the fourth optical mark surface TOIS7_4, the fifth optical mark surface TOIS7_5, the sixth optical mark surface TOIS7_6, the seventh optical mark surface TOIS7_7 and the eighth optical mark surface TOIS7_8 can be regarded as a trapezoid pattern formed by eight triangles. The optical mark units TOIS7_0 are arranged side by side along the circumference direction DCF and a direction DAF away from the optical axis, such that the optical mark structure TOIS7 forms a mesh pattern, wherein an angle between the circumference direction DCF and the direction DAF away from the optical axis is 60 degrees. As shown in FIG. 39, the optical mark structure TOIS7 further includes a plurality of ½ optical mark units (not numbered) located at the inner and outer rim positions, and each ½ optical mark unit has an area approximately half of the area of the optical mark unit TOIS7_0. Accordingly, the optical mark structure TOIS7 can form a rectangular pattern as shown in FIG. 39.

The first optical mark surfaces TOIS7_1, the second optical mark surfaces TOIS7_2, the third optical mark surfaces TOIS7_3 and the fourth optical mark surfaces TOIS7_4 have different gloss values in a direction, the first optical mark surfaces TOIS7_1 and the fifth optical mark surfaces TOIS7_5 have the same gloss value in a direction, the second optical mark surfaces TOIS7_2 and the sixth optical mark surfaces TOIS7_6 have the same gloss value in a direction, the third optical mark surfaces TOIS7_3 and the seventh optical mark surfaces TOIS7_7 have the same gloss value in a direction, and the fourth optical mark surfaces TOIS7_4 and the eighth optical mark surfaces TOIS7_8 have the same gloss value in a direction.

When a projection area of each of the first optical mark surfaces TOIS7_1 on a reference surface perpendicular to the optical axis is A, the following condition is satisfied: $A=5.2\times10E-3$ [mm$^2$]. In addition, a projection area of a ½ first optical mark surface (not numbered) of one of the ½ optical mark units on the reference surface perpendicular to the optical axis is $2.6\times10E-3$ square millimeters.

When a distance between center points of each adjacent two of the first optical mark surfaces TOIS7_1 is D, the following condition is satisfied: $D=0.22$ [mm].

When the projection area of each of the first optical mark surfaces TOIS7_1 on the reference surface perpendicular to the optical axis is A, and the distance between center points of each adjacent two of the first optical mark surfaces TOIS7_1 is D, the following condition is satisfied: $\sqrt{(A)}/D=0.328$.

Figure 40:
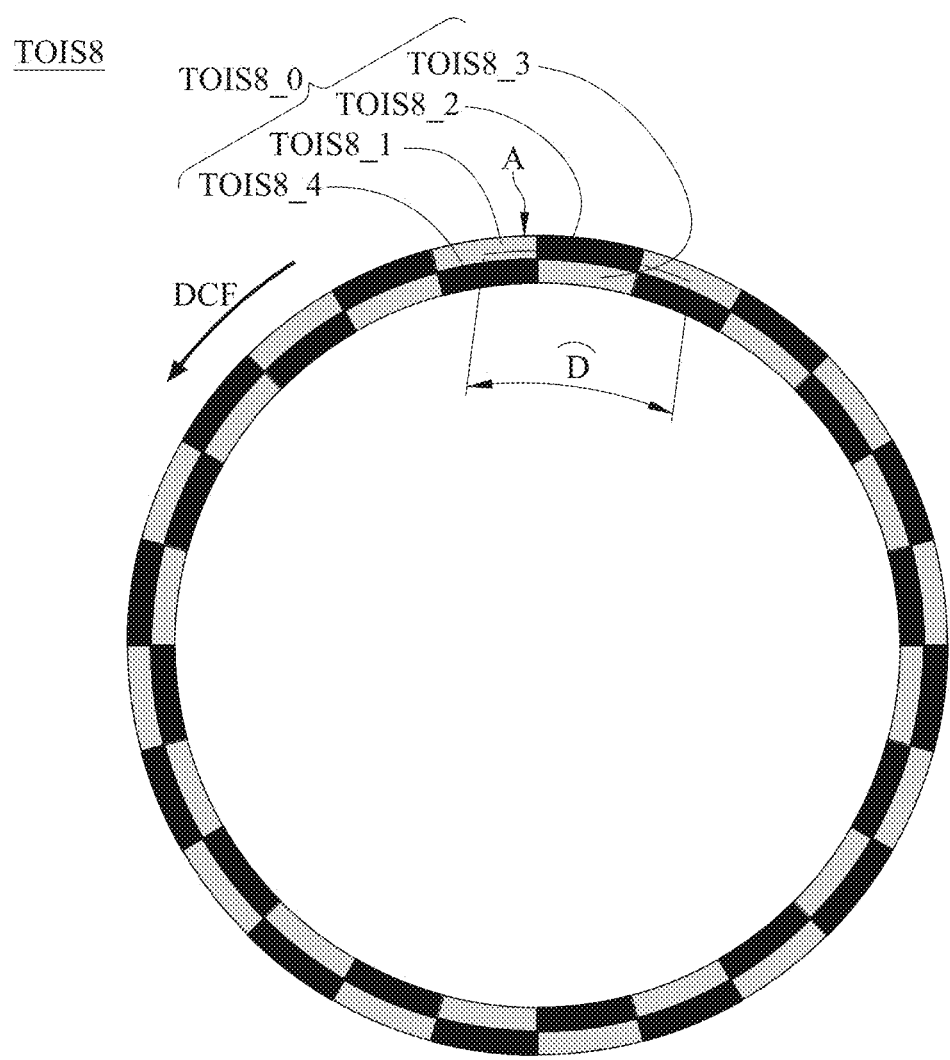
FIG. 40 is a perspective view of a two-dimensional optical mark structure according to another embodiment of the present disclosure.

Please refer to FIG. 40, which is a perspective view of a two-dimensional optical mark structure according to another embodiment of the present disclosure. As shown in FIG. 40, a two-dimensional optical mark structure TOIS8 includes a plurality of optical mark units TOIS8_0. Each of the optical mark units TOIS8_0 includes a first optical mark surface TOIS8_1, a second optical mark surface TOIS8_2, a third optical mark surface TOIS8_3 and a fourth optical mark surface TOIS8_4. The first optical mark surfaces TOIS8_1 and the second optical mark surfaces TOIS8_2 are arranged side by side in a circumference direction DCF that surrounds an optical axis. The third optical mark surface TOIS8_3 and the fourth optical mark surface TOIS8_4 are arranged side by side in the circumference direction DCF and are located closer to the optical axis than the first optical mark surfaces TOIS8_1 and the second optical mark surfaces TOIS8_2. That is, in each optical mark unit TOIS8_0, the first optical mark surface TOIS8_1, the second optical mark surface TOIS8_2, the third optical mark surface TOIS8_3 and the fourth optical mark surface TOIS8_4 can be regarded as a 2×2 matrix. The optical mark units TOIS8_0 are arranged side by side along the circumference direction DCF, such that the optical mark structure TOIS8 forms a mesh pattern.

The first optical mark surfaces TOIS8_1 and the second optical mark surfaces TOIS8_2 have different gloss values in a direction, the first optical mark surfaces TOIS8_1 and the third optical mark surfaces TOIS8_3 have the same gloss value in a direction, and the second optical mark surfaces TOIS8_2 and the fourth optical mark surfaces TOIS8_4 have the same gloss value in a direction.

When a projection area of each of the first optical mark surfaces TOIS8_1 on a reference surface perpendicular to the optical axis is A, the following condition is satisfied: $A=1.34\times10E-2$ [mm$^2$].

When a distance between center points of each adjacent two of the first optical mark surfaces TOIS8_1 is D, the following condition is satisfied: $D=0.488$ [mm].

When the projection area of each of the first optical mark surfaces TOIS8_1 on the reference surface perpendicular to the optical axis is A, and the distance between center points of each adjacent two of the first optical mark surfaces TOIS8_1 is D, the following condition is satisfied: $\sqrt{(A)}/D=0.237$.

4th Embodiment

Figure 22:
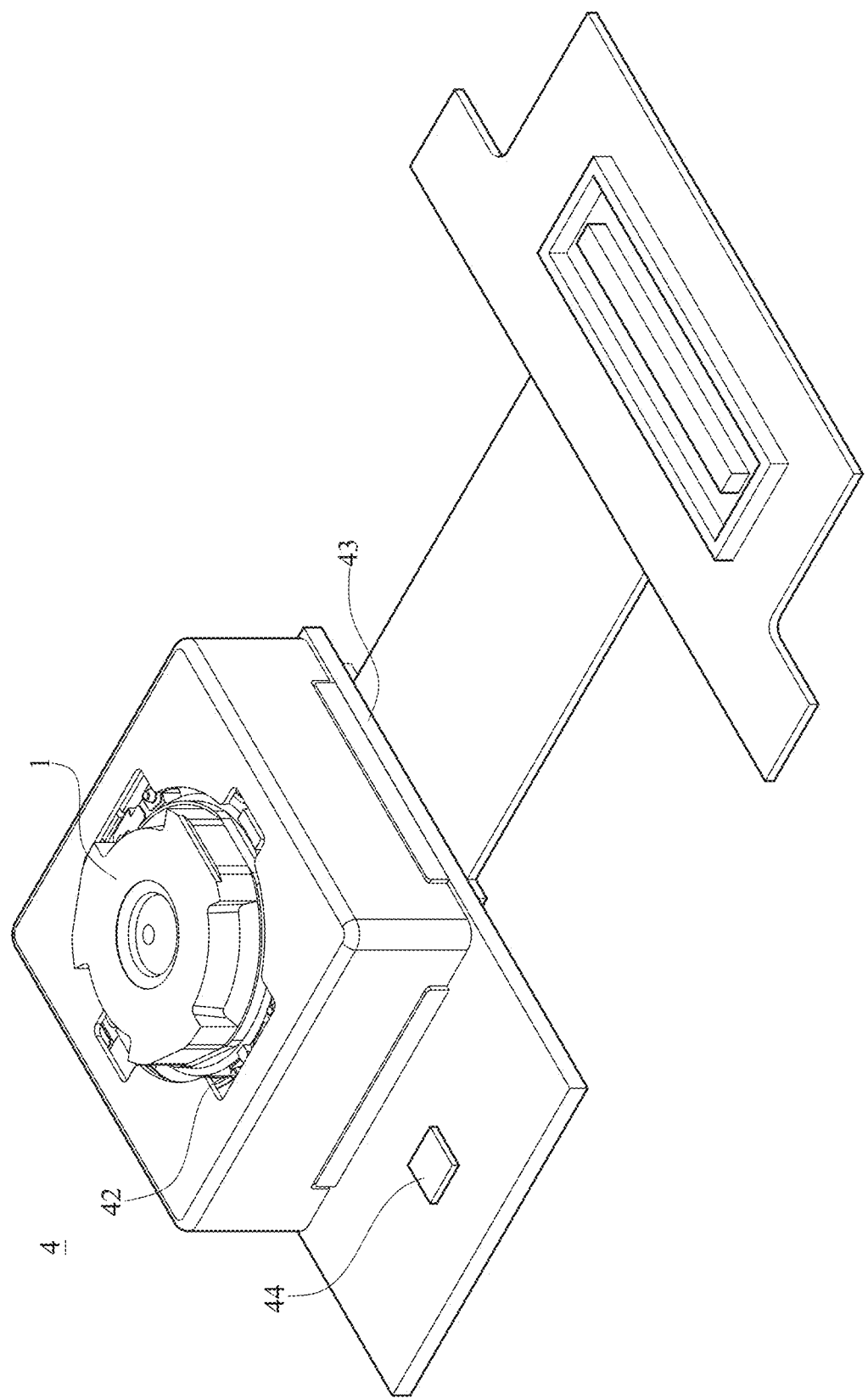
FIG. 22 is a perspective view of an image capturing unit according to the 4th embodiment of the present disclosure.

Please refer to FIG. 22, which is a perspective view of an image capturing unit according to the 4th embodiment of the present disclosure. In this embodiment, an image capturing unit 4 is a camera module including the imaging lens system 1 disclosed in the 1st embodiment, a driving device 42, an image sensor 43 and an image stabilizer 44. However, the image capturing unit 4 may alternatively be provided with the imaging lens system disclosed in other above-mentioned embodiments, and the present disclosure is not limited thereto. The imaging light converges in the imaging lens system 1 of the image capturing unit 4 to generate an image with the driving device 42 utilized for image focusing on the image sensor 43, and the generated image is then digitally transmitted to other electronic component for further processing.

The driving device 42 can have auto focusing functionality, and different driving configurations can be obtained through the usages of voice coil motors (VCM), micro electro-mechanical systems (MEMS), piezoelectric systems, or shape memory alloy materials. The driving device 42 is favorable for obtaining a better imaging position of the imaging lens system 1, so that a clear image of the imaged object can be captured by the imaging lens system 1 with different object distances. The image sensor 43 (for example, CCD or CMOS), which can feature high photosensitivity and low noise, is disposed on the image surface 102 of the imaging lens system 1 to provide higher image quality.

The image stabilizer 44, such as an accelerometer, a gyro sensor and a Hall Effect sensor, is configured to work with the driving device 42 to provide optical image stabilization (OIS). The driving device 42 working with the image stabilizer 44 is favorable for compensating for pan and tilt of the imaging lens system 1 to reduce blurring associated with motion during exposure. In some cases, the compensation can be provided by electronic image stabilization (EIS) with image processing software, thereby improving image quality while in motion or low-light conditions.

5th Embodiment

Figure 23:
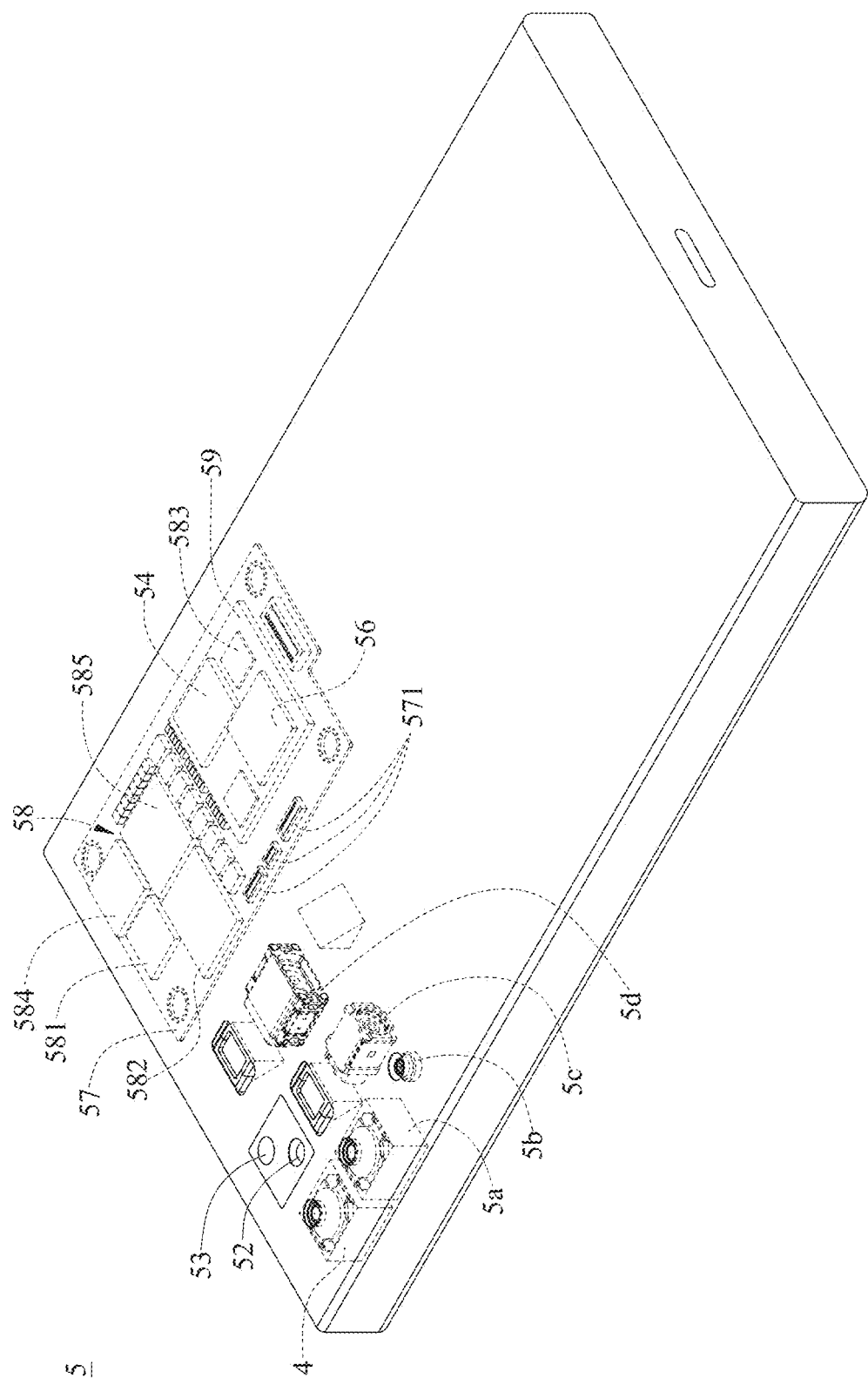
FIG. 23 is one perspective view of an electronic device according to the 5th embodiment of the present disclosure.
Figure 24:
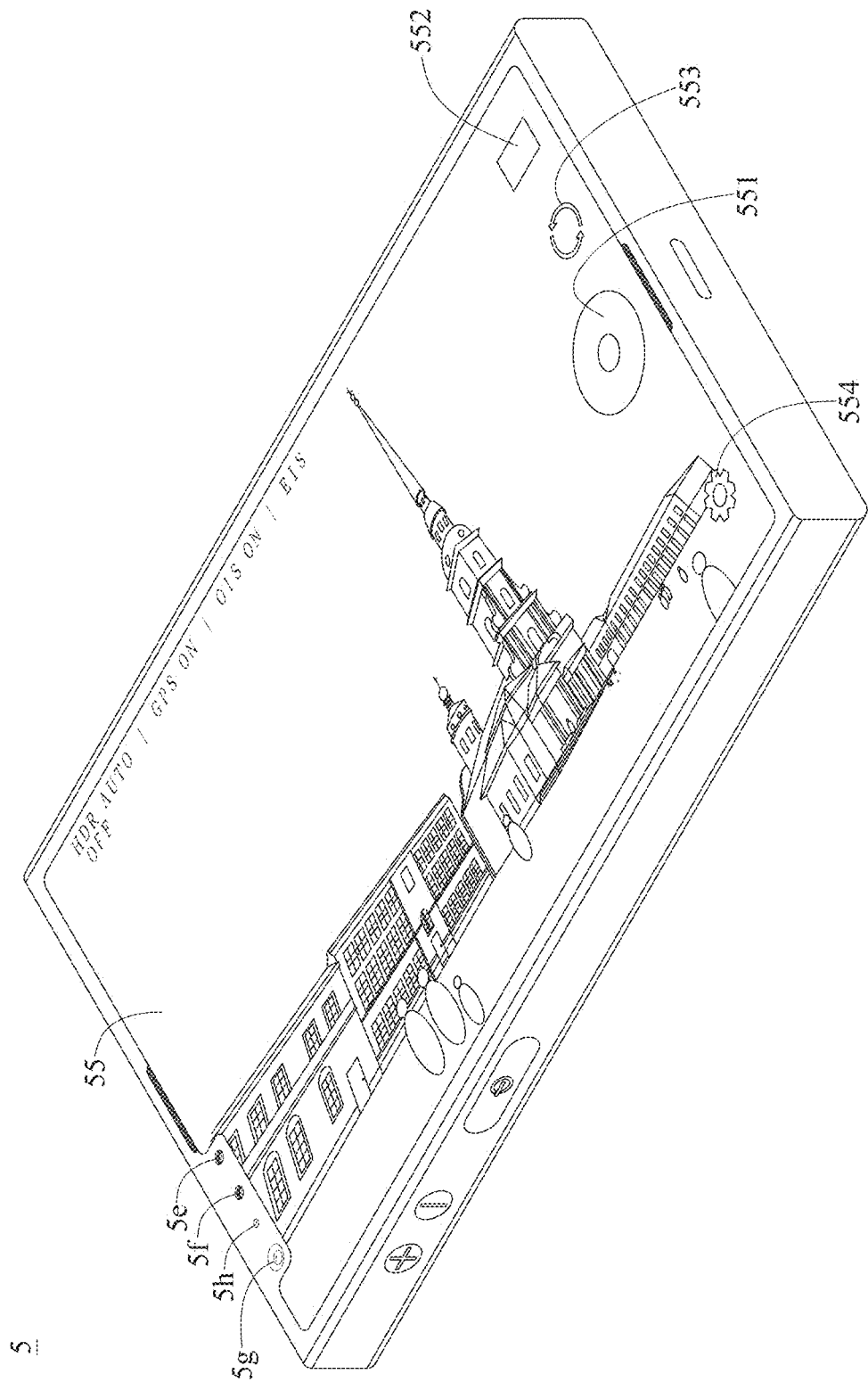
FIG. 24 is another perspective view of the electronic device of FIG. 23.
Figure 25:
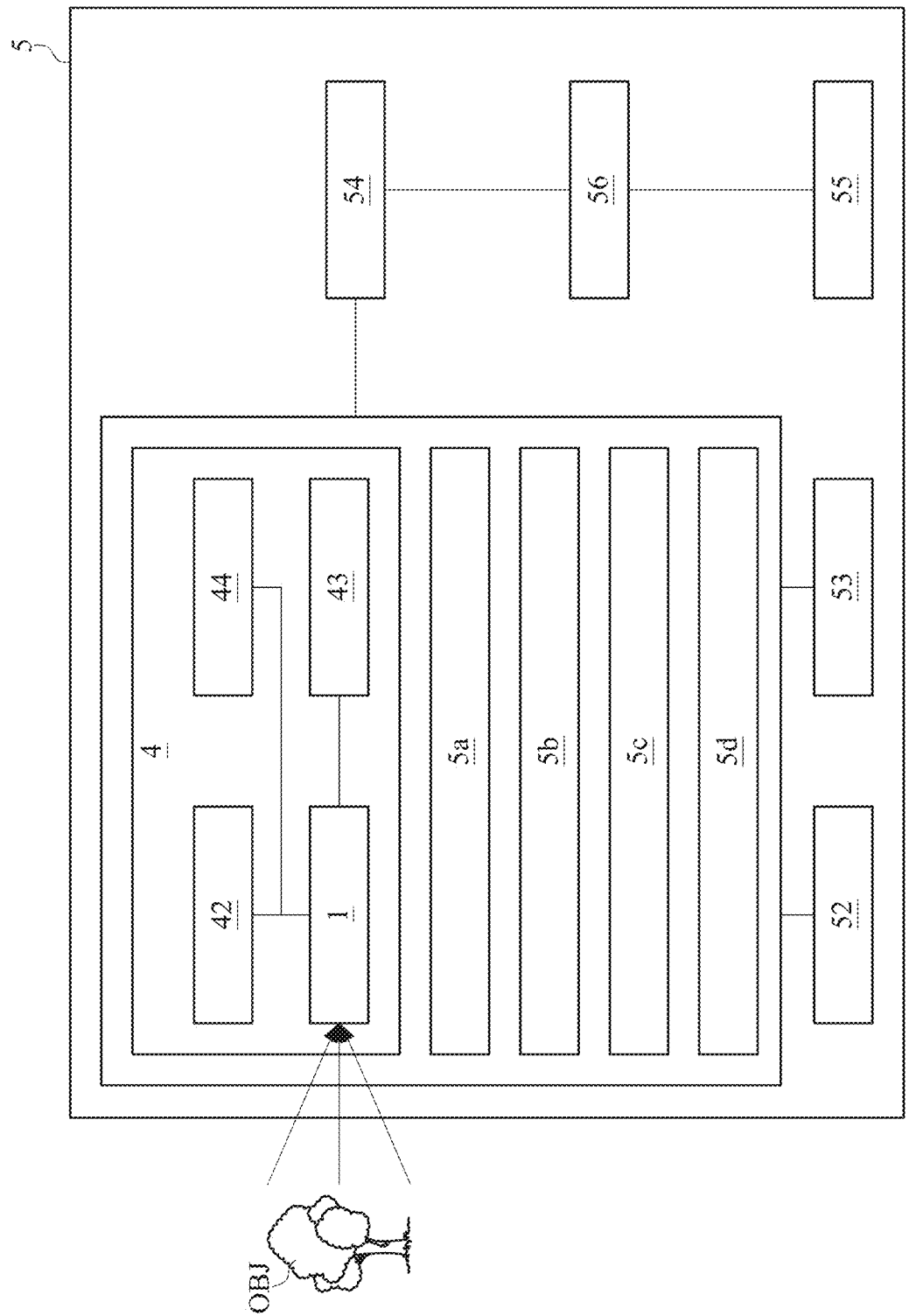
FIG. 25 is a block diagram of the electronic device of FIG. 23.

Please refer to FIG. 23 to FIG. 25, wherein FIG. 23 is one perspective view of an electronic device according to the 5th embodiment of the present disclosure, FIG. 24 is another perspective view of the electronic device of FIG. 23, and FIG. 25 is a block diagram of the electronic device of FIG. 23.

In this embodiment, an electronic device 5 is a mobile device such as a computer, a smartphone, a smart wearable device, a camera drone, a driving recorder and displayer, etc., and the present disclosure is not limited thereto. The electronic device 5 including an image capturing unit 4, an image capturing unit 5a, an image capturing unit 5b, an image capturing unit 5c, an image capturing unit 5d, an image capturing unit 5e, an image capturing unit 5f, an image capturing unit 5g, a flash module 52, a focus assist module 53, an image signal processor 54, a user interface 55 and an image software processor 56.

The image capturing unit 4, the image capturing unit 5a, the image capturing unit 5b, the image capturing unit 5c and the image capturing unit 5d are disposed on the same side of the electronic device 5. The image capturing unit 5e, the image capturing unit 5f, the image capturing unit 5g and the user interface 55 are disposed on the opposite side of the electronic device 5. The user interface 55 is a display unit, such that the image capturing units 5e, 5f can be front-facing cameras of the electronic device 5 for taking selfies, but the present disclosure is not limited thereto.

Each of the image capturing units 5a, 5b, 5c, 5d, 5e, 5f and 5g can include the imaging lens system of the present disclosure and can have a configuration similar to that of the image capturing unit 4. In detail, each of the image capturing units 5a, 5b, 5c, 5d, 5e, 5f and 5g can include an imaging lens system, a driving device, an image sensor and an image stabilizer, and each of the imaging lens systems of the image capturing units 5a, 5b, 5c, 5d, 5e, 5f and 5g can include an optical lens assembly such as the optical elements of the present disclosure, a barrel and a holder member for holding the optical lens assembly.

Figure 26:
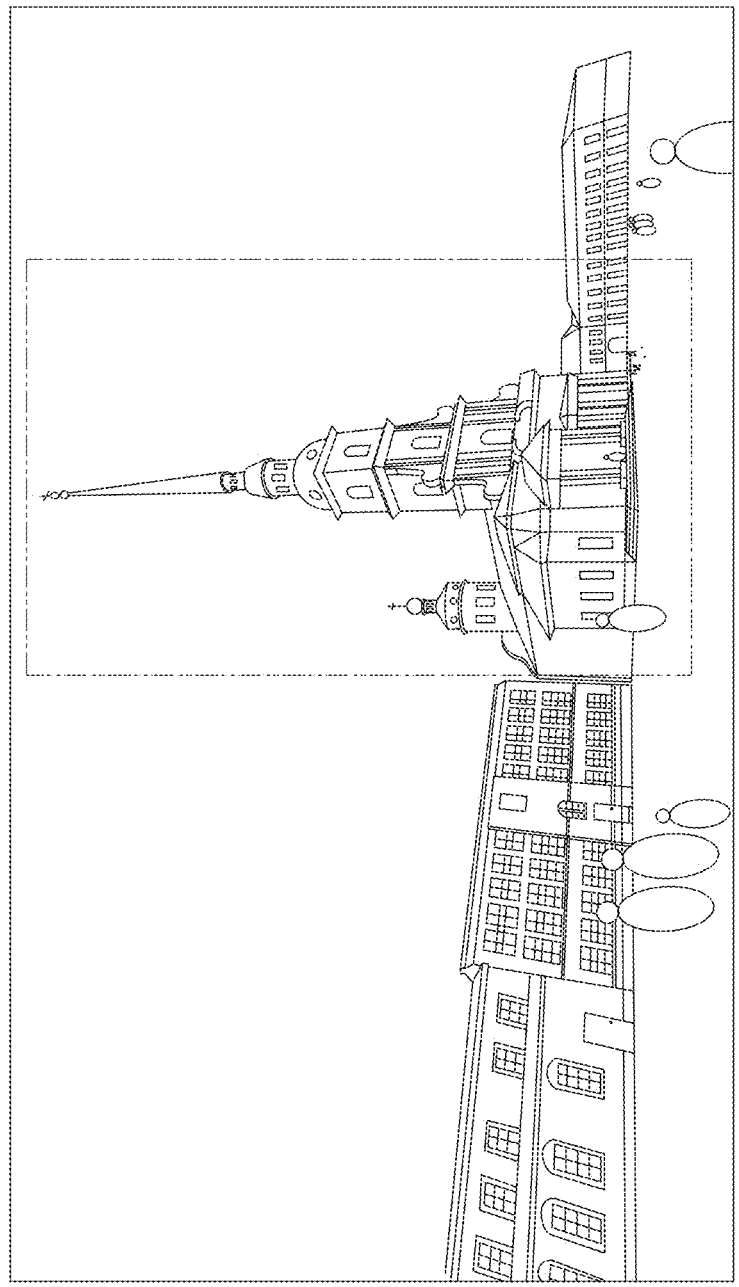
FIG. 26 shows an image captured by the electronic device of FIG. 23 with an equivalent focal length ranging between 11 mm and 14 mm.
Figure 27:
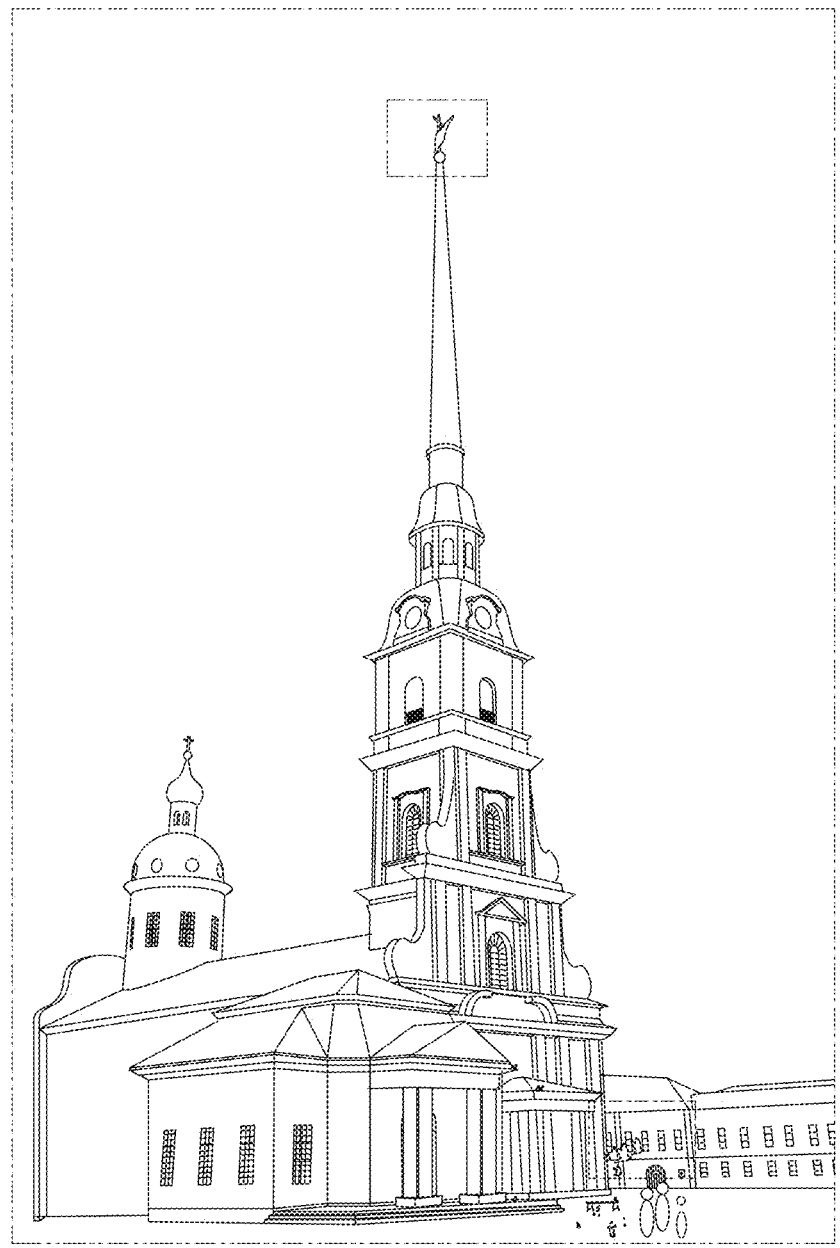
FIG. 27 shows an image captured by the electronic device of FIG. 23 with an equivalent focal length ranging between 20 mm and 40 mm.
Figure 28:
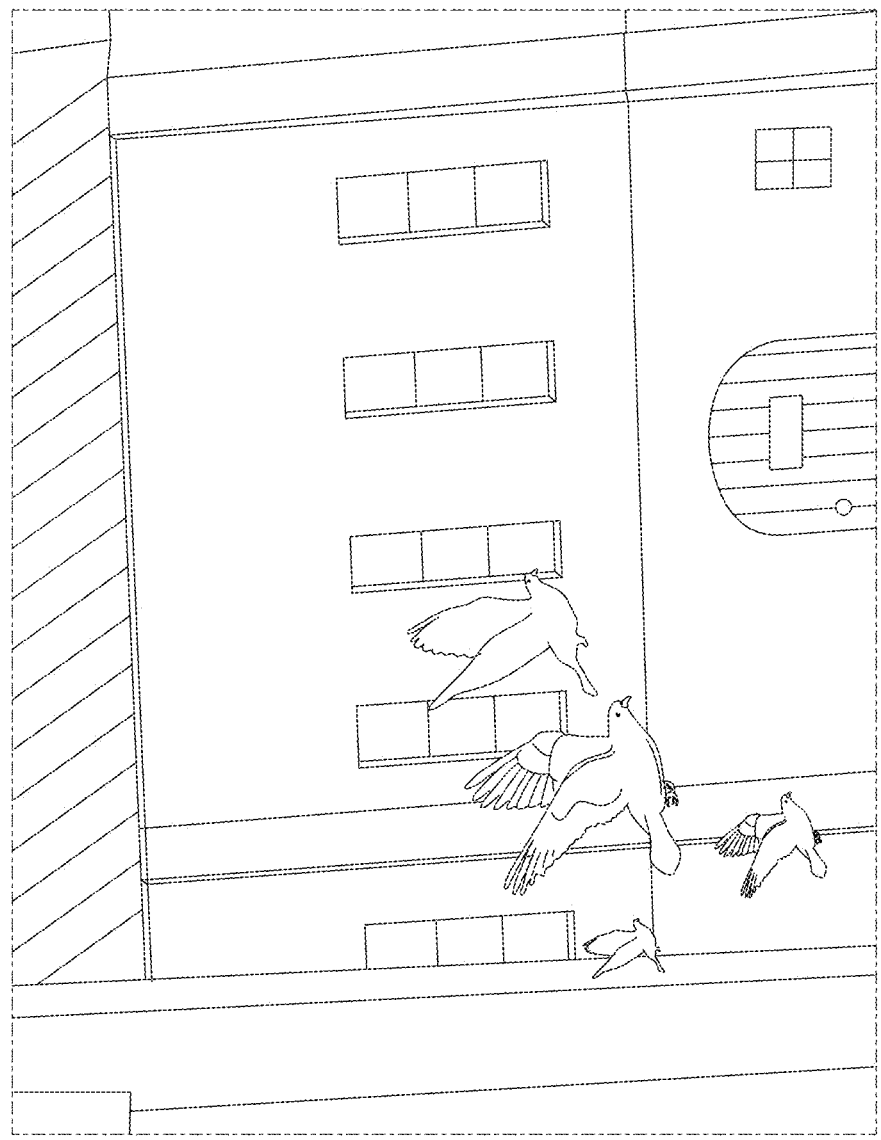
FIG. 28 shows an image captured by the electronic device of FIG. 23 with an equivalent focal length ranging between 100 mm and 150 mm.
Figure 29:
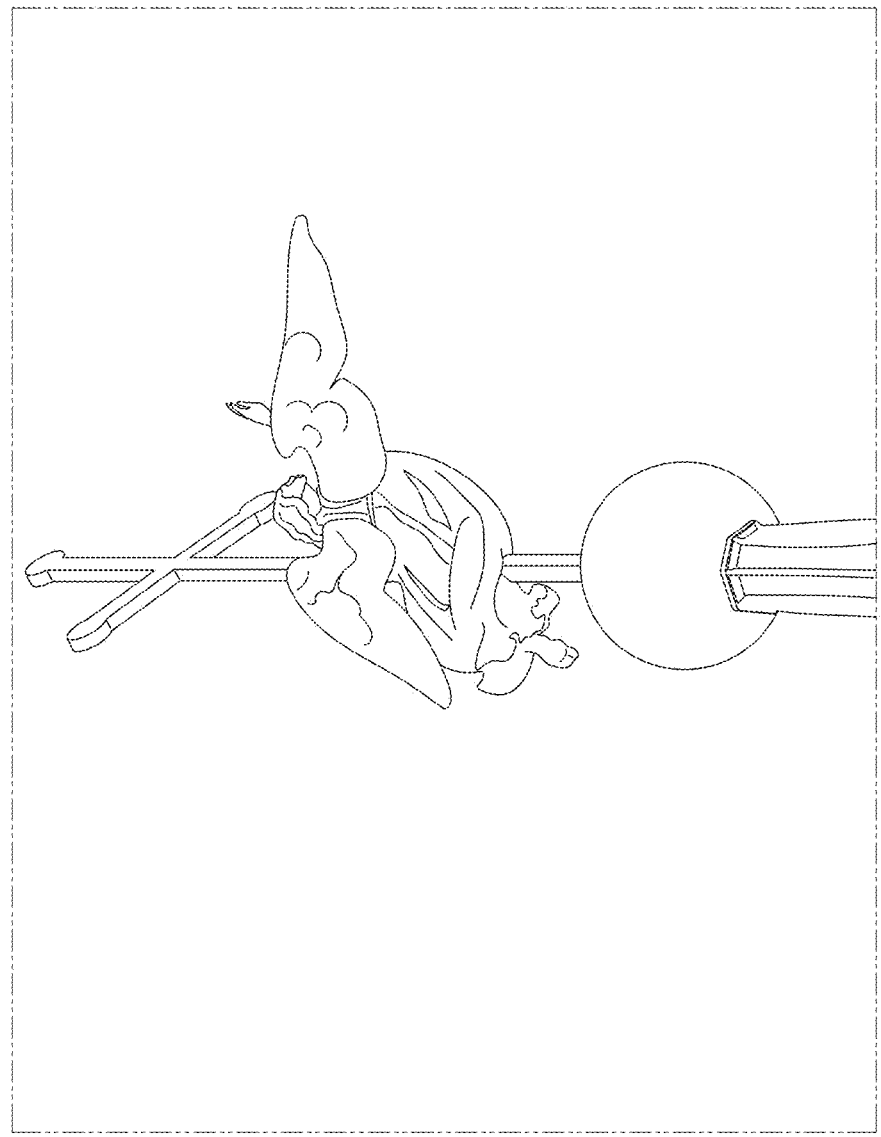
FIG. 29 shows an image captured by the electronic device of FIG. 23 with an equivalent focal length ranging between 400 mm and 600 mm.

The image capturing unit 4 is a wide-angle image capturing unit, the image capturing unit 5a is an ultra-wide-angle image capturing unit, the image capturing unit 5b is a macro-photo image capturing unit, the image capturing unit 5c is a telephoto image capturing unit, the image capturing unit 5d is an ultra-telephoto image capturing unit, the image capturing unit 5e is an ultra-wide-angle image capturing unit, the image capturing unit 5f is a wide-angle image capturing unit and the image capturing unit 5g is a ToF (time of flight) image capturing unit. In this embodiment, the image capturing units 4, 5a, 5b, 5c and 5d have different fields of view, such that the electronic device 5 can have various magnification ratios so as to meet the requirement of optical zoom functionality. For example, the ultra-wide-angle image capturing unit 5a or 5e with the maximum field of view ranging between 105 degrees and 125 degrees can achieve an image with an equivalent focal length between 11 mm and 14 mm, and the ultra-wide-angle image capturing unit 5a or 5e can be regarded as able to provide 0.5× magnification. In this case, the image captured by the ultra-wide-angle image capturing unit 5a or 5e can refer to FIG. 26, which shows an image captured by the electronic device 5 with an equivalent focal length ranging between 11 mm and 14 mm, and the captured image as shown in FIG. 26 includes the whole cathedral, surrounding buildings and people on the square. The captured image as shown in FIG. 26 has a relatively large field of view and depth of view, but it often has a relatively large degree of distortion. The wide-angle image capturing unit 4 or 5f with the maximum field of view ranging between 50 degrees and 100 degrees can achieve an image with an equivalent focal length between 20 mm and 40 mm, and the wide-angle image capturing unit 4 or 5f can be regarded as able to provide 1× magnification. In this case, the image captured by the wide-angle image capturing unit 4 or 5f can refer to FIG. 27, which shows an image captured by the electronic device 5 with an equivalent focal length ranging between 20 mm and 40 mm, and the captured image as shown in FIG. 27 includes the whole cathedral and people in front of the cathedral. The telephoto image capturing unit 5c with the maximum field of view ranging between 15 degrees and 30 degrees can achieve an image with an equivalent focal length between 100 mm and 150 mm, and the telephoto image capturing unit 5c can be regarded as able to provide 5× magnification. In this case, the image captured by the telephoto image capturing unit 5c can refer to FIG. 28, which shows an image captured by the electronic device 5 with an equivalent focal length ranging between 100 mm and 150 mm, and the captured image as shown in FIG. 28 includes the birds flying in front of the cathedral. The captured image as shown in FIG. 28 has a relatively small field of view and depth of view, and the telephoto image capturing unit 5c can be used for shooting moving targets. For this, an actuator can drive the imaging lens system thereof to quickly and continuously autofocus on the target, such that the captured image of the target would not be blurred due to long focusing distance. The ultra-telephoto image capturing unit 5d with the maximum field of view ranging between 4 degrees and 8 degrees can achieve an image with an equivalent focal length between 400 mm and 600 mm, and the ultra-telephoto image capturing unit 5d can be regarded as able to provide 20× magnification. In this case, the image captured by the ultra-telephoto image capturing unit 5d can refer to FIG. 29, which shows an image captured by the electronic device 5 with an equivalent focal length ranging between 400 mm and 600 mm, and the captured image as shown in FIG. 29 includes the angel-and-cross-topped spire of the cathedral. The captured image as shown in FIG. 29 has a smaller field of view and depth of view, and the ultra-telephoto image capturing unit 5d may be easier to capture an out of focus image due to slight camera shake. For this, an actuator can provide a feedback force to correct the shake so as to achieve optical image stabilization while providing a force to drive the imaging lens system of the ultra-telephoto image capturing unit 5d to focus on a target. In addition, the image capturing unit 5g can determine depth information of the imaged object. In this embodiment, the electronic device 5 includes multiple image capturing units 4, 5a, 5b, 5c, 5d, 5e, 5f and 5g, but the present disclosure is not limited to the number and arrangement of image capturing units.

When a user captures images of an object OBJ, light rays converge in the image capturing unit 4, the image capturing unit 5a, the image capturing unit 5b, the image capturing unit 5c or the image capturing unit 5d to generate images, and the flash module 52 is activated for light supplement. The focus assist module 53 detects the object distance of the imaged object OBJ to achieve fast auto focusing. The image signal processor 54 is configured to optimize the captured image to improve image quality. The light beam emitted from the focus assist module 53 can be either conventional infrared or laser.

In addition, the light rays may converge in the image capturing unit 5e, 5f or 5g to generate images. The electronic device 5 can include a reminder light 5h that can be illuminated to remind the user that the image capturing unit 5e, 5f or 5g of the electronic device 5 is working. The user interface 55 can be a touch screen or a physical button 551. The user is able to interact with the user interface 55 and the image software processor 56 having multiple functions to capture images and complete image processing. The image processed by the image software processor 56 can be displayed on the user interface 55. The user can replay the previously captured image through an image playback button 552 of the user interface 55, can choose a suitable image capturing unit for shooting through an image capturing units switching button 553 of the user interface 55, and can properly adjust shooting parameters according to current shooting situations through an integrated menu button 554 of the user interface 55.

Further, the electronic device 5 further includes a circuit board 57 and a plurality of electronic components 58 disposed on the circuit board 57. The image capturing units 4, 5a, 5b, 5c, 5d, 5e, 5f and 5g are electrically connected to the electronic components 58 via connectors 571 on the circuit board 57. The electronic components 58 can include a signal emitting module 581 and can transmit image(s) to other electronic device or a cloud storage via the signal emitting module 581, wherein the signal emitting module 581 can be a wireless fidelity (WiFi) module, a Bluetooth module, an infrared module, a network service module or an integrated module for transmitting various signals mentioned above, and the present disclosure is not limited thereto.

The electronic components 58 can also include a storage unit 582, a random access memory 583 for storing image information, a gyroscope 584, and a position locator 585 for facilitating the navigation or positioning of the electronic device 5. In this embodiment, the image signal processor 54, the image software processor 56 and the random access memory 583 are integrated into a single chip system 59, but the present disclosure is not limited thereto. In some other embodiments, the electronic components can also be integrated in the image capturing unit or can also be disposed on one of the circuit boards.

The mobile devices in these embodiments are only exemplary for showing the imaging lens systems 1-3 of the present disclosure installed in the electronic device 5, and the present disclosure is not limited thereto. The imaging lens systems 1-3 can be optionally applied to optical systems with a movable focus. Furthermore, the imaging lens systems 1-3 features good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, having an optical axis, and the imaging lens system comprising:
    a plurality of optical elements, arranged along the optical axis, wherein the plurality of optical elements at least comprise a first optical element and a second optical element;
    a lens barrel, surrounding the optical axis, wherein the plurality of optical elements are accommodated in the lens barrel;
    an optical mark structure, disposed on the first optical element, wherein the optical mark structure faces the second optical element, the optical mark structure comprises a plurality of optical mark units arranged side by side along a circumference direction that surrounds the optical axis, and each of the plurality of optical mark units comprises a first optical mark surface and a second optical mark surface, and the first optical mark surface and the second optical mark surface of each of the plurality of optical mark units are arranged side by side; and
    a curable liquid, disposed on the optical mark structure, wherein the curable liquid is in physical contact with at least one of the plurality of optical mark units, and the first optical element is fixed to the second optical element while the curable liquid is cured;
    wherein a projection area of each of the first optical mark surfaces on a reference surface perpendicular to the optical axis is A, a distance along the circumference direction between center points of two of the first optical mark surfaces adjacent in the circumference direction is D, an angle between an observation direction and the optical mark structure is $\theta$, a gloss value difference in the observation direction between the first optical mark surface and the second optical mark surface of each of the plurality of optical mark units is $\Delta G$, and the following conditions are satisfied:

$$0.001\ [mm2] \le A \le 0.072\ [mm2];$$

$$0.03\ [mm] \le D \le 1.0\ [mm];$$

$$50\ [deg.] \le \theta \le 90\ [deg.]; \text{ and}$$

$$15\ [GU] \le \Delta G \le 50\ [GU].$$

2. The imaging lens system according to claim 1, wherein the projection area of each of the first optical mark surfaces on the reference surface perpendicular to the optical axis is A, and the following condition is satisfied:

$$0.002\ [mm2] \le A \le 0.042\ [mm2].$$

3. The imaging lens system according to claim 1, wherein the second optical element covers at least part of the optical mark structure in a direction parallel to the optical axis.

4. The imaging lens system according to claim 1, wherein the projection area of each of the first optical mark surfaces on the reference surface perpendicular to the optical axis is A, the distance along the circumference direction between center points of two of the first optical mark surfaces adjacent in the circumference direction is D, and the following condition is satisfied:

$$0.05 \le \sqrt{(A)}/D \le 1.5.$$

5. The imaging lens system according to claim 1, wherein the plurality of optical mark units arranged along a direction away from the optical axis, and the optical mark structure forms a mesh pattern.

6. An image capturing unit, comprising:
    the imaging lens system of claim 1.

7. An electronic device, comprising:
    the image capturing unit of claim 6; and
    an image sensor disposed on an image surface of the imaging lens system.

* * * * *